United States Patent
Funabiki et al.

(10) Patent No.: US 8,365,232 B2
(45) Date of Patent: Jan. 29, 2013

(54) METHOD, DEVICE, SYSTEM, PROGRAM, AND INTEGRATED CIRCUIT FOR WIRELESS TRANSMISSION

(75) Inventors: Makoto Funabiki, Osaka (JP); Junji Yoshida, Osaka (JP); Tetsuya Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 14 days.

(21) Appl. No.: 13/201,730

(22) PCT Filed: Oct. 14, 2010

(86) PCT No.: PCT/JP2010/006104
§ 371 (c)(1),
(2), (4) Date: Aug. 16, 2011

(87) PCT Pub. No.: WO2011/048778
PCT Pub. Date: Apr. 28, 2011

(65) Prior Publication Data
US 2012/0008052 A1  Jan. 12, 2012

(30) Foreign Application Priority Data

Oct. 22, 2009 (JP) ................................ 2009-242999
Mar. 23, 2010 (JP) ................................ 2010-066509

(51) Int. Cl.
*H04N 7/18* (2006.01)
*H04N 5/76* (2006.01)
*G06F 3/06* (2006.01)
*H04H 40/00* (2008.01)
*H04W 4/00* (2009.01)

(52) U.S. Cl. .................. 725/81; 386/231; 710/3; 710/9; 370/328; 455/3.06

(58) Field of Classification Search .................... 725/68, 725/81, 82; 348/552, 705, 706; 709/245, 709/228, 223; 455/3.06; 370/329, 431, 449; 710/62, 2, 3, 10, 15, 9; 386/231
See application file for complete search history.

(56) References Cited

U.S. PATENT DOCUMENTS 6,240,094 B1 * 5/2001 Schneider .................... 370/412
7,035,586 B2   4/2006 Finet
(Continued)

FOREIGN PATENT DOCUMENTS

| JP | 2008-252929 | 10/2008 |
| JP | 2009-4877 | 1/2009 |
| WO | 2007/136038 | 11/2007 |

OTHER PUBLICATIONS

International Search Report issued Nov. 16, 2010 in International (PCT) Application No. PCT/JP2010/006104.

*Primary Examiner* — Victor Kostak
(74) *Attorney, Agent, or Firm* — Wenderoth, Lind & Ponack, LLP

(57) ABSTRACT

A wireless transmission method includes: receiving a location specification message indicating a location of a source device (S702 and S703); and selecting a connection mode applied between first and second wireless transmission devices, on the basis of the location of the source device indicated by the location specification message, and establishing a connection according to the selected connection mode (S704 to S706). When the source device is located on a side of the second wireless transmission device (Yes in S704), a first wireless connection mode is selected in the selecting so that the video data is wirelessly transmitted in a direction from the second wireless transmission device to the first wireless transmission device (S706). When the source device is located on a side of the first wireless transmission device (No in S704), a second wireless connection mode is selected in the selecting so that the audio data is wirelessly transmitted in a direction from the first wireless transmission device to the second wireless transmission device (S705).

13 Claims, 33 Drawing Sheets

U.S. PATENT DOCUMENTS

| | | | |
|---|---|---|---|
| 7,849,218 B2 | 12/2010 | Funabiki et al. | |
| 7,978,216 B2* | 7/2011 | Asthana et al. | 348/14.09 |
| 2004/0203407 A1 | 10/2004 | Chang | |
| 2006/0209892 A1* | 9/2006 | MacMullan et al. | 370/468 |
| 2008/0086749 A1 | 4/2008 | Goldberg et al. | |
| 2008/0168519 A1 | 7/2008 | Rao et al. | |
| 2008/0320539 A1 | 12/2008 | Ohkita | |
| 2009/0180755 A1* | 7/2009 | Kanemaru et al. | 386/84 |
| 2009/0210539 A1 | 8/2009 | Funabiki et al. | |
| 2009/0278993 A1 | 11/2009 | Nishikawa et al. | |
| 2009/0285138 A1* | 11/2009 | Thomas et al. | 370/310 |
| 2010/0013660 A1* | 1/2010 | Hwang et al. | 340/825 |
| 2010/0050214 A1 | 2/2010 | Funabiki et al. | |
| 2010/0225828 A1* | 9/2010 | Yamada et al. | 348/731 |
| 2011/0038338 A1 | 2/2011 | Funabiki et al. | |
| 2012/0057075 A1* | 3/2012 | Kabuto et al. | 348/564 |
| 2012/0071989 A1* | 3/2012 | Pope et al. | 700/11 |
| 2012/0180093 A1* | 7/2012 | Ishihara et al. | 725/80 |

* cited by examiner

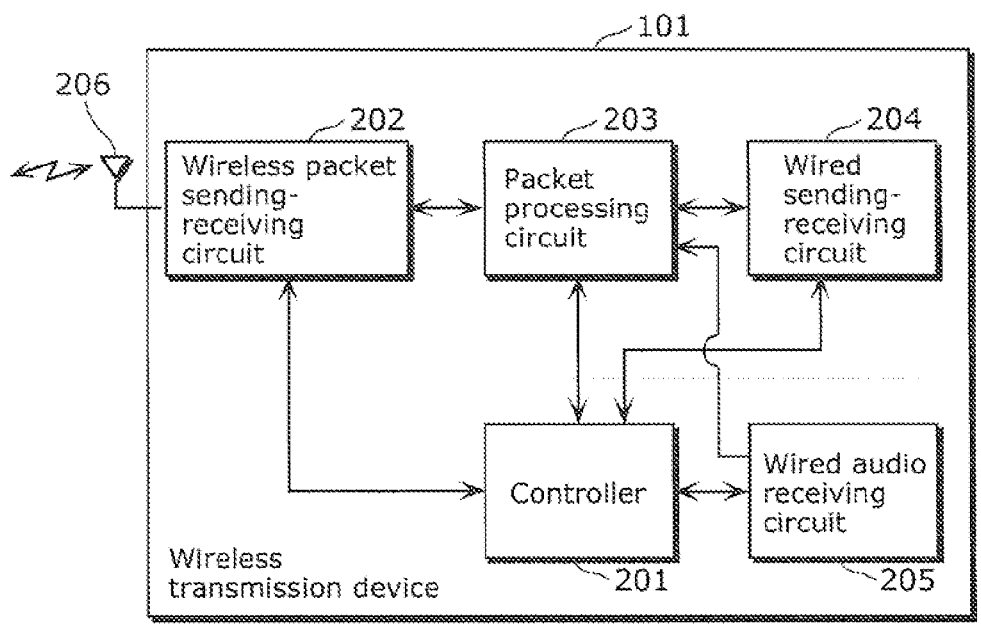
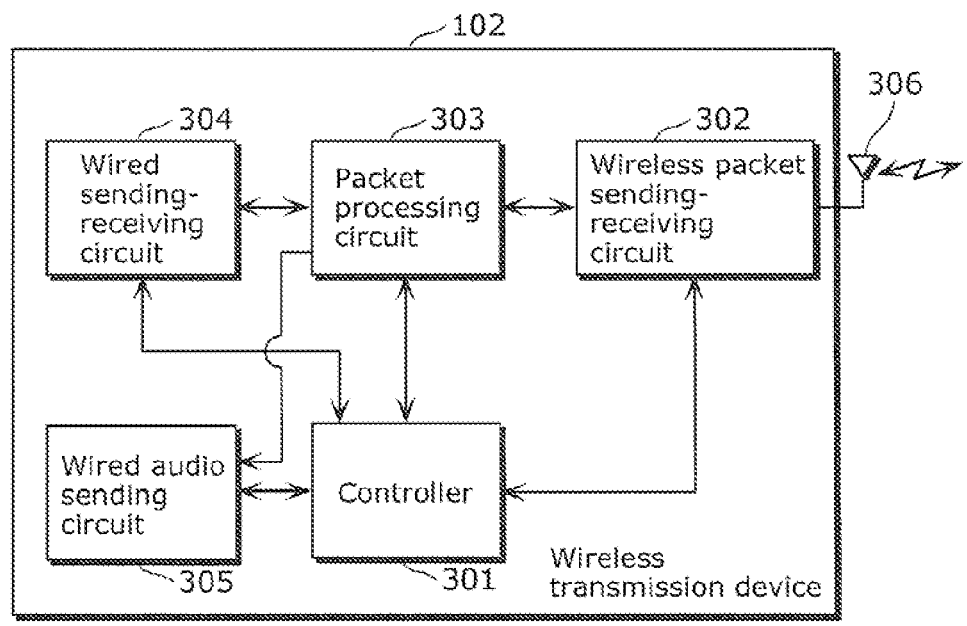

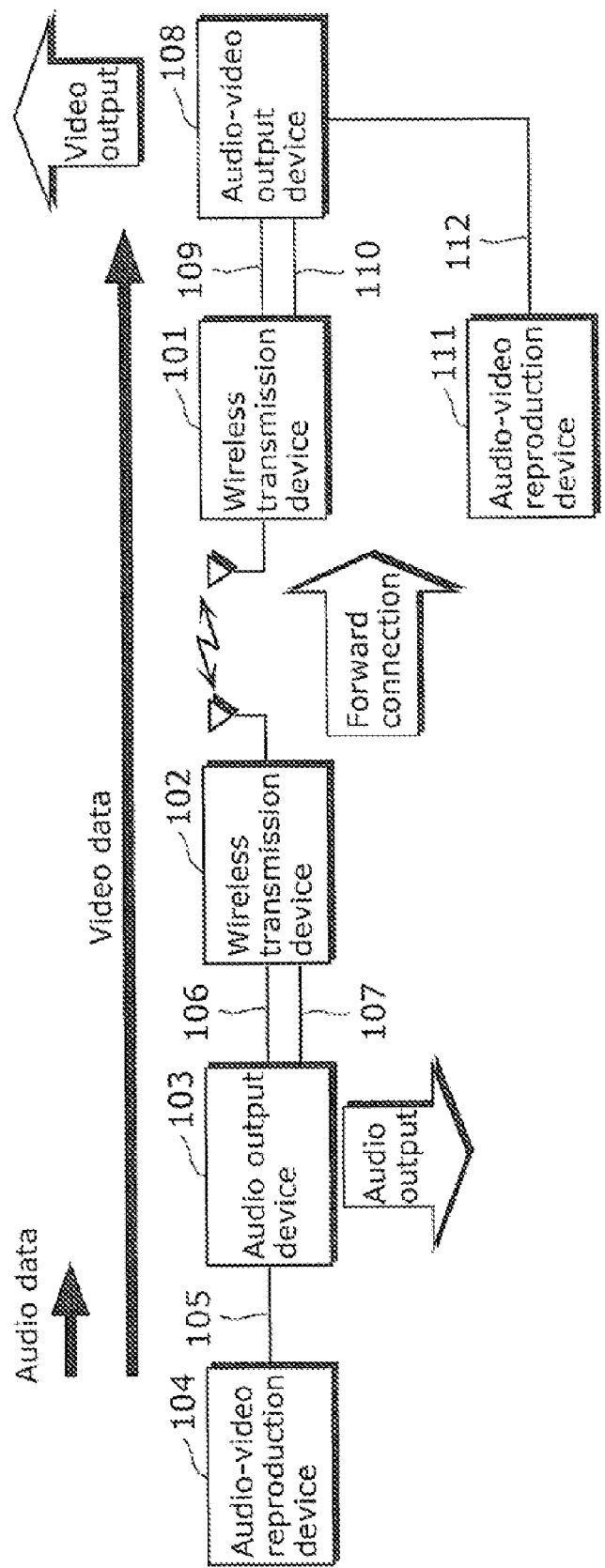

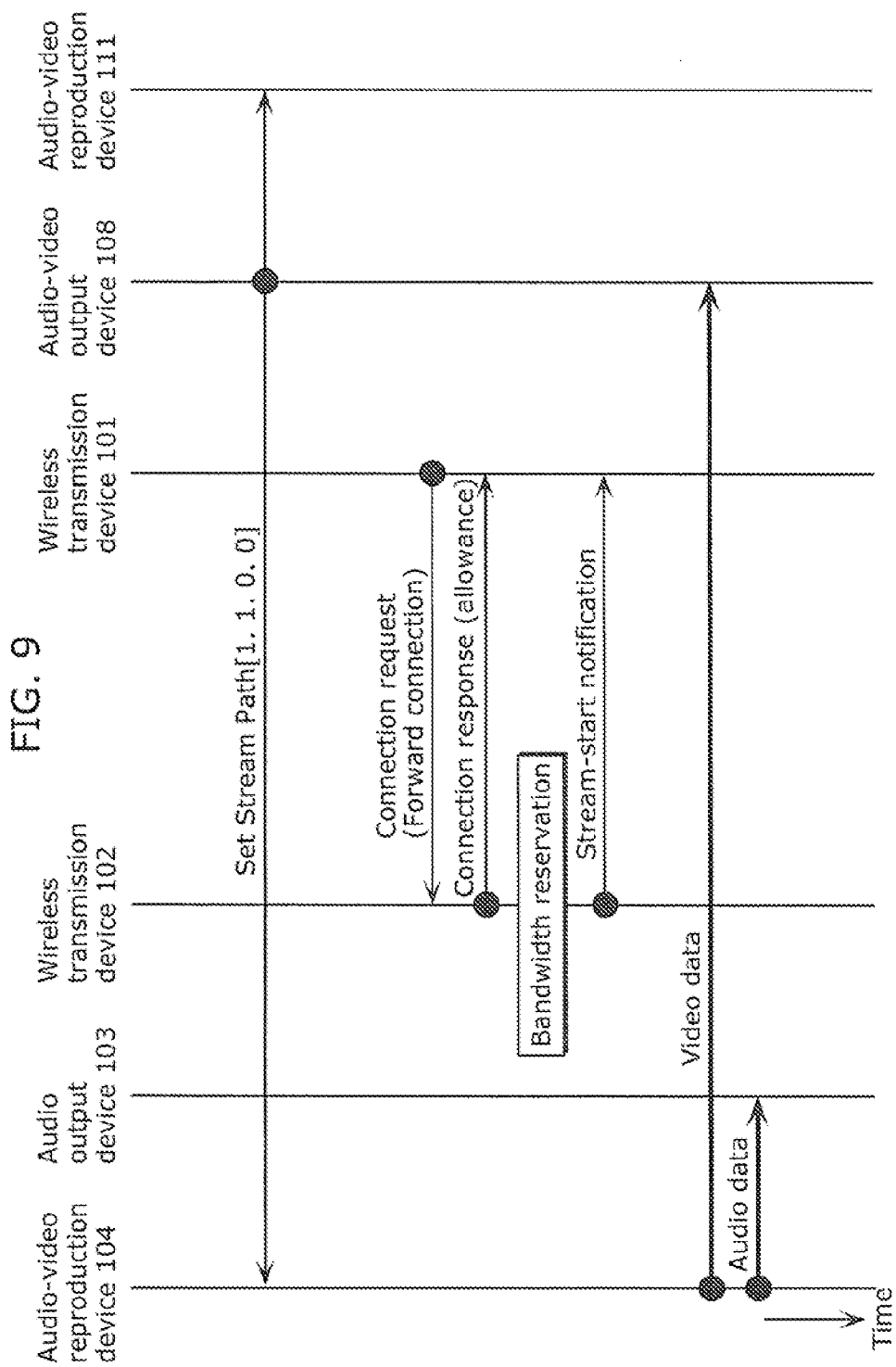

METHOD, DEVICE, SYSTEM, PROGRAM, AND INTEGRATED CIRCUIT FOR WIRELESS TRANSMISSION

TECHNICAL FIELD

The present invention relates to methods of wirelessly transmitting audio and video data, and particularly to a method of wirelessly transmitting audio data from an audio-video output device such as a television device (TV), to an audio output device such as an AV amplifier.

BACKGROUND ART

An example of conventional methods of wirelessly transmitting video data and audio data among devices is disclosed by Patent Reference 1. Patent Reference 1 discloses a method whereby a video transmission device connected to a source device, which provides content data, selectively transmits the content data received from the source device to electronic devices using wireless signals.

To be more specific, the video transmission device first establishes wireless communication with each of the electronic devices to detect the function for each of the electronic devices. Next, the video transmission device classifies the electronic devices into groups according to function, and then creates list information showing the electronic devices for each of the groups. For example, the list includes: a combination of an electronic device (such as a projector) capable of displaying video and an electronic device (such as an AV amplifier) capable of outputting audio; and a single electronic device (such as a TV) capable of both displaying video and outputting audio.

Following this, the video transmission device sends the created list information to the source device. According to selection information provided by the source device to specify one of the groups, a first electronic device and a second electronic device are specified from among the electronic devices. Here, the first electronic device is to receive the video data included in the content data whereas the second electronic device is to receive the audio data included in the content data.

When the specified first electronic device is different from the specified second electronic device, the video transmission device transmits the video and audio data included in the content data to the first and second electronic devices, respectively, using wireless signals. When a single electronic device is specified as both the first electronic device and the second electronic device, the video transmission device transmits the video and audio data included in the content data to this single electronic device using a wireless signal.

In this way, the video and audio data included in the content data provided by the source device can be selectively transmitted. That is, the video data and the audio data can be separately transmitted to the projector and the AV amplifier, respectively, or can be collectively transmitted to the TV.

CITATION LIST

Patent Literature

[PTL 1]
Japanese Unexamined Patent Application Publication No. 2009-004877

SUMMARY OF INVENTION

Technical Problem

However, the technology related to the conventional method of wirelessly transmitting audio-video data (hereafter, the audio-video data refers to data including audio data and video data) does not disclose an operation to be performed when a broadcast wave received by an antenna of the TV is decoded by an internal tuner to be viewed or when content outputted from a device connected to the TV via a wired connection is viewed. More specifically, when the AV amplifier is used, this includes a case for reproducing the audio data decoded by the internal tuner of the TV with a higher sound quality and a case for reproducing the content outputted from the device connected to the TV with a higher sound quality. In each of these cases, a wireless connection needs to be appropriately established between the TV and the AV amplifier.

For example, suppose a case of employing a wireless transmission method whereby: a wireless band is shared by the video data and the audio data; and the wireless bandwidth is insufficient to simultaneously transmit both the video data and the audio data, which means that either one of the video data and the audio data is transmitted. With this method, the wireless connection needs to be switched between when the video data is wirelessly transmitted from a device to the TV and when the audio data is wirelessly transmitted from the TV to the AV amplifier.

Here, the conventional method has a problem that a user has to manually switch the wireless connection.

The present invention is conceived in view of the stated problem, and has an object to provide a wireless transmission method capable of automatically switching a wireless connection to transmit audio-video data.

Solution to Problem

The wireless transmission method in an aspect of the present invention is a wireless transmission method for a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, the wireless transmission method being executed by one of the first and second wireless transmission devices. To be more specific, the wireless transmission method includes: receiving a location specification message indicating a location of the source device; and selecting a connection mode applied between the first and second wireless transmission devices, on the basis of the location of the source device indicated by the location specification message received in the receiving, and establishing a connection according to the selected connection mode. When the source device is located on a side of the second wireless transmission device, a first wireless connection mode is selected in the selecting so that at least the video data, out of the video data and the audio data, is wirelessly transmitted in a direction from the second wireless transmission device to the first wireless transmission device. When the source device is located on a side of the first wireless transmission device, a second wireless connection mode is selected in the selecting so that only the audio data, out of the video data and the audio data, is wirelessly transmitted in a direction from the first wireless transmission device to the second wireless transmission device.

With this configuration, the connection mode applied between the first and second wireless transmission devices can be automatically selected according to the location of the source device. As a result, the content can be reproduced without requiring the user to perform a complicated setting change.

It should be noted that when the video output device serves as the source device, devices to be connected to the video output device and the audio output device (that is, audio-video reproduction devices) are not essential components. Also note that "the device connected to the video output device" refers to not only a device directly connected to the video output device, but also a device indirectly connected to the video output device via another device. The same applies to "the device connected to the audio output device".

As an example, the first wireless connection mode may be selected in the selecting when: the source device is located on the side of the second wireless transmission device; and a first connection-start condition is satisfied. In this case, the first connection-start condition may include at least one of that: (a) the wireless transmission system is operating in a mode in which the video data is outputted from the video output device and the audio data is outputted from the audio output device; (b) the first wireless transmission device is capable of wired transmission of the video data; (c) the first wireless transmission device is capable of wireless reception of the video data; and (d) the first wireless transmission device and the video output device are connected.

As another example, the second wireless connection mode may be selected in the selecting when: the source device is located on the side of the first wireless transmission device; and a second connection-start condition is satisfied. In this case, the second connection-start condition may include at least one of that: (a) the wireless transmission system is operating in a mode in which the video data is outputted from the video output device and the audio data is outputted from the audio output device; (b) the second wireless transmission device is capable of wired transmission of the audio data; (c) the second wireless transmission device is capable of wireless reception of the audio data; and (d) the second wireless transmission device and the audio output device are connected.

Also, the location specification message may be a Consumer Electronics Control (CEC) message defined by a High-Definition Multimedia Interface (HDMI) standard. The location of the source device may be specified in the selecting, on the basis of a CEC physical address included in the CEC message.

To be more specific, the CEC message may be one of a "Set Stream Path" message and an "Active Source" message.

Moreover, each of the first and second wireless transmission devices may comply with a wireless high-definition standard called WirelessHD, and perform the wireless transmission using a High Rate PHY (HRP) when the first wireless connection mode is selected and using a Low Rate PHY (LRP) when the second wireless connection mode is selected. The HRP enables the uncompressed video data to be wirelessly transmitted. The audio data can be wirelessly transmitted using the LRP adequately because the audio data is smaller in amount than the video data.

Furthermore, the CEC message may be wirelessly sent and received between the first and second wireless transmission devices using the LRP during a random access time at predetermined intervals. With this, even when the audio data is wirelessly transmitted using the LRP, the connection mode can be changed.

Also, the wireless transmission method may further include terminating a wireless connection when: the wireless connection is established in one of the first and second wireless connection modes; and the other one of the first and second wireless connection mode is newly selected in the selecting. With this, the connection mode can be smoothly changed.

Moreover, the wireless transmission method may further include terminating a wireless connection when: the wireless connection is established between the first and second wireless transmission devices in one of the first and second wireless connection modes; and a signal is received which indicates that a device connected to the one of the first and second wireless transmission devices via a wired connection is in a stopped state. This can prevent the wireless band from remaining occupied after, for example, the end of content viewing.

The wireless transmission device in another aspect of the present invention is a wireless transmission device serving as one of a first wireless transmission device and a second wireless transmission device in a wireless transmission system including: a video output device at least displaying video based on video data; an audio output in device outputting audio based on audio data; the first wireless transmission device connected to the video output device via a wired connection; and the second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device. To be more specific, the wireless transmission device includes: a receiving unit which receives a location specification message indicating a location of the source device; and a selecting unit which selects a connection mode applied between the first and second wireless transmission devices, on the basis of the location of the source device indicated by the location specification message received by the receiving unit, and establishes a connection according to the selected connection mode. When the source device is located on a side of the second wireless transmission device, the selecting unit selects a first wireless connection mode so that at least the video data, out of the video data and the audio data, is wirelessly transmitted in a direction from the second wireless transmission device to the first wireless transmission device. When the source device is located on a side of the first wireless transmission device, the selecting unit selects a second wireless connection mode so that only the audio data, out of the video data and the audio data, is wirelessly transmitted in a direction from the first wireless transmission device to the second wireless transmission device.

The wireless transmission system in another aspect of the present invention is a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device. To be more specific, one of the first and second wireless transmission devices includes: a receiving unit which receives a location specification message indicating a location of the source device; and a selecting unit which selects a connection mode applied between the first and second wireless transmission devices, on the basis of the location of the source device indicated by the location specification message received by the receiving unit, and establishes a connection according to the selected connection mode. When the source device is located on a side of the second wireless transmission device, the selecting unit selects a first wireless connection mode so that at least the video data, out of the video data and the audio data, is wirelessly transmitted in a direction from the second wireless transmission device to the first wireless transmission device. When the source device is located on a side of the first wireless transmission device, the selecting unit selects a second wireless connection mode so that only the audio data, out of the video data and the audio data, is wirelessly transmitted in a direction from the first wireless transmission device to the second wireless transmission device.

The non-transitory computer-readable recording medium in another aspect of the present invention is a non-transitory computer-readable recording medium for use in a computer, the recording medium having a computer program recorded thereon to be performed by a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device. To be more specific, the computer program causes one of the first and second wireless transmission devices to execute: receiving a location specification message indicating a location of the source device; and selecting a connection mode applied between the first and second wireless transmission devices, on the basis of the location of the source device indicated by the location specification message received in the receiving, and establishing a connection according to the selected connection mode. When the source device is located on a side of the second wireless transmission device, a first wireless connection mode is selected in the selecting so that at least the video data, out of the video data and the audio data, is wirelessly transmitted in a direction from the second wireless transmission device to the first wireless transmission device. When the source device is located on a side of the first wireless transmission device, a second wireless connection mode is selected in the selecting so that only the audio data, out of the video data and the audio data, is wirelessly transmitted in a direction from the first wireless transmission device to the second wireless transmission device.

The integrated circuit in another aspect of the present invention is an integrated circuit used in a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, the integrated circuit being included in one of the first and second wireless transmission devices. To be more specific, the integrated circuit includes: a receiving unit which receives a location specification message indicating a location of the source device; and a selecting unit which selects a connection mode applied between the first and second wireless transmission devices, on the basis of the location of the source device indicated by the location specification message received by the receiving unit, and establishes a connection according to the selected connection mode. When the source device is located on a side of the second wireless transmission device, the selecting unit selects a first wireless connection mode so that at least the video data, out of the video data and the audio data, is wirelessly transmitted in a direction from the second wireless transmission device to the first wireless transmission device. When the source device is located on a side of the first wireless transmission device, the selecting unit selects a second wireless connection mode so that only the audio data, out of the video data and the audio data, is wirelessly transmitted in a direction from the first wireless transmission device to the second wireless transmission device.

Advantageous Effects of Invention

The wireless transmission method for audio-video data according to the present invention is capable of automatically change a wireless connection between an audio-video output device (TV) and an audio output device (AV amplifier).

BRIEF DESCRIPTION OF DRAWINGS

FIG. 2 is a block diagram showing an example of a configuration of a wireless transmission device 101 in the first embodiment according to the present invention.

FIG. 3 is a block diagram showing an example of a configuration of a wireless transmission device 102 in the first embodiment according to the present invention.

FIG. 8 is a diagram showing an example of a flow of audio and video data outputted from the audio-video reproduction device 104 in the first embodiment according to the present invention.

FIG. 9 is a diagram showing an example of a sequence performed when the audio and video data is transmitted from the audio-video reproduction device 104 in the first embodiment according to the present invention.

DESCRIPTION OF EMBODIMENTS

Embodiment 1

Figure 1:
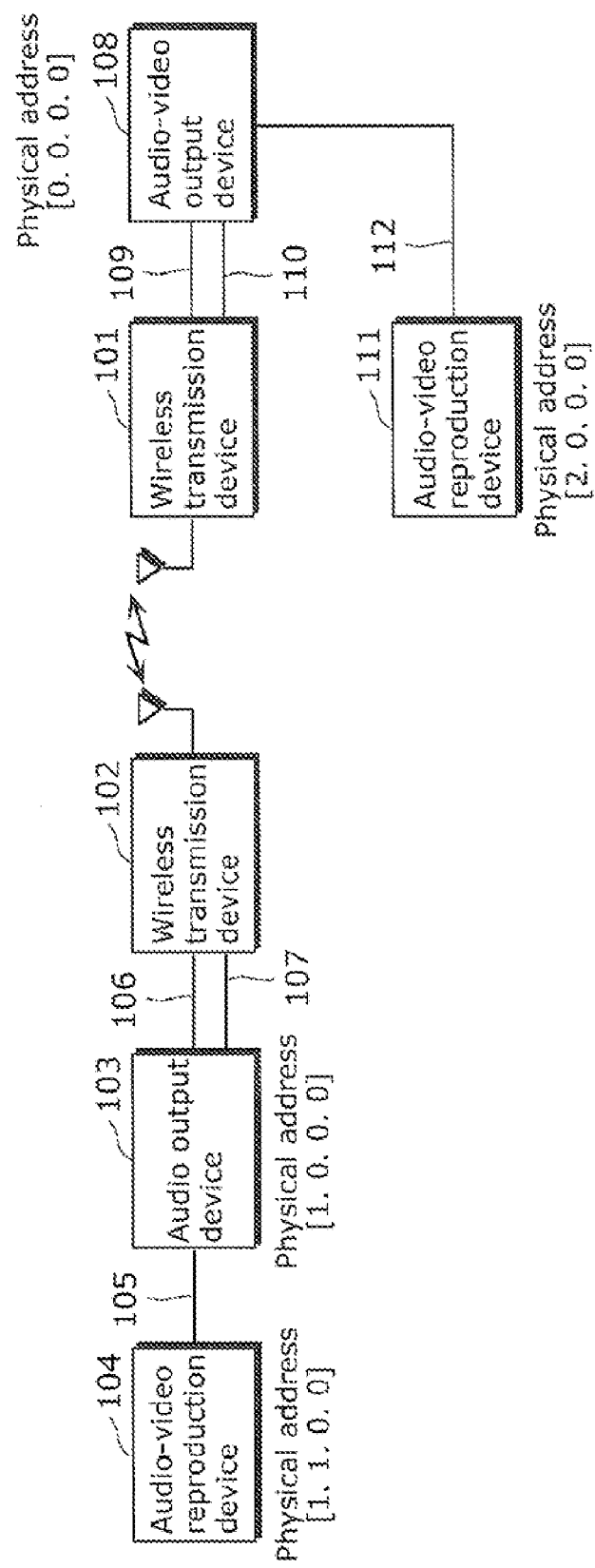
FIG. 1 is a block diagram showing a configuration of a wireless transmission system which wirelessly transmits audio-video data using a wireless transmission method for the audio-video data, in a first embodiment according to the present invention.

FIG. 1 is a block diagram showing an example of a configuration of a wireless transmission system which wirelessly transmits audio-video data using a wireless transmission method for the audio-video data, in the first embodiment according to the present invention. The wireless transmission system shown in FIG. 1 includes wireless transmission devices 101 and 102, an audio output device 103, audio-video reproduction devices 104 and 111, and an audio-video output device 108. It should be noted that one of the audio-video reproduction devices 104 and 111 and the audio-video output device 108 is capable of serving as a source device which supplies audio-video data.

When the audio-video reproduction device 104 serves as the source device, the audio-video reproduction device 111 is not an essential component and thus can be omitted. When the audio-video reproduction device 111 serves as the source device, the audio-video reproduction device 104 is not an essential component and thus can be omitted. When the audio-video output device 108 serves as the source device, the audio-video reproduction devices 104 and 111 are not essential components and thus can be omitted.

In FIG. 1, video data, audio data, and control commands can be sent and received wirelessly between the wireless transmission devices 101 and 102.

The audio output device 103 is capable of outputting audio based on the audio data. An example of the audio output device 103 includes, but is not limited particularly to, an Audio/Visual (AV) amplifier.

The audio-video reproduction devices 104 and 111 are capable of reproducing audio and video data and supplying the audio and video data to another device (for example, the audio data to the audio output device 103 and the video data to the audio-video output device 108). Examples of the audio-video reproduction devices 104 and 111 include, but are not limited particularly to, a Blu-ray Disc (BD) player and a Digital Versatile Disc (DVD) player.

The audio-video output device 108 is capable of displaying video based on the video data and outputting audio based on the audio data. Also, the audio-video output device 108 is capable of receiving a broadcast wave from a broadcast station which is not illustrated, and supplying the audio-video data included in the broadcast wave to another device (for example, the video data to the audio-video output device 108 itself and the audio data to the audio output device 103).

Figure 24:
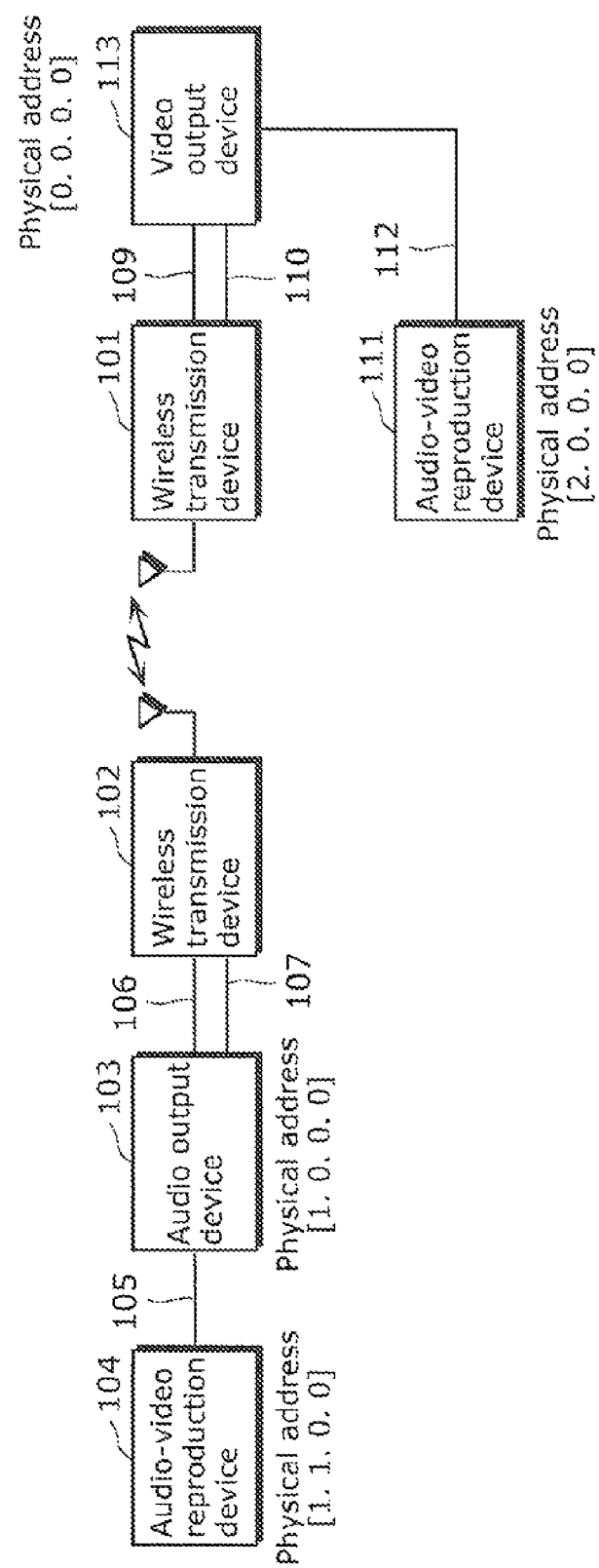
FIG. 24 is a block diagram showing another example of the wireless transmission system shown in FIG. 1.

An example of the audio-video output device 108 includes, but is not limited particularly to, a television (TV). Alternatively, as shown in FIG. 24, the wireless transmission system in another embodiment according to the present invention may include a video output device 113 capable of outputting only video (typically, a projector) in place of the audio-video output device 108 shown in FIG. 1. That is to say, a device connected to the wireless transmission device 101 via a wired connection only have to be capable of outputting at least video.

Audio-video transmission cables 105, 106, 109, and 112 are, for example, High Definition Multimedia Interface (HDMI) cables capable of transmitting the audio and video data. Audio transmission cables 107 and 110 are, for example, Sony Philips Digital Interface (SPDIF) cables capable of transmitting the audio data.

The audio-video reproduction device 104 and the audio output device 103 are connected via the audio-video transmission cable 105. The audio and video data can be transmitted unidirectionally from the audio-video reproduction device 104 to the audio output device 103, and the control commands can be transmitted bidirectionally between the audio-video reproduction device 104 and the audio output device 103.

The audio output device 103 and the wireless transmission device 102 are connected via the audio-video transmission cable 106. The audio and video data can be transmitted unidirectionally from the audio output device 103 to the wireless transmission device 102, and the control commands can be transmitted bidirectionally between the audio output device 103 and the wireless transmission device 102. Also, the audio output device 103 and the wireless transmission device 102 are connected via the audio transmission cable 107. The audio data can be transmitted unidirectionally from the wireless transmission device 102 to the audio output device 103.

The wireless transmission devices 101 and 102 perform wireless transmission according to a method based on, for example, a wireless high-definition standard called WirelessHD. To be more specific, the wireless transmission devices 101 and 102 switch between a High Rate PHY (HRP) and a Low Rate PHY (LRP) as needed when performing wireless transmission. The HRP has a bandwidth of 4.0 G (bps) and is capable of wireless transmission only in one direction (from the wireless transmission device 102 to the wireless transmission device 101). In the first embodiment, video data which is uncompressed and audio data is mainly transmitted wirelessly using the HRP. The LRP has a bandwidth of 40 M (bps) and is capable of bidirectional wireless transmission. In the first embodiment, the audio data and the control commands such as a Consumer Electronics Control (CEC) message are mainly transmitted wirelessly using the LRP.

The wireless transmission device 101 and the audio-video output device 108 are connected via the audio-video transmission cable 109. The audio and video data can be transmitted unidirectionally from the wireless transmission device 101 to the audio-video output device 108, and the control commands can be transmitted bidirectionally between the wireless transmission device 101 and the audio-video output device 108. Also, the wireless transmission device 101 and the audio-video output device 108 are connected via the audio transmission cable 110. The audio data can be transmitted unidirectionally from the audio-video output device 108 to the wireless transmission device 101.

The audio-video output device 108 and the audio-video reproduction device 111 are connected via the audio-video transmission cable 112. The audio and video data can be transmitted unidirectionally from the audio-video reproduction device 111 to the audio-video output device 108, and the control commands can be transmitted bidirectionally between the audio-video reproduction device 111 and the audio-video output device 108.

The wireless transmission system shown FIG. 1 has two output modes (a theater mode and a normal mode). In the theater mode, the audio-video output device 108 displays video and the audio output device 103 outputs audio. In the normal mode, the audio-video output device 108 displays video and an internal speaker of the audio-video output device 108 outputs audio. The mode switching may be performed manually for each of the devices. Alternatively, the mode switching may be performed manually on one of the devices and then this manually-set mode may be informed to the other devices by the present device. In the case of the wireless transmission system shown in FIG. 24, the video is always displayed by the video output device 113 and the audio is always outputted from the audio output device 103 (that is, only the theater mode is used).

A CEC physical address (simply referred to as the "physical address" hereafter) defined by the HDMI standard is assigned to each of the audio-video output device 108, the audio output device 103, and the audio-video reproduction devices 104 and 111. A physical address [0. 0. 0. 0] is assigned to the audio-video output device 108. A physical address [1. 0. 0. 0] is assigned to the audio output device 103 which is connected on an input side of the audio-video output device 108. A physical address [2. 0. 0. 0] is assigned to the audio-video reproduction device 111 which is connected on the input side of the audio-video output device 108. A physical address [1. 1. 0. 0] is assigned to the audio-video reproduction device 104 which is connected on an input side of the audio output device 103. It should be noted that the first embodiment only describes an example of assigning the physical addresses. Depending on how the devices are interconnected, physical addresses other than the aforementioned addresses may be assigned to the devices. In such a case, the same processing as in the first embodiment can also be performed.

FIG. 2 is a block diagram showing an example of a configuration of the wireless transmission device 101 in the first embodiment according to the present invention. In FIG. 2, the wireless transmission device 101 includes: a wireless packet sending-receiving circuit 202 having an antenna 206; a packet processing circuit 203, a wired sending-receiving circuit 204 having a function of sending audio and video data; a wired audio receiving circuit 205 having a function of receiving audio data; and a controller 201 controlling operations of these circuits 202 to 205.

The antenna 206 outputs, to the wireless packet sending-receiving circuit 202, a carrier signal wirelessly received from the wireless transmission device 102. Also, the antenna 206 wirelessly transmits, to the wireless transmission device 102, a carrier signal received from the wireless packet sending-receiving circuit 202.

The wireless packet sending-receiving circuit 202 demodulates the carrier signal received via the antenna 206 into a baseband signal, and then outputs the baseband signal to the packet processing circuit 203. Also, the wireless packet sending-receiving circuit 202 modulates the baseband signal received from the packet processing circuit 203 into a carrier signal, and then outputs the carrier signal to the antenna 206.

The packet processing circuit 203 extracts audio and video data and only a predetermined control command from the baseband signal received from the wireless packet sending-receiving circuit 202, according to predetermined packet separation processing to decode the received packet. Then, the packet processing circuit 203 outputs the audio and video data to the wired sending-receiving circuit 204, and also outputs the control command to the controller 201. Moreover, the packet processing circuit 203 converts the audio data received from the wired audio receiving circuit 205 or the control command received from the controller 201 into a digital signal in a predetermined packet format, and then outputs the digital signal to the wireless packet sending-receiving circuit 202.

The wired sending-receiving circuit 204 receives the audio-video data or only the audio data from the wireless transmission device 102 via the antenna 206, the wireless packet sending-receiving circuit 202, and the packet processing circuit 203. Then, the wired sending-receiving circuit 204 converts the received data into a data format corresponding to the audio-video transmission cable 109, and then outputs the data to the audio-video transmission cable 109. Moreover, the wired sending-receiving circuit 204 relays the CEC message between the audio-video output device 108 and the controller 201, using a CEC signal line of the audio-video transmission cable 109.

The wired audio receiving circuit 205 outputs, to the packet processing circuit 203, the audio data received from the audio-video output device 108 via the audio transmission cable 110.

When a wireless signal is received via the antenna 206 or when the wired audio receiving circuit 205 receives the audio data, the controller 201 exchanges control data with the wireless packet sending-receiving circuit 202, the packet processing circuit 203, the wired sending-receiving circuit 204, and the wired audio receiving circuit 205 to control these circuits 202 to 205. Also, the controller 201 sends and receives the control commands to and from the wireless transmission device 102 via the antenna 206, the wireless packet sending-receiving circuit 202, and the packet processing circuit 203. Moreover, the controller 201 sends and receives the control commands to and from the audio-video output device 108 via the wired sending-receiving circuit 204.

Here, the antenna 206, the wireless packet sending-receiving circuit 202, the packet processing circuit 203, and the wired sending-receiving circuit 204 serve as receiving units to receive the CEC messages which are the control commands. The controller 201 serves as a connection-mode selection unit which selects the connection mode applied between the wireless transmission devices 101 and 102 on the basis of the CEC messages received by the receiving units, and accordingly connects the wireless transmission devices 101 and 102 in the selected connection mode. These functions are described in detail later.

FIG. 3 is a block diagram showing an example of a configuration of the wireless transmission device 102 in the first embodiment according to the present invention. In FIG. 3, the wireless transmission device 102 includes: a wireless packet sending-receiving circuit 302 having an antenna 306; a packet processing circuit 303; a wired sending-receiving circuit 304 having a function of receiving audio and video data; a wired audio sending circuit 305 having a function of sending audio data; and a controller 301 controlling operations of these circuits 302 to 305.

It should be noted that the components 301 to 306 shown in FIG. 3 respectively correspond to the components 201 to 206 shown in FIG. 1 with the same names as the components 301 to 306. Therefore, a detailed description of the identical functions is omitted and the points of difference are mainly described in detail hereafter.

The wired sending-receiving circuit 304 outputs, to the packet processing circuit 303, the audio and video data received from the audio output device 103 via the audio-video transmission cable 106. Also, the wired sending-receiving circuit 304 relays the CEC message between the audio output device 103 and the controller 301, using a CEC signal line of the audio-video transmission cable 106.

The packet processing circuit 303 converts the audio and video data received from the wired sending-receiving circuit 304 into a digital signal in a predetermined packet format, and then outputs the digital signal to the wireless packet sending-receiving circuit 302. Moreover, the packet processing circuit 303 extracts only a predetermined control command from the baseband signal received from the wireless packet sending-receiving circuit 302, according to the predetermined packet separation processing. Then, the packet processing circuit 303 outputs the extracted control command to the controller 301. Moreover, when audio data is included in the received baseband signal, the packet processing circuit 303 outputs the audio data to the wired audio sending circuit 305.

The wireless packet sending-receiving circuit 302 modulates the baseband signal received from the packet processing circuit 303 into a carrier signal, and then wirelessly transmits the modulated wireless signal to the wireless transmission device 101 via the antenna 306. Also, the wireless packet sending-receiving circuit 302 demodulates the carrier signal received from the wireless transmission device 101 via the antenna 306 into a baseband signal, and then outputs the baseband signal to the packet processing circuit 303.

The wired audio sending circuit 305 outputs the audio data received from the packet processing circuit 303 to the audio output device 103 via the audio transmission cable 107.

The controller 301 exchanges control data with the wired sending-receiving circuit 304, the packet processing circuit 303, the wireless packet sending-receiving circuit 302, and the wired audio sending circuit 305 to control these circuits 302 to 305.

Figure 4:
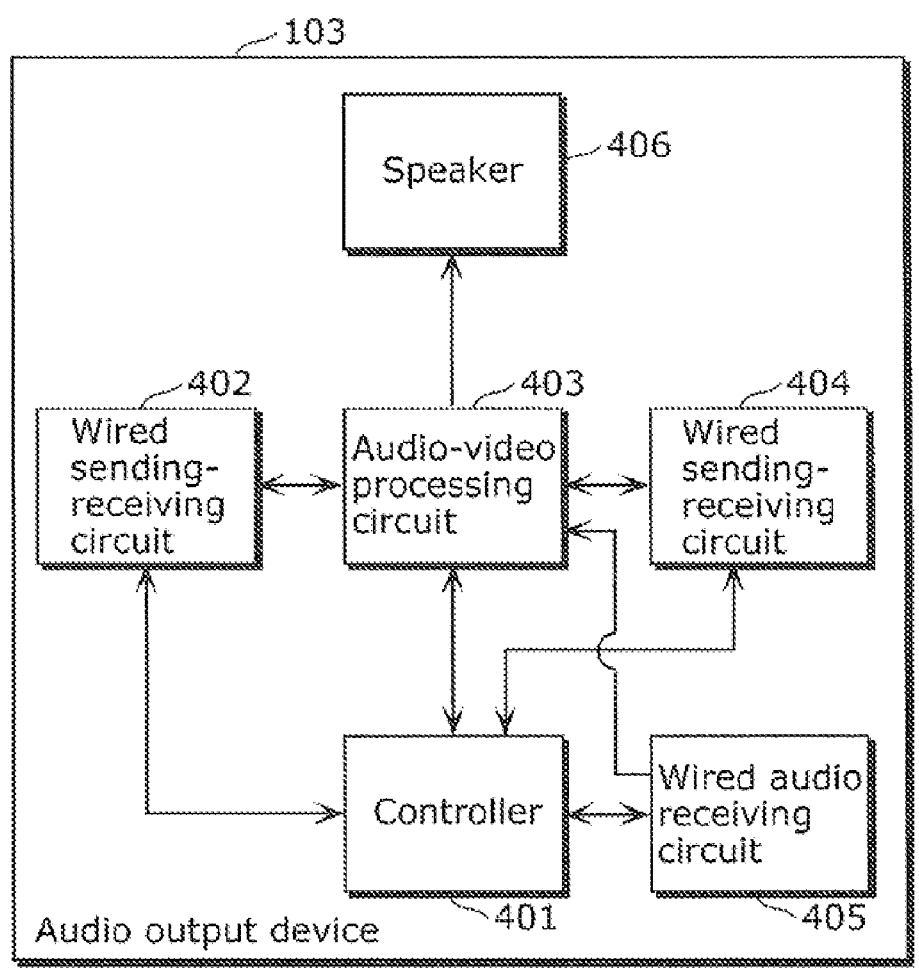
FIG. 4 is a block diagram showing an example of a configuration of an audio output device 103 in the first embodiment according to the present invention.

FIG. 4 is a block diagram showing an example of a configuration of the audio output device 103 in the first embodiment according to the present invention. In FIG. 4, the audio output device 103 includes: a wired sending-receiving circuit 402 having a function of receiving audio and video data; an audio-video processing circuit 403; a wired sending-receiving circuit 404 having a function of sending audio and video data; a wired audio receiving circuit 405 having a function of receiving audio data; a speaker 406; and a controller 401 controlling operations of these circuits 402 to 405.

Firstly, an operation performed when the data is received from the audio-video reproduction device 104 via the audio-video transmission cable 105 is explained.

The wired sending-receiving circuit 402 outputs, to the audio-video processing circuit 403, the audio and video data received from the audio-video reproduction device 104 via the audio-video transmission cable 105. Also, the wired sending-receiving circuit 402 relays the CEC message between the audio-video reproduction device 104 and the controller 401, using a CEC signal line of the audio-video transmission cable 105.

The wired sending-receiving circuit 404 converts the audio-video data or the video data received from the audio-video processing circuit 403 into data in a predetermined data format, and then outputs the data to the wireless transmission device 102 via the audio-video transmission cable 106. Also, the wired sending-receiving circuit 404 relays the CEC message between the wireless transmission device 102 and the controller 401, using the CEC signal line of the audio-video transmission cable 106.

In the theater mode, according to an instruction from the controller 401, the audio-video processing circuit 403 performs predetermined signal processing and D/A conversion processing on the audio data received from the wired sending-receiving circuit 402 or from the wired audio receiving circuit 405 and, after this, outputs the audio data to the speaker 406. Also, the audio-video processing circuit 403 outputs the video data received from the wired sending-receiving circuit 402 to the wired sending-receiving circuit 404. In the normal mode, according to an instruction from the controller 401, the audio-video processing circuit 403 outputs the audio and video data received from the wired sending-receiving circuit 402 to the wired sending-receiving circuit 404.

Next, an operation performed when the audio data is received from the wireless transmission device 102 via the audio transmission cable 107 is explained.

The wired audio receiving circuit 405 outputs, to the audio-video processing circuit 403, the audio data received from the wireless transmission device 102 via the audio transmission cable 107. Here, in the theater mode, according an instruction from the controller 401, the audio-video processing circuit 403 performs the predetermined signal processing and D/A conversion processing on the received audio data and, after this, outputs the audio data to the speaker 406. In the normal mode, according to an instruction from the controller 401, the audio-video processing circuit 403 abandons the received audio data.

The controller 401 exchanges control data with the wired sending-receiving circuit 402, the audio-video processing circuit 403, the wired sending-receiving circuit 404, and the wired audio receiving circuit 405 to control these circuits 402 to 405.

Figure 5:
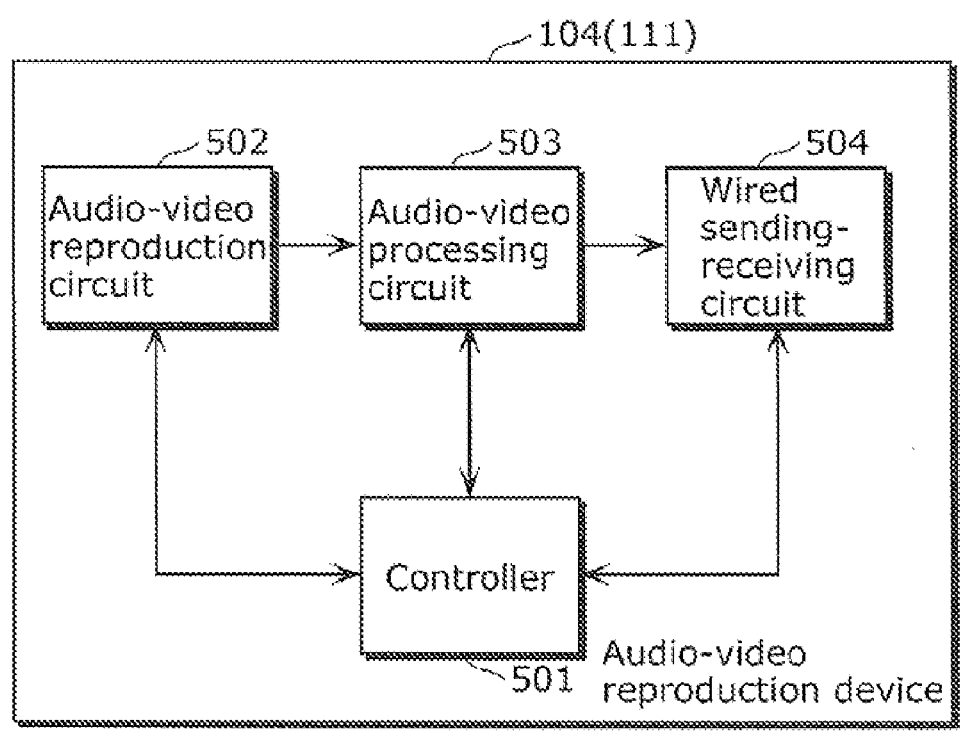
FIG. 5 is a block diagram showing an example of a configuration of an audio-video reproduction device 104 or 111 in the first embodiment according to the present invention.

FIG. 5 is a block diagram showing an example of a configuration of the audio-video reproduction device 104 in the first embodiment according to the present invention. In FIG. 5, the audio-video reproduction device 104 includes: an audio-video reproduction circuit 502; an audio-video processing circuit 503; a wired sending-receiving circuit 504 having a function of sending audio and video data; and a controller 501 controlling operations of these circuits 502 to 504.

The audio-video reproduction circuit 502 is, for example, a DVD drive, and reproduces audio and video data from a recording medium, such as a DVD, to output the audio and video data to the audio-video processing circuit 503. The audio-video processing circuit 503 performs the predetermined signal processing on the audio and video data received from the audio-video reproduction circuit 502 and, after this, outputs the audio and video data to the wired sending-receiving circuit 504.

The wired sending-receiving circuit 504 converts the audio and video data received from the audio-video processing circuit 503 into a data format corresponding to the audio-video transmission cable 105, and then outputs the data to the audio-video transmission cable 105. Also, the wired sending-receiving circuit 504 relays the CEC message between the audio output device 103 and the controller 501, using the CEC signal line of the audio-video transmission cable 105. Moreover, the controller 501 exchanges control data with the audio-video reproduction circuit 502, the audio-video processing circuit 503, and the wired sending-receiving circuit 504 to control these circuits 502 to 504.

It should be noted that the audio-video reproduction device 111 is identical to the audio-video reproduction device 104, except that the audio-video reproduction device 111 is connected to the audio-video output device 108 via the audio-video transmission cable 112. Therefore, the description on the audio-video reproduction device 111 is omitted.

Figure 6:
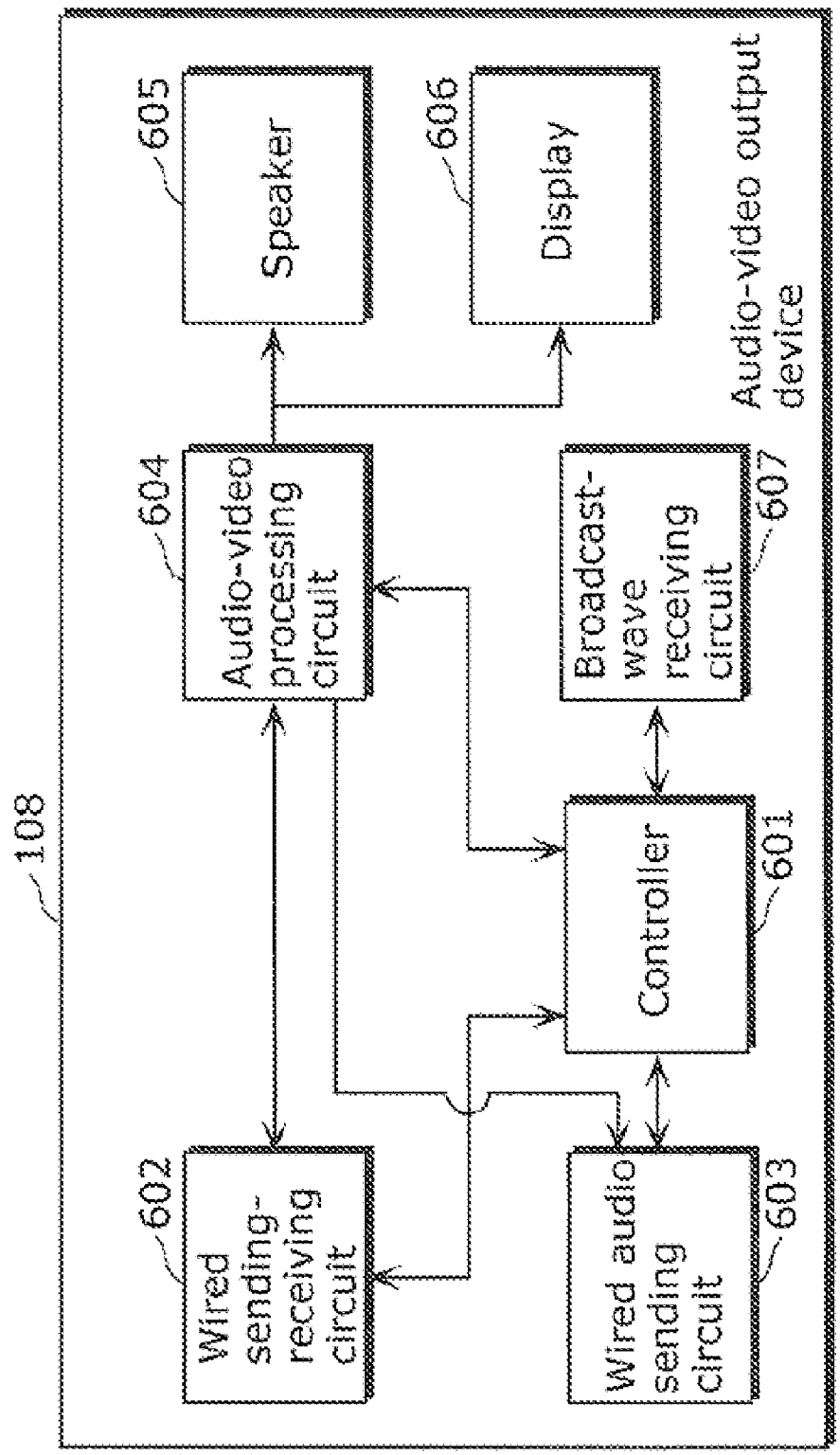
FIG. 6 is a block diagram showing an example of a configuration of an audio-video output device 108 in the first embodiment according to the present invention.

FIG. 6 is a block diagram showing a configuration of the audio-video output device 108 in the first embodiment according to the present invention.

In FIG. 6, the audio-video output device 108 includes: a wired sending-receiving circuit 602 having a function of receiving audio and video data; a wired audio sending circuit 603 having a function of sending the audio data; an audio-video processing circuit 604; a speaker 605; a display 606; a broadcast-wave receiving circuit 607; and a controller 601 controlling operations of these circuits 602 to 604 and 607. It should be noted that the video output device 113 shown in FIG. 24 is identical to the audio-video output device 108, except that the video output device 113 does not include the speaker 605.

Firstly, an operation performed by the audio-video output device 108 when the audio and video data is received via the audio-video transmission cable 109 or 112 is explained.

The wired sending-receiving circuit 602 outputs, to the audio-video processing circuit 604, the audio-video data or the video data received from the wireless transmission device 101 via the audio-video transmission cable 109. Also, the wired sending-receiving circuit 602 outputs, to the audio-video processing circuit 604, the audio and video data received from the audio-video reproduction device 111 via the audio-video transmission cable 112. Moreover, the wired sending-receiving circuit 602 relays the CEC message between the wireless transmission device 101 and the controller 601, using the CEC signal line of the audio-video transmission cable 109. Furthermore, the wired sending-receiving circuit 602 relays the CEC message between the audio-video reproduction device 111 and the controller 601, using the CEC signal line of the audio-video transmission cable 112.

The audio-video processing circuit 604 performs the predetermined signal processing and D/A conversion processing on the video data received from the wired sending-receiving circuit 602 and, after this, outputs the video data to the display 606 to display the video. In the normal mode, the audio-video processing circuit 604 performs the predetermined signal processing and D/A conversion processing on the audio data received from the wired sending-receiving circuit 602 and, after this, outputs the audio data to the speaker 605 and to the wired audio sending circuit 603 as well. In the theater mode, the audio-video processing circuit 604 outputs the audio data received from the wired sending-receiving circuit 602 to the wired audio sending circuit 603 without outputting to the speaker 605. Note that the audio-video processing circuit 604 of the video output device 111 always outputs the audio data to the wired audio sending circuit 603.

The wired audio sending circuit 603 outputs the audio data received from the audio-video processing circuit 604 to the wireless transmission device 101 via the audio transmission cable 110. The controller 601 exchanges control data with the wired sending-receiving circuit 602, the wired audio sending circuit 603, the audio-video processing circuit 604, and the broadcast-wave receiving circuit 607 to control these circuits 602 to 604 and 607.

Next, an operation performed by the audio-video output device 108 when a broadcast wave is received is explained.

The broadcast-wave receiving circuit 607 receives the broadcast wave, and performs the predetermined signal processing on the broadcast wave to obtain audio and video data. Then, the broadcast-wave receiving circuit 607 outputs the audio and video data to the audio-video processing circuit 604. Examples of the broadcast wave which can be received include, but are not limited particularly to, broadcast waves of: analog broadcasting; digital terrestrial broadcasting; Broadcast Satellite (BS) broadcasting; and Communication Satellite (CS) broadcasting. Note, however, that the broadcast-wave receiving circuit 607 is not an essential component in the audio-video output device 108 and the video output device 113 and thus can be omitted.

The audio-video processing circuit 604 performs the predetermined signal processing and D/A conversion processing on the video data and, after this, outputs the video data to the display 606 to display the video. In the normal mode, the audio-video processing circuit 604 performs the predetermined signal processing and D/A conversion processing on the received audio data and, after this, outputs the audio data to the speaker 605 and to the wired audio sending circuit 603 as well. In the theater mode, the audio-video processing circuit 604 outputs the audio data to the wired audio sending circuit 603 without outputting to the speaker 605.

It should be noted that each of the circuits shown in FIGS. 2 to 6 can be replaced with a processing unit which implements the processing of the circuit using a program in whole or in part.

Figure 7A:
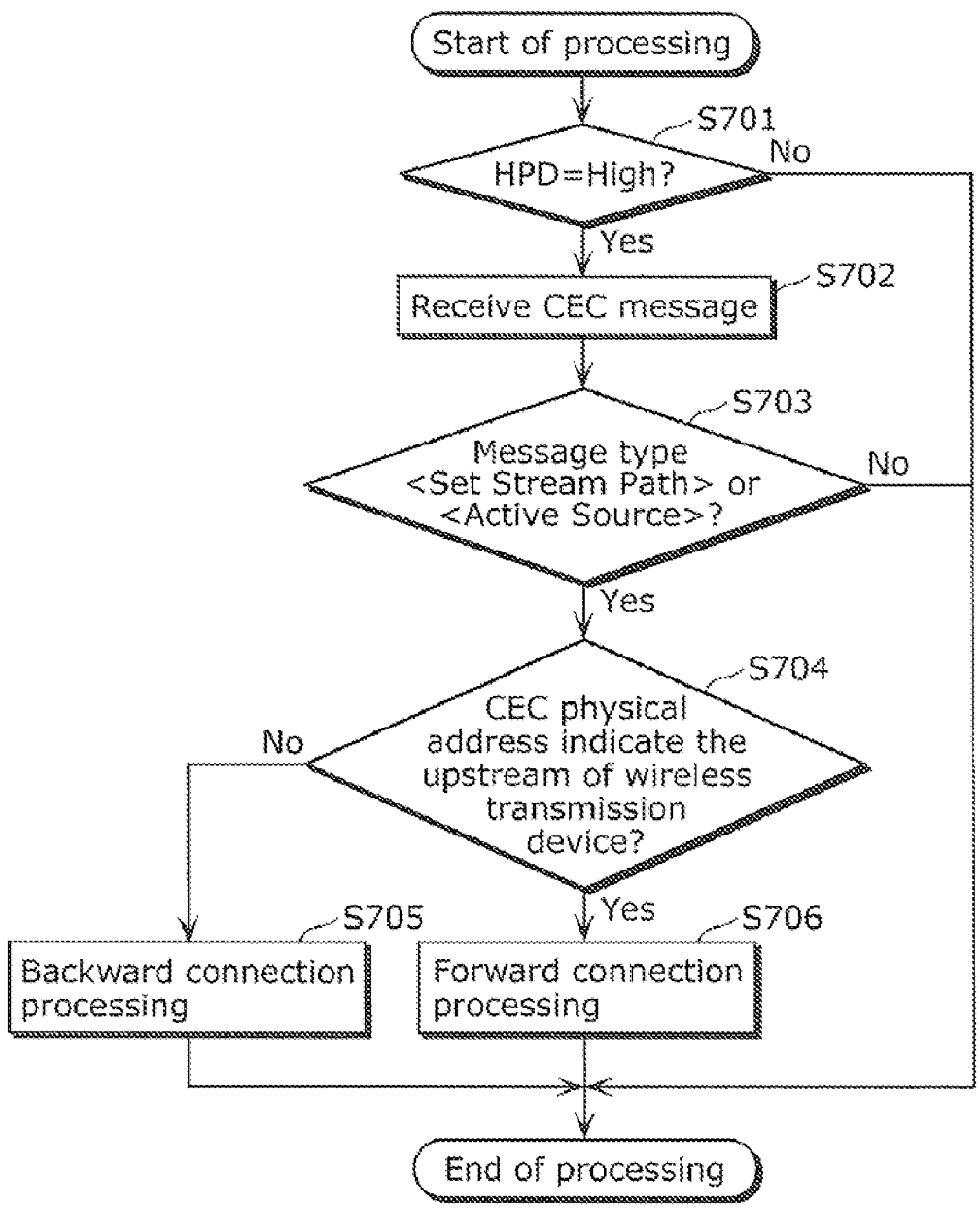
FIG. 7A is an example of a flowchart showing connection processing performed by the wireless transmission device 101 in the first embodiment according to the present invention.

FIG. 7A is an example of a flowchart showing processing performed by the controller 201 serving as the connection-mode selection unit in the wireless transmission device 101.

The controller 201 first obtains, from the wired sending-receiving circuit 204, a state of a Hot Plug Detect (HPD) signal line of the audio-video transmission cable 109 (S701). When a signal level of the HPD signal line is "Low" (No in S701), the controller 201 determines that the audio-video output device 108 is in a stopped state and thus terminates the processing. On the other hand, when the signal level of the HPD signal line is "High" (Yes in S701), the controller 201 determines that the audio-video output device 108 is in an operating state and thus waits to receive a CEC message (S702).

Similarly, the wireless transmission device 102 determines whether or not the audio output device 103 is operating. In this case, the controller 301 of the wireless transmission device 102 obtains, from the wired sending-receiving circuit 304, a signal level of a "+5V POWER" signal line of the audio-video transmission cable 106 to make the determination.

Next, when receiving the CEC message via the antenna 206, the wireless packet sending-receiving circuit 202, and the packet processing circuit 203, or via the wired sending-receiving circuit 204 (S702), the controller 201 determines whether the received CEC message is a "Set Stream Path" message or an "Active Source" message by reference to an operation code of the received CEC message (S703). In the present example, the "Set Stream Path" message and the "Active Source" message are used as only examples of a location specification message. The location specification message is not limited to these examples. These examples may be replaced with any kind of messages which can specify the location of the source device.

When the received CEC message is not either of the above messages (No in S703), the controller terminates the processing. When the received CEC message is either one of the above messages (Yes in S703), the controller 201 verifies the physical address included in an operand field of the received message (S704). In the present example, a CEC physical address is described as an example of the physical address. Note that the physical address included in the operand field of the CEC message refers to the physical address of the source device which outputs the audio and video data.

When the physical address indicates a device connected on the input side (referred to as "upstream" hereafter) of the wireless transmission device 102 (Yes in S704), the controller 201 executes forward connection processing (S706). On the other hand, when the physical address does not indicate a device connected upstream of the wireless transmission device 102 (No in S704), the controller 201 executes backward connection processing (S705).

Here, the "forward connection" refers to a first wireless connection mode in which, when the source device is located on the input side of the wireless transmission device 102, wireless transmission is performed using the HRP in the direction from the wireless transmission device 102 to the wireless transmission device 101. In this case, the data wirelessly transmitted is: both the audio data and the video data (in the normal mode); or only the video data (in the theater mode).

The "backward connection" refers to a second wireless connection mode in which, when the source device is located on an output side of the wireless transmission device 101, wireless transmission is performed using the LRP in the direction from the wireless transmission device 101 to the wireless transmission device 102. In this case, the data wirelessly transmitted is only the audio data (both in the normal mode and the theater mode).

In the first embodiment, the audio output device 103 with the physical address [1. 0. 0. 0] and the audio-video reproduction device 104 with the physical address [1. 1. 0. 0] are connected on the input side (upstream) of the wireless transmission device 102. That is to say, the controller 201 determines whether or not the physical address set in the operand field of the received CEC message is [1. x. x. x] (where x is a natural number).

Here, an example of the method for assigning a physical address is described. Firstly, a physical address [0. 0. 0. 0] is assigned, by default, to the audio-video output device 108 serving as a root device. Next, the wireless transmission device 101 connected to the wired sending-receiving circuit 602 of the audio-video output device 108 via the audio-video transmission cable 109 reads Extended Display Identification Data (EDID) (configuration information on the display unit) of the audio-video output device 108 to make a reference to the physical address included in the EDID. As a result, the wireless transmission device 101 can detect the physical address [1. 0. 0. 0] assigned to the device connected to the wired sending-receiving circuit 602. Moreover, the wireless transmission device 101 stores the read EDID into the controller 201, and also wirelessly transmits the read EDID to the wireless transmission device 102.

Then, the wireless transmission device 102 sets the physical address included in the EDID received from the wireless transmission device 101 into the EDID of the wireless transmission device 102 itself. Accordingly, the physical address [1. 0. 0. 0] is assigned to the audio output device 103 connected on the input side of the wireless transmission device 102. Moreover, according to the conventional assignment method, the physical address [1. 1. 0. 0] is assigned to the audio-video reproduction device 104 connected to the audio output device 103.

Note that the physical addresses mentioned above are only examples. Thus, with different physical addresses other than the aforementioned addresses, the wireless transmission device 101 can determine, by performing the same processing as described, whether the detected physical address is the one assigned to the device connected upstream of the wireless transmission device 102.

Here, the "input side" and "upstream" refer to a side where an HDMI source device is connected. To be more specific, each of the audio output device 103 and the audio-video reproduction device 104 serves as the source device for the wireless transmission device 102. This means that each of the audio output device 103 and the in audio-video reproduction device 104 is connected on the input side (i.e., upstream) of the wireless transmission device 102. Similarly, each of the wireless transmission device 101 and the audio-video reproduction device 111 serves as the source device for the audio-video output device 108. This means that each of the wireless transmission device 101 and the audio-video reproduction device 111 is connected on the input side (i.e., upstream) of the audio-video output device 108. Also, relations between the other devices can be similarly described by reference to connection states of the audio-video transmission cables 105, 106, 109, and 112. Note that "output side" and "downstream" as antonyms of the above refer to a side where an HDMI sink device is connected.

Figure 7B:
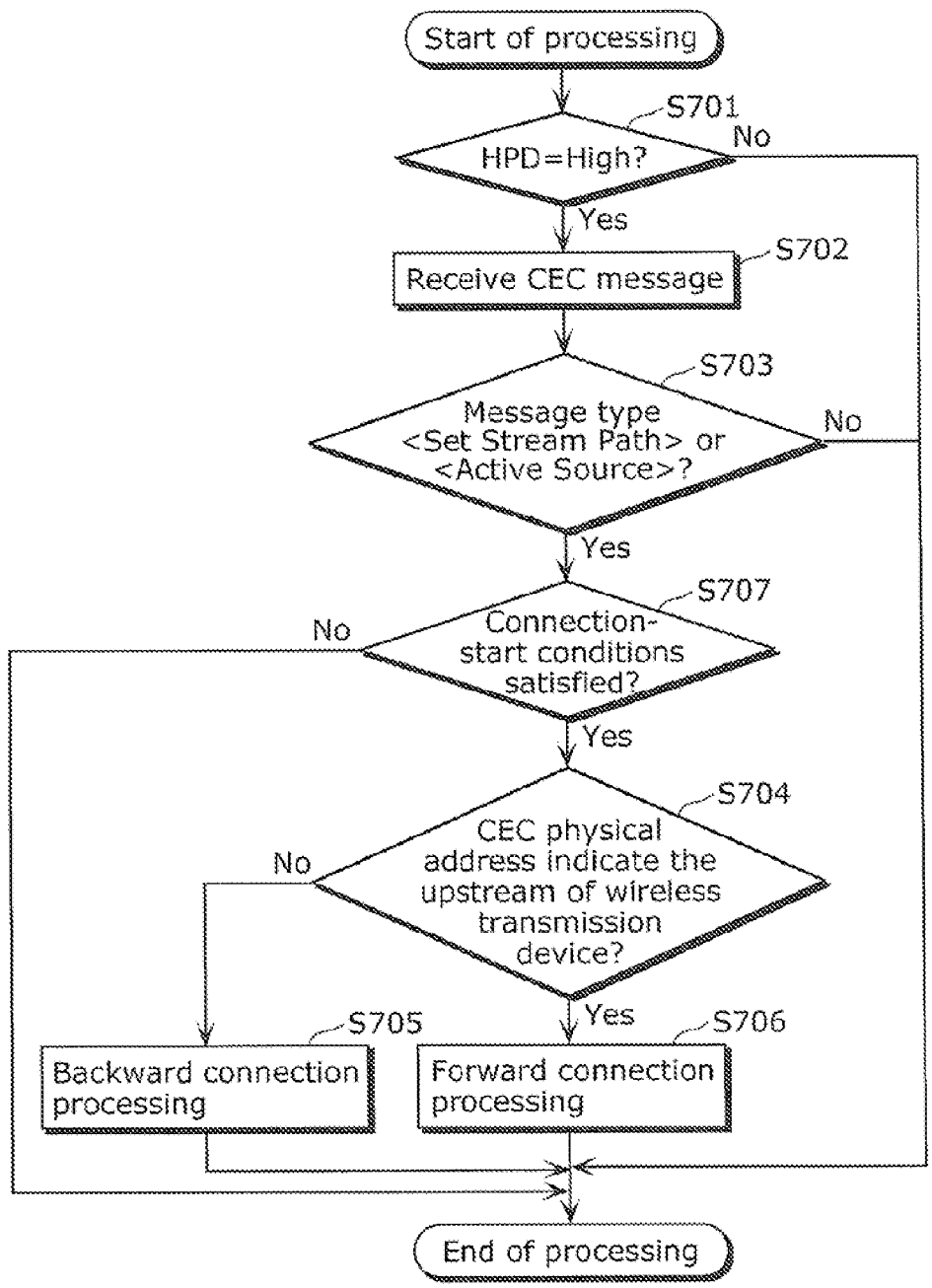
FIG. 7B is another example of a flowchart showing the connection processing performed by the wireless transmission device 101 in the first embodiment according to the present invention.

FIG. 7B is another example of a flowchart showing the processing performed by the controller 201 serving as the connection-mode selection unit in the wireless transmission device 101. The flowchart shown in FIG. 7B is different from the flowchart shown in FIG. 7A in that processing to determine whether or not conditions for starting a connection are satisfied (S707) is added between S703 and S704. In the following, description of the points identical to those shown in FIG. 7A is omitted and the points of difference are mainly described.

The controller 201 verifies connection-start conditions (S707). When all the connection-start conditions are satisfied (Yes in S707), the controller 201 executes the processing to verify the physical address included in the operand field of the received message (S704). When any of the connection-start conditions is not satisfied (No in S707), the controller 201 skips the subsequent processing.

Specific examples of the connection-start conditions and a method of verifying these conditions are described later. It should be noted that the connection-start conditions may differ depending on, for example, a direction in which the data is sent and received between the wireless transmission devices 101 and 102 (that is, the forward connection or the backward connection). In this case, the processing to verify the connection-start conditions (S707) may be performed between S704 and S705 or between S704 and S706.

Next, processing performed when the audio-video reproduction device 104 serves as the source device is explained, with reference to FIGS. 8 to 12. FIG. 8 is a diagram showing a flow of audio and video data in the case where content reproduced by the audio-video reproduction device 104 is viewed in the theater mode. FIGS. 9 to 12 are diagrams showing processing sequences performed by the devices included in the wireless transmission system.

In the example shown in FIG. 8, the video data received from the audio-video reproduction device 104 is outputted by the display 606 of the audio-video output device 108 via the audio output device 103, the wireless transmission device 102, and the wireless transmission device 101. Also, the audio data received from the audio-video reproduction device 104 is outputted from the speaker 406 of the audio output device 103. Here, for the video data transmission, the forward connection needs to be established between the wireless transmission device 102 and the wireless transmission device 101.

For this purpose, before transmitting the audio and video data as described above, the audio-video reproduction device 104 broadcasts the "Active Source" message including the physical address [1. 1. 0. 0] of the audio-video reproduction device 104 in the operand field, for example. Alternatively, the audio-video output device 108 broadcasts the "Set Stream Path" message including the physical address [1. 1. 0. 0] of the audio-video reproduction device 104 in the operand field. The processing to establish the forward connection using these CEC messages is described with reference to FIGS. 9 to 12.

FIG. 9 is a diagram showing an example of a sequence performed when the "Set Stream Path" message is sent from the audio-video output device 108. The "Set Stream Path" message is a CEC message indicating that the device identified by the physical address set in the operand field is the source device. This CEC message may be sent from the source device itself (the audio-video reproduction device 104 in the present example), or may be sent from a different device (the audio-video output device 108 in the present example) other than the source device.

The wired sending-receiving circuit 602 of the audio-video output device 108 sends the "Set Stream Path" message to the CEC signal lines of the audio-video transmission cables 109 and 112. In the operand field of this CEC message, the physical address [1. 1. 0. 0] of the audio-video reproduction device 104 serving as the source device is set.

The wired sending-receiving circuit 204 of the wireless transmission device 101 receives this CEC message and then sends the CEC message to the controller 201. The controller 201 sends the CEC message received from the wired sending-receiving circuit 204 to the wireless transmission device 102 via the packet processing circuit 203, the wireless packet sending-receiving circuit 202, and the antenna 206. Then, this CEC message is relayed via the wireless transmission device 102 and the audio output device 103 to the audio-video reproduction device 104.

Also, the controller 201 verifies that the physical address [1. 1. 0. 0] included in the CEC message received from the wired sending-receiving circuit 204 is the physical address of the device connected upstream of the wireless transmission device 102.

Here, the controller 201 of the wireless transmission device 101 may determine whether or not the connection-start conditions are satisfied. In this example, the connection-start conditions may be the following (a1) to (d1). Note that these connection-start in conditions (a1) to (d1) can also be used in examples shown in FIGS. 10 to 12.

(a1) The entire system is operating in the theater mode.
(b1) The wireless transmission device 101 has a function of performing wired transmission of the video data.
(c1) The wireless transmission device 101 has a function of wirelessly receiving the video data.

(d1) The wireless transmission device 101 and the audio-video output device 108 are connected.

Firstly, the condition (a1) is verified as follows. The controller 201 of the wireless transmission device 101 exchanges the control signals with the controller 401 of the audio output device 103 and/or the controller 601 of the audio-video output device 108, and thus determines whether the system operates in the theater mode or the normal mode.

For example, the controller 601 of the audio-video output device 108 stores the current operation mode, that is, the theater mode or the normal mode. Here, the operation mode may be set by a user, for example. The controller 201 of the wireless transmission device 101 obtains the operation mode from the controller 601 of the audio-video output device 108. The transmission state information indicated by the connection-start conditions (b1) to (d1) can be verified on the basis of information held in the wireless transmission device 101 and, therefore, the detailed explanation is omitted here.

When all of the four connection-start conditions (a1) to (d1) are satisfied, the controller 201 proceeds to the processing to establish a wireless connection with the wireless transmission device 102. When any of the connection-start conditions (a1) to (d1) is not satisfied, the controller 201 terminates the processing without establishing a wireless connection with the wireless transmission device 102. In this case, the controller 201 may send a reason for not starting the wireless connection to the audio-video output device 108, so that the user can be notified of the reason via the display 606 or the speaker 605 of the audio-video output device 108. For example, when the connection-start condition (d1) is not satisfied, a message saying "The video cable is not connected" or "Connect the video cable to the display" is displayed on the display 606 or is given by voice via the speaker 605.

Next, the controller 201 sends, to the wireless transmission device 102 using the LRP, a connection request to establish the forward connection. More specifically, the controller 201 serving as the connection-mode selection unit selects the first wireless connection mode.

When receiving the connection request from the wireless transmission device 101, the wireless transmission device 102 sends, to the wireless transmission device 101 using the LRP, a connection response to allow the connection. Moreover, the wireless transmission device 102 reserves a wireless bandwidth (HRP) to transmit the video data. After this, the wireless transmission device 102 sends, to the wireless transmission device 101 using the LRP, a stream-start notification indicating that transmission of a video data stream is to be started.

As a result of the processing described thus far, the video data from the audio-video reproduction device 104 is transmitted to the audio-video output device 108 via the wireless forward connection. The above example is explained on the understanding that the system is in the theater mode. Note that the same processing is performed in the normal mode, except that both the audio and video data is wirelessly transmitted using the reserved wireless bandwidth.

Figure 28:
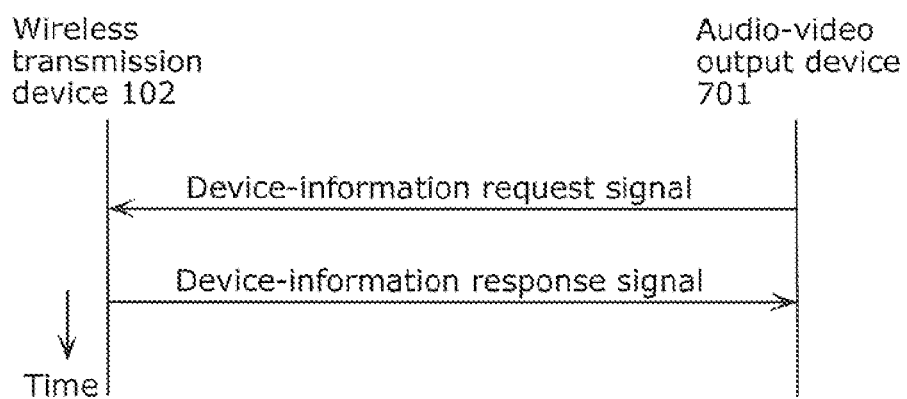
FIG. 28 is a diagram showing a sequence performed when the audio-video output device 701 obtains device information on the wireless transmission device 102, in the second embodiment according to the present invention.

Also, FIG. 9 describes the case, as an example, where the wireless transmission device 101 sends the connection request. However, the present invention is not limited to this case. The wireless transmission device 102 may send the connection request and thus the wireless transmission device 101 may send the connection response. In such a case, the connection-start conditions (a1) to (d1) may be verified by the wireless transmission device 102. A method of verifying the connection-start conditions (a1) to (d1) in this case is described later with reference to FIGS. 28 to 30. FIG. 28 describes the case, as an example, where a device-information request signal is sent from the wireless transmission device 101 and a device-information response signal is sent from the wireless transmission device 102. In this case, a signal is sent in the opposite direction.

The bandwidth reservation and the sending of the stream-start notification are executed by the data sending side, that is, the wireless transmission device 102 in the case of the forward connection and the wireless transmission device 101 in the case of the backward connection. The same can be applied in the sequences that follow.

Figure 10:
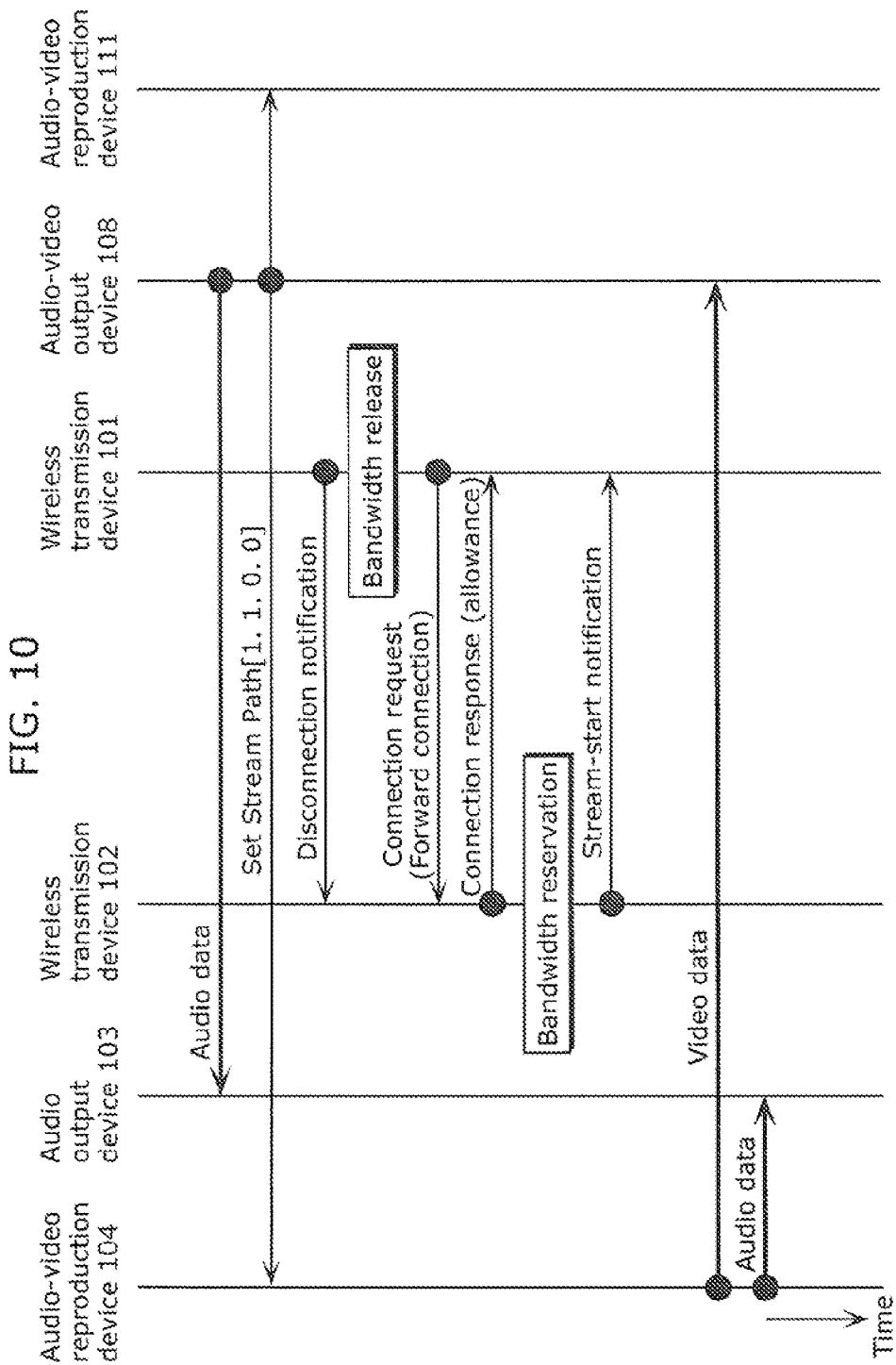
FIG. 10 is a diagram showing an example of a sequence performed when the audio and video data is transmitted from the audio-video reproduction device 104 in the first embodiment according to the present invention.

FIG. 10 is a diagram showing an example of a sequence performed to establish a new forward connection in the case where the backward connection has already been established to send the audio data. Such a situation can take place when, for example, content of a DVD inserted into the audio-video reproduction device 104 is about to be viewed in the theater mode while content received by the broadcast-wave receiving circuit 607 of the audio-video output device 108 is being viewed in the theater mode. In the following, a detailed description of the points identical to those in the sequence described above is omitted and the points of difference are described in detail.

Suppose that the wireless bandwidth (LRP) has been reserved to transmit the audio data between the wireless transmission devices 101 and 102, and that the audio data is being transmitted from the audio-video output device 108 to the audio output device 103. In this situation, when the source device is changed from the audio-video output device 108 to the audio-video reproduction device 104, the audio-video output device 108 sends the "Set Stream Path" message in which the physical address [1. 1. 0. 0] is set.

The wireless transmission device 101 relays the CEC message received from the audio-video output device 108 to the wireless transmission device 102, and also verifies that the physical address [1. 1. 0. 0] included in the CEC message is the physical address of the device connected upstream of the wireless transmission device 102.

Next, the wireless transmission device 101 sends, to the wireless transmission device 102 using the LRP, a disconnection notification to terminate the backward connection which has been established. It should be noted that the control commands (such as the CEC message, the connection request, the connection response, the disconnection notification, and the stream-start notification) are sent and received between the wireless transmission devices 101 and 102 using the LRP during a random access time at predetermined intervals. Thus, as shown in FIG. 10, even when the audio data is being transmitted using the LRP, sending and receiving operations can be performed. This can be applied in other examples.

After executing bandwidth-release processing to release the reserved bandwidth, the wireless transmission device 101 sends, to the wireless transmission device 102, a connection request to establish the forward connection. When receiving the connection request, the wireless transmission device 102 sends, to the wireless transmission device 101, a connection response to allow the connection. Moreover, the wireless transmission device 102 reserves a wireless bandwidth (HRP) to transmit the video data. After this, the wireless transmission device 102 sends, to the wireless transmission device 101, a stream-start notification indicating that transmission of a video data stream is to be started.

As a result of the processing described thus far, the video data from the audio-video reproduction device 104 is transmitted to the audio-video output device 108 via the wireless forward connection. FIG. 10 describes the case, as an example, where the wireless transmission device 101 sends the disconnection request. However, the present invention is not limited to this case. The wireless transmission device 102 may send the disconnection request. The bandwidth-release processing is executed by the data sending side, that is, the wireless transmission device 102 in the case of the forward connection and the wireless transmission device 101 in the case of the backward connection. The same can be applied in the sequences that follow.

Figure 11:
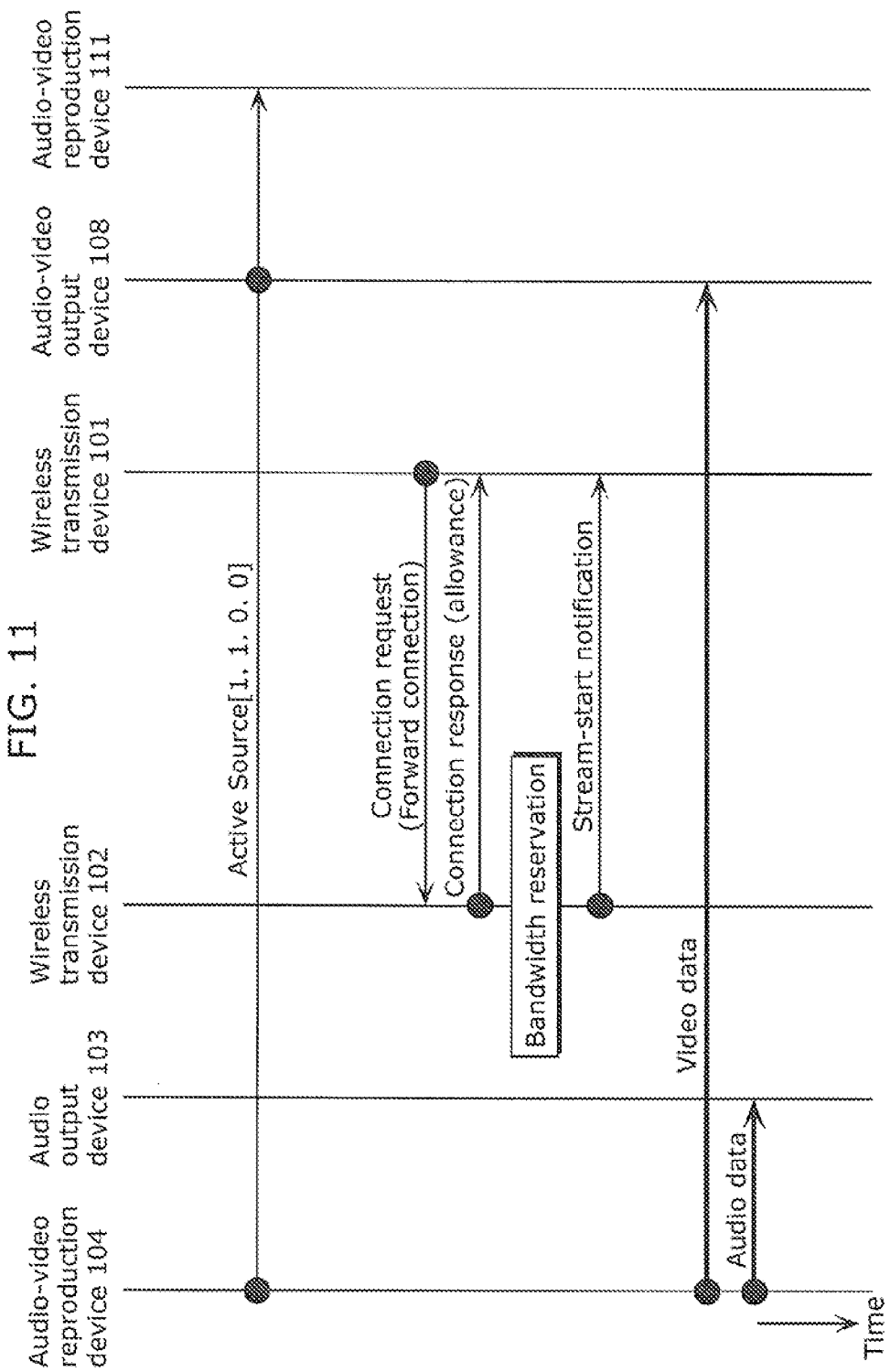
FIG. 11 is a diagram showing an example of a sequence performed when the audio and video data is transmitted from the audio-video reproduction device 104 in the first embodiment according to the present invention.

FIG. 11 is a diagram showing an example of a sequence performed when the "Active Source" message is sent from the audio-video reproduction device 104. The "Active Source" message is a CEC message indicating that the device identified by the physical address set in the operand field is the source device. This CEC message is sent from the source device itself (the audio-video reproduction device 104 in the present example). In the following, a detailed description of the points identical to those in the sequence described above is omitted and the points of difference are described in detail.

The wired sending-receiving circuit 504 of the audio-video reproduction device 104 sends the "Active Source" message to the CEC signal line of the audio-video transmission cable 105. In the operand field of this CEC message, the physical address [1. 1. 0. 0] of the audio-video reproduction device 104 serving as the source device is set. Then, this CEC message is relayed via the audio output device 103 and the wireless transmission device 102 to the wireless transmission device 101.

Receiving this CEC message, the antenna 206 of the wireless transmission device 101 outputs the CEC message to the controller 201 via the wireless packet sending-receiving circuit 202 and the packet processing circuit 203. The controller 201 sends the CEC message received from the packet processing circuit 203 to the audio-video output device 108 via the wired sending-receiving circuit 204. Then, this CEC message is relayed via the audio-video output device 108 to the audio-video reproduction device 111.

Also, the controller 201 verifies that the physical address [1. 1. 0. 0] included in the CEC message received from the packet processing circuit 203 is the physical address of the device connected upstream of the wireless transmission device 102. Then, the wireless transmission device 101 sends, to the wireless transmission device 102, a connection request to establish the forward connection.

Receiving the connection request, the wireless transmission device 102 sends, to the wireless transmission device 101, a connection response to allow the connection. Moreover, the wireless transmission device 102 reserves a wireless bandwidth (HRP) to transmit the video data. After this, the wireless transmission device 102 sends, to the wireless transmission device 101, a stream-start notification indicating that transmission of a video data stream is to be started. As a result of the processing described thus far, the video data from the audio-video reproduction device 104 is transmitted to the audio-video output device 108 via the wireless forward connection.

Figure 12:
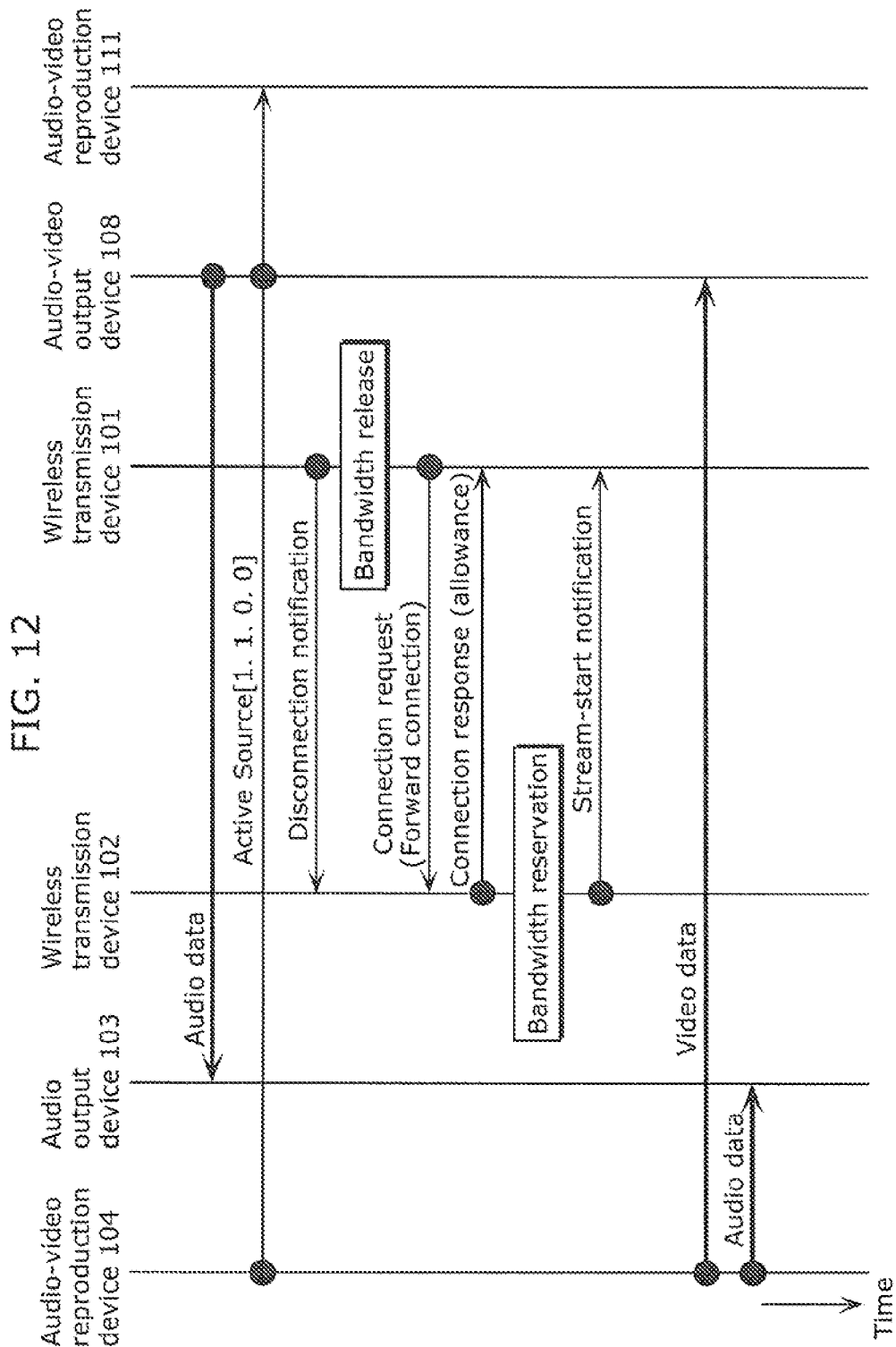
FIG. 12 is a diagram showing an example of a sequence performed when the audio and video data is transmitted from the audio-video reproduction device 104 in the first embodiment according to the present invention.

FIG. 12 is a diagram showing an example of a sequence performed to establish a new forward connection in the case where the backward connection has already been established to send the audio data. In the following, a detailed description of the points identical to those in the sequence described above is omitted and the points of difference are described in detail.

Suppose that the wireless bandwidth (LRP) has been reserved to transmit the audio data between the wireless transmission devices 101 and 102, and that the audio data is being transmitted from the audio-video output device 108 to the audio output device 103. In this situation, the audio-video reproduction device 104 sends the "Active Source" message in which the physical address [1. 1. 0. 0] is set.

The wireless transmission device 101 relays the CEC message received from the wireless transmission device 102 to the audio-video output device 108, and also verifies that the physical address [1. 1. 0. 0] included in the CEC message is the physical address of the device connected upstream of the wireless transmission device 102.

Following this, the wireless transmission device 101 sends, to the wireless transmission device 102, a disconnection notification to terminate the backward connection which has been established. After executing the bandwidth-release processing, the wireless transmission device 101 sends, to the wireless transmission device 102, a connection request to establish the forward connection. Receiving the connection request, the wireless transmission device 102 sends, to the wireless transmission device 101, a connection response to allow the connection. Moreover, the wireless transmission device 102 reserves a wireless bandwidth (HRP) to transmit the video data. After this, the wireless transmission device 102 sends, to the wireless transmission device 101, a stream-start notification indicating that transmission of a video data stream is to be started. As a result of the processing described thus far, the video data from the audio-video reproduction device 104 is transmitted to the audio-video output device 108 via the wireless forward connection.

Figure 13:
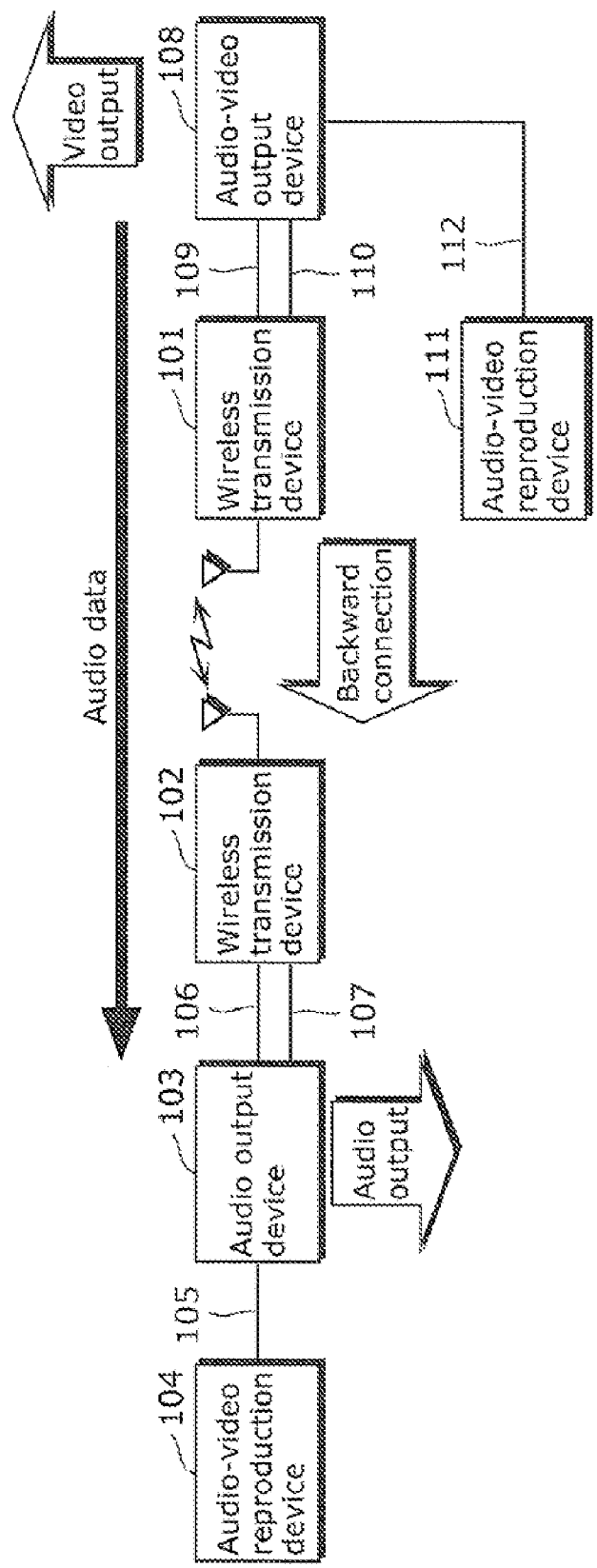
FIG. 13 is a diagram showing an example of a flow of audio and video data outputted from the audio-video output device 108 in the first embodiment according to the present invention.

Next, processing performed when the audio-video output device 108 serves as the source device is explained, with reference to FIGS. 13 to 17. FIG. 13 is a diagram showing a flow of audio and video data in the case where a program from a broadcast wave received by the audio-video output device 108 is viewed in the theater mode. FIGS. 14 to 17 are diagrams showing processing sequences performed by the devices included in the wireless transmission system.

In the example shown in FIG. 13, the video data is outputted by the display 606 of the audio-video output device 108. Also, the audio data received from the audio-video output device 108 is outputted from the speaker 406 of the audio output device 103, via the wireless transmission device 101 and the wireless transmission device 102. Here, for the audio data transmission, the backward connection needs to be established between the wireless transmission device 101 and the wireless transmission device 102.

For this purpose, before transmitting the audio data as described above, the audio-video output device 108 broadcasts the "Active Source" message including the physical address [0. 0. 0. 0] of the audio-video output device 108 in the operand field, for example. Alternatively, the audio-video output device 108 broadcasts the "Set Stream Path" message including the physical address [0. 0. 0. 0] of the audio-video output device 108 in the operand field. The processing to establish the backward connection using these CEC messages is described with reference to FIGS. 14 to 17.

Figure 14:
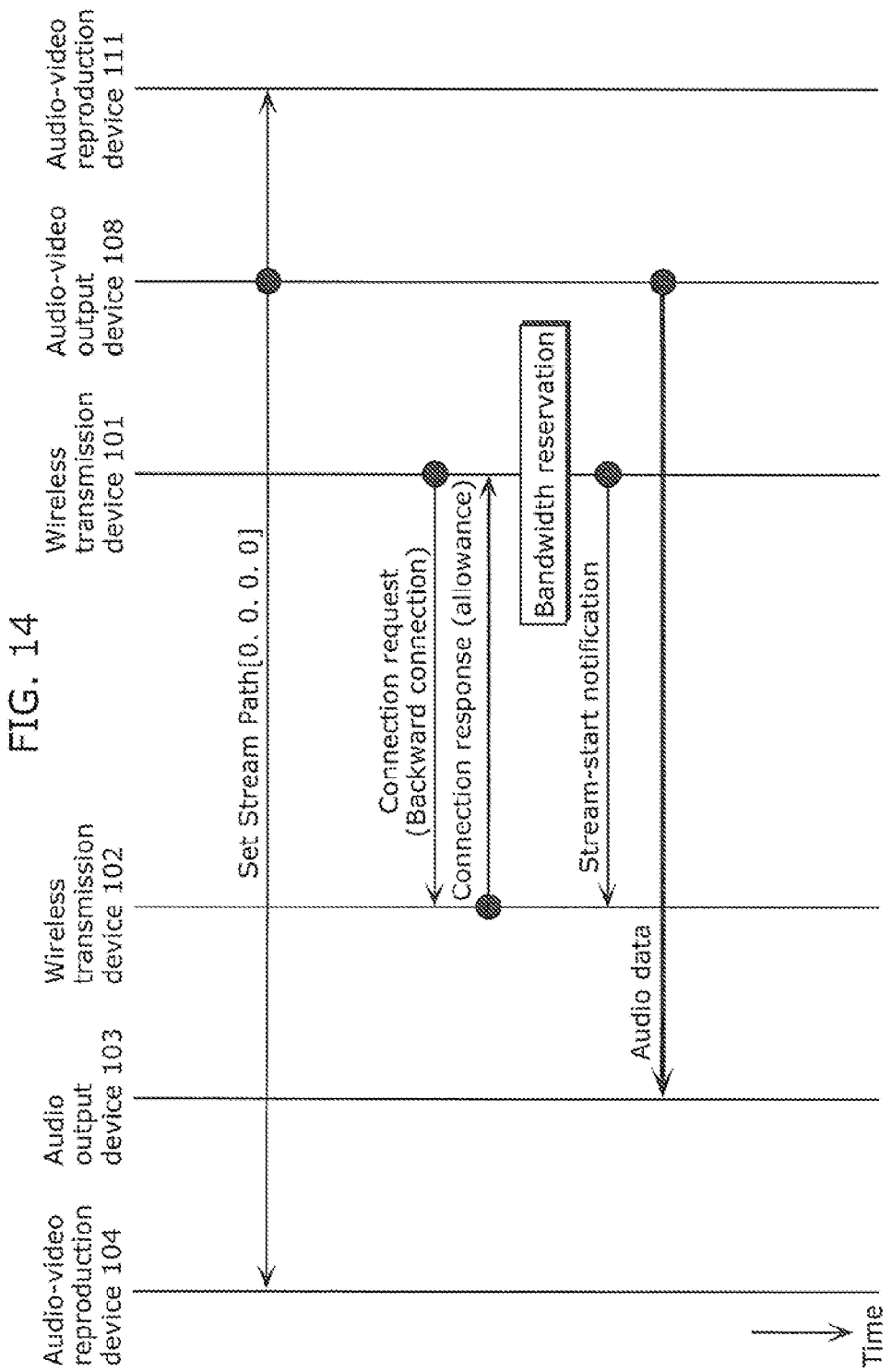
FIG. 14 is a diagram showing an example of a sequence performed when the audio and video data is transmitted from the audio-video output device 108 in the first embodiment according to the present invention.

FIG. 14 is a diagram showing an example of a sequence performed when the "Set Stream Path" message is sent from the audio-video output device 108. In the following, a detailed description of the points identical to those in the sequence described above is omitted and the points of difference are described in detail.

The wired sending-receiving circuit 602 of the audio-video output device 108 sends the "Set Stream Path" message to the CEC signal lines of the audio-video transmission cables 109 and 112. In the operand field of this CEC message, the physical address [0. 0. 0. 0] of the audio-video output device 108 serving as the source device is set.

The wireless transmission device 101 relays the CEC message received from the audio-video output device 108 to the wireless transmission device 102, and also verifies that the physical address [0. 0. 0. 0] included in the CEC message is not the physical address of the device connected upstream of the wireless transmission device 102.

Here, the controller 201 of the wireless transmission device 101 may determine whether or not the connection-start conditions are satisfied. In this example, the connection-start conditions may be the following (a1) to (d2). Note that these connection-start conditions (a1) to (d2) can also be used in examples shown in FIGS. 15 to 17 and 19 to 22.

(a1) The entire system is operating in the theater mode.

(b2) The wireless transmission device 102 has a function of performing wired transmission of the audio data.

(c2) The wireless transmission device 102 has a function of wirelessly receiving the audio data.

(d2) The wireless transmission device 102 and the audio output device 103 are connected.

The method for verifying the condition (a1) has been described above and, therefore, the explanation is not repeated here.

Next, a method for verifying the conditions (b2) to (d2) is explained with reference to FIG. 28. Note that, in the first embodiment, the wireless transmission device 101 performs the processing in place of the audio-video output device 701 shown in FIG. 28.

The wireless transmission device 101 sends a device-information request signal to the wireless transmission device 102. When receiving the device-information request signal, the wireless transmission device 102 sends a device-information response signal to the wireless transmission device 101.

Figure 29:
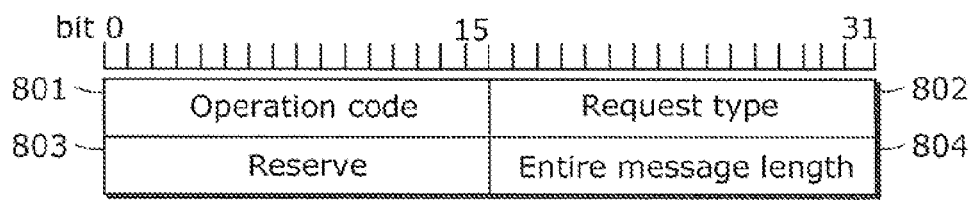
FIG. 29 is a diagram showing an example of a message format of a device-information request signal, in the second embodiment according to the present invention.

FIG. 29 is a diagram showing an example of a message format of a device-information request signal. In FIG. 29, an operation code field 801 indicates a message type. In the first embodiment, a value indicating a device-performance request signal is set. A request type field 802 indicates a requested type in a bitmap format. In the first embodiment, a bit for requesting the device information is set to "1". A reserve field 803 is a field reserved for the future. An entire message length field 804 indicates a total message length when the message further includes a sub-message.

Figure 30:
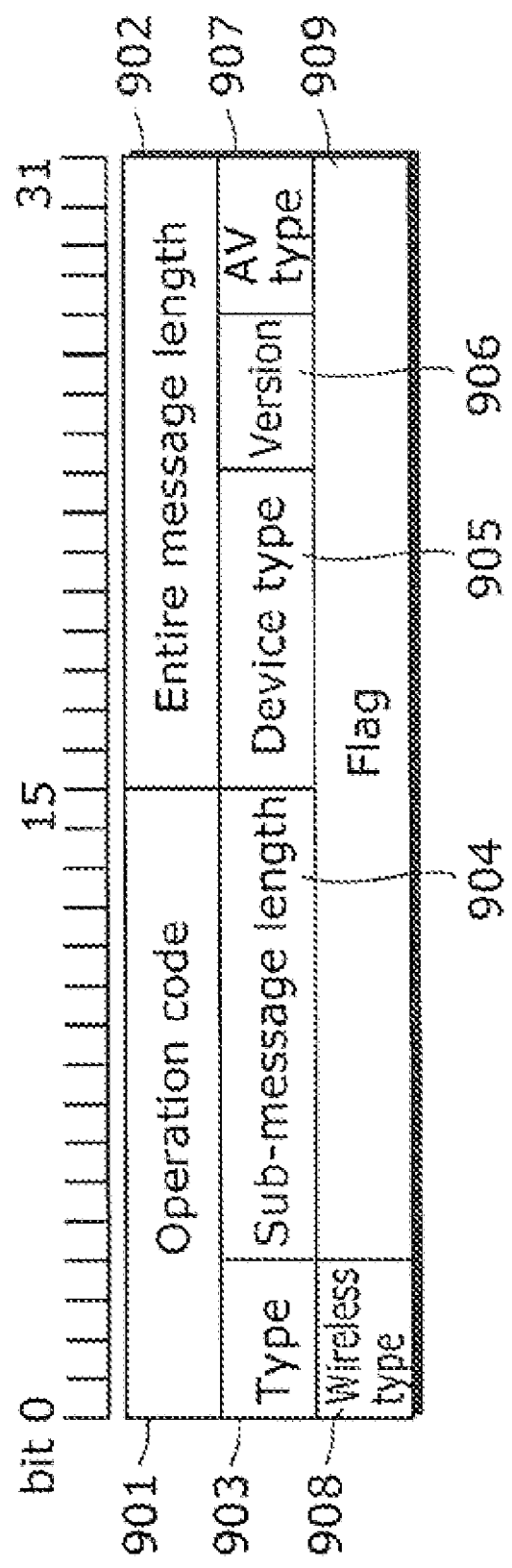
FIG. 30 is a diagram showing an example of a message format of a device-information response signal, in the second embodiment according to the present invention.

FIG. 30 is a diagram showing an example of a message format of a device-information response signal. In FIG. 30, an operation code field 901 indicates a message type. In the first embodiment, a value indicating a device-performance response signal is set. An entire message length field 902 indicates a total message length when the message further includes a sub-message. A type field 903 indicates a type of the sub-message. In the first embodiment, a value indicating the device-information message is set. A sub-message length field 904 indicates a length of the sub-message. A device type field 905 indicates a device type. A version field 906 indicates a device version. An AV type field 907 is made up of bits corresponding to functions in wireless transmission for sending the video data, receiving the video data, sending the audio data, and receiving the audio data, and is set to "1" when the present device has the aforementioned function. A wireless type field 908 indicates a wireless type. A flag field 909 stores flags corresponding to the device performance, such as the function of wired transmission of the audio or video data and the connection state of the audio or video transmission cable, and accordingly sets the flags corresponding to the connection state and the performance.

In this way, the device-information response signal can include: the information as to whether the wireless packet sending-receiving circuit 302 of the wireless transmission device 102 has the function of receiving the audio data; the information as to whether the wireless transmission device 102 has the wired audio sending circuit 305; and the connection state of the audio transmission cable 107.

The aforementioned connection state of the audio transmission cable indicates whether or not the wireless transmission device 102 is connected to the audio output device 103 via the audio transmission cable 107. To be more specific, in the device-information response signal which is to be sent, the connection state is represented by a specific flag in the flag field 909.

It should be noted that the wireless transmission device 102 may notify the wireless transmission device 101 of the conditions (b2) and (d2) collectively as one flag, for example. This can be implemented by, for example, assigning a predetermined value to a combination of: the presence or absence of the function of wired transmission of the audio data; and the connection state between the wireless transmission device 102 and the audio output device 103 via the audio transmission cable 107.

Also, note that information summarizing the conditions (b2), (c2), and (d2) may be stored in the AV type field 907 and then may be notified to the wireless transmission device 101 by the wireless transmission device 102. This can be implemented by, for example, assigning a predetermined value to a combination of: the presence or absence of the function of wired transmission of the audio data; the presence or absence of the function of wirelessly receiving the audio data; and the connection state between the wireless transmission device 102 and the audio output device 103 via the audio transmission to cable 107.

The following is a specific example of setting the device-information response signal.

In the device type field 905, a value indicating that the wireless transmission device 102 is an adaptor is set. In the AV type field 907, each of the bits corresponding to the functions of sending the video data, sending the audio data, and receiving the audio data is set to "1". In the wireless type field 908, a value indicating a wireless type which is capable of high-speed transmission of the audio and video data and low-speed reception of the audio data is set. In the flag field 909, a flag indicating the presence of the wired audio transmission function and a flag indicating the connection state of the audio transmission cable are set to "1".

The wireless transmission device 101 verifies that the condition (c2) is satisfied, by reference to the device-information response signal including the information indicating that the wireless transmission device 102: is an adaptor; has the function of receiving the audio data; and is capable of low-speed reception of the audio data. Moreover, the wireless transmission device 101 verifies that the conditions (b2) and (d2) are satisfied by reference to the flag field 909.

Also, the bit corresponding to the function of receiving the audio data in the AV type field 907 may be set to "1" only when the wireless transmission device 102 is connected to the audio output device 103 via the audio transmission cable 107. With this, the conditions (b2), (c2), and (d2) can be verified by reference to this bit. Moreover, a different message may be received instead of the device-information response signal, and the condition (d2) may be verified by reference to the bit indicating that the wireless transmission device 102 is connected to the audio output device 103 via the audio transmission cable 107.

When all of the four connection-start conditions (a1) to (d2) are satisfied, the controller 201 proceeds to the processing to establish a wireless connection with the wireless transmission device 102. When any of the connection-start conditions (a1) to (d2) is not satisfied, the controller 201 terminates the processing without establishing a wireless connection with the wireless transmission device 102. In this case, the controller 201 may send a reason for not starting the wireless connection to the audio-video output device 108, so that the user can be notified of the reason via the display 606 or the speaker 605 of the audio-video output device 108. For example, when the connection-start condition (d2) is not satisfied, a message saying "The audio cable is not connected" or "Connect the audio cable to the AV amplifier" is displayed on the display 606 or is given by voice via the speaker 605.

Next, the wireless transmission device 101 sends, to the wireless transmission device 102, a connection request to establish the backward connection. Receiving the connection request, the wireless transmission device 102 sends, to the wireless transmission device 101, a connection response to allow the connection. Then, receiving the connection response, the wireless transmission device 101 reserves a wireless bandwidth (LRP) to transmit the audio data. After this, the wireless transmission device 101 sends, to the wireless transmission device 102 using the LRP, a stream-start notification indicating that transmission of an audio data stream is to be started. As a result of the processing described thus far, the audio data from the audio-video output device 108 is transmitted to the audio output device 103 via the wireless backward connection.

Figure 15:
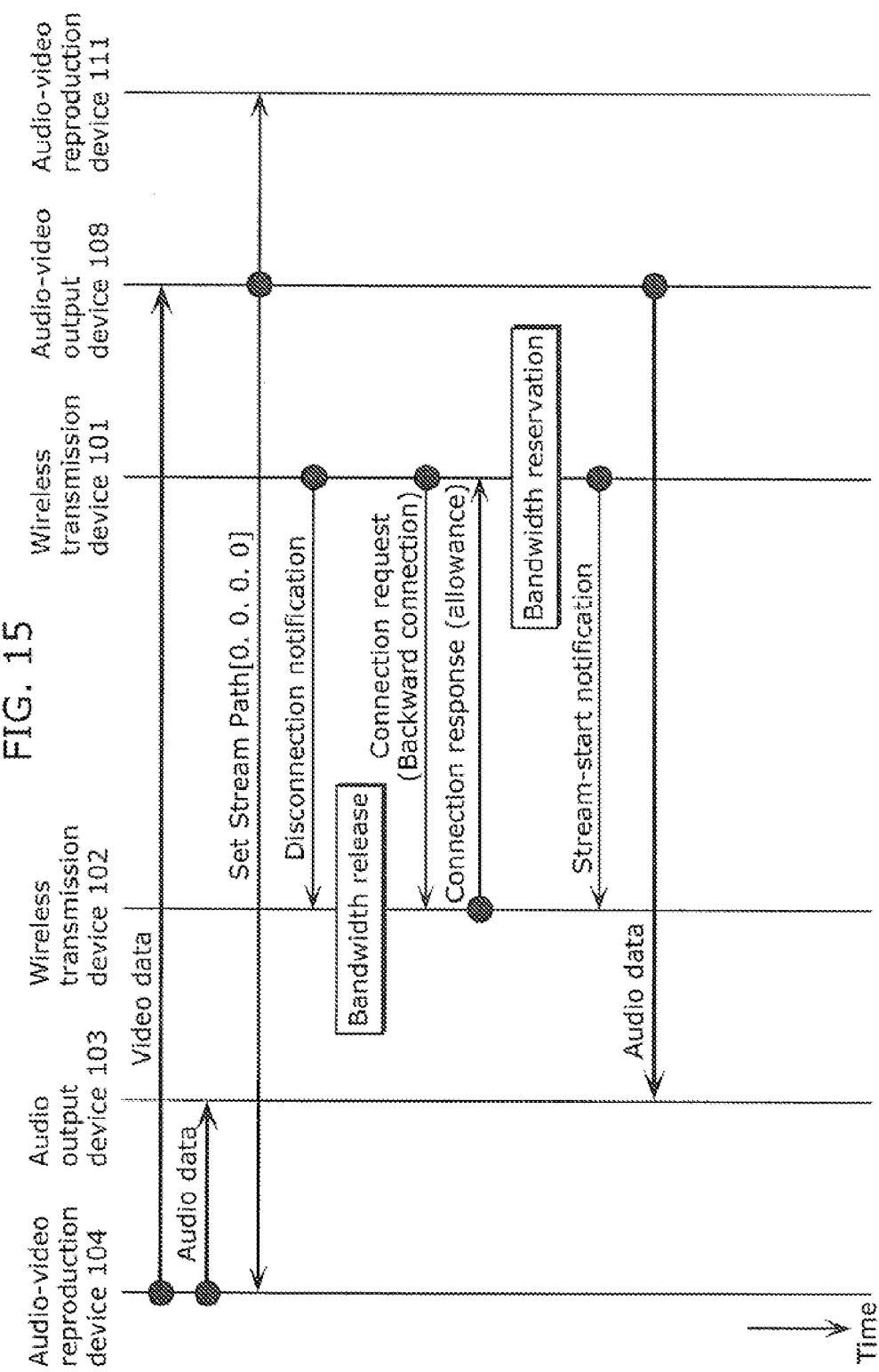
FIG. 15 is a diagram showing an example of a sequence performed when the audio and video data is transmitted from the audio-video output device 108 in the first embodiment according to the present invention.

FIG. 15 is a diagram showing an example of a sequence performed to establish a new backward connection in the case where the forward connection has already been established to send the video data. Such a situation can take place when, for example, content received by the broadcast-wave receiving circuit 607 of the audio-video output device 108 is about to be viewed in the theater mode while content of a DVD inserted into the audio-video reproduction device 104 is being viewed in the theater mode. In the following, a detailed description of the points identical to those in the sequence described above is omitted and the points of difference are described in detail.

Suppose that the wireless bandwidth (HRP) has been reserved to transmit the video data between the wireless transmission devices 101 and 102, and that the video data is being transmitted from the audio-video reproduction device 104 to the audio-video output device 108. In this situation, when the source device is changed from the audio-video reproduction device 104 to the audio-video output device 108, the audio-video output device 108 sends the "Set Stream Path" message in which the physical address [0. 0. 0. 0] is set.

The wireless transmission device 101 relays the CEC message received from the audio-video output device 108 to the wireless transmission device 102, and also verifies that the physical address [0. 0. 0. 0] included in the CEC message is not the physical address of the an device connected upstream of the wireless transmission device 102.

Next, the wireless transmission device 101 sends, to the wireless transmission device 102, a disconnection notification to terminate the forward connection. Receiving the disconnection notification, the wireless transmission device 102 executes the bandwidth-release processing to release the reserved bandwidth. After the bandwidth-release processing is executed, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video output device 108 is transmitted to the audio output device 103 via the wireless backward connection.

Figure 16:
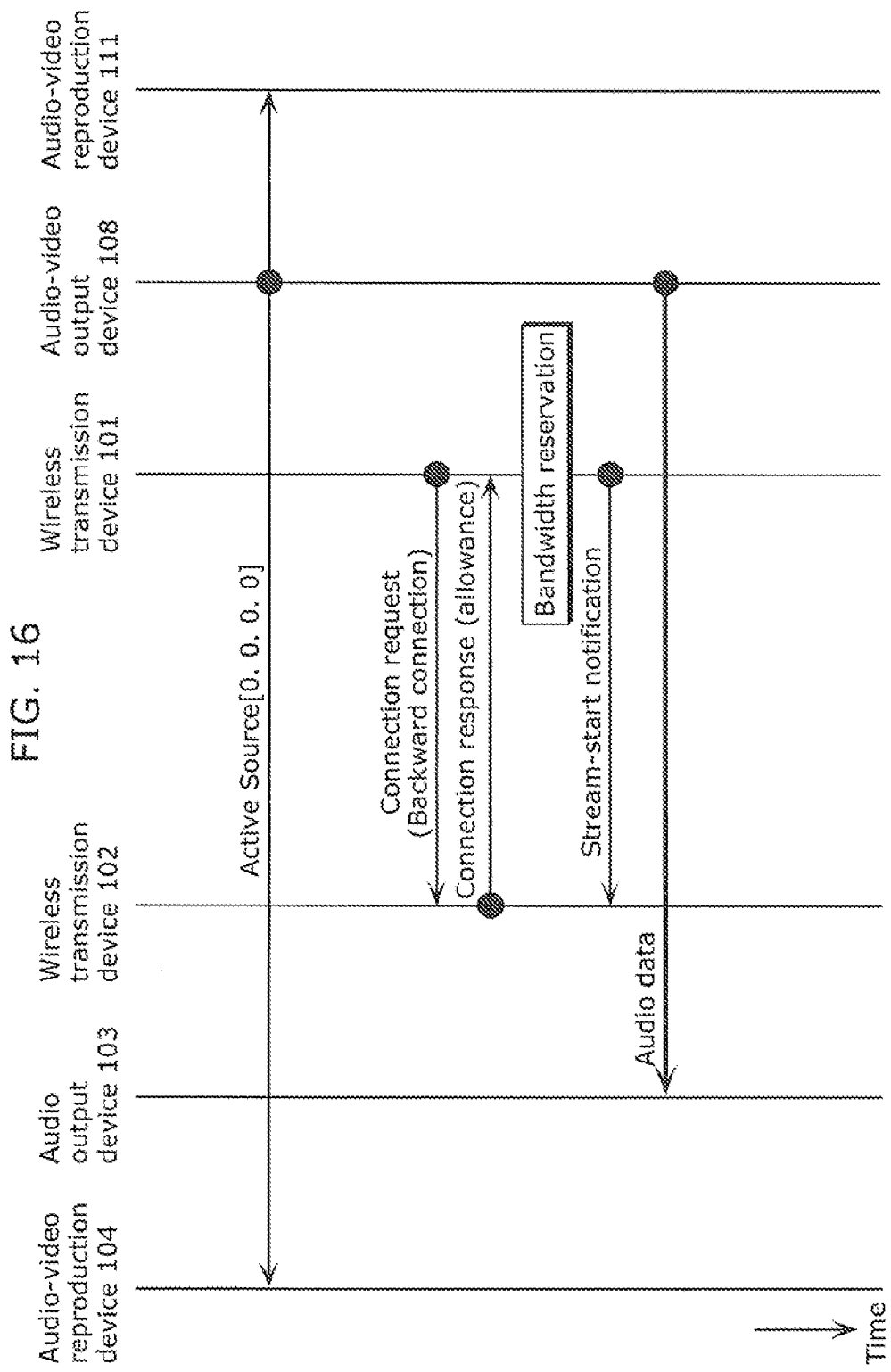
FIG. 16 is a diagram showing an example of a sequence performed when the audio and video data is transmitted from the audio-video output device 108 in the first embodiment according to the present invention.

FIG. 16 is a diagram showing an example of a sequence performed when the "Active Source" message is sent from the audio-video output device 108. In the following, a detailed description of the points identical to those in the sequence described above is omitted and the points of difference are described in detail.

The wired sending-receiving circuit 504 of the audio-video output device 108 sends the "Active Source" message to the CEC signal lines of the audio-video transmission cables 109 and 112. In the operand field of this CEC message, the physical address [0. 0. 0. 0] of the audio-video output device 108 serving as the source device is set.

The wireless transmission device 101 relays the CEC message received from the audio-video output device 108 to the wireless transmission device 102, and also verifies that the physical address [0. 0. 0. 0] included in this CEC message is not the physical address of the device connected upstream of the wireless transmission device 102. Next, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of In the processing described thus far, the audio data from the audio-video output device 108 is transmitted to the audio output device 103 via the wireless backward connection.

Figure 17:
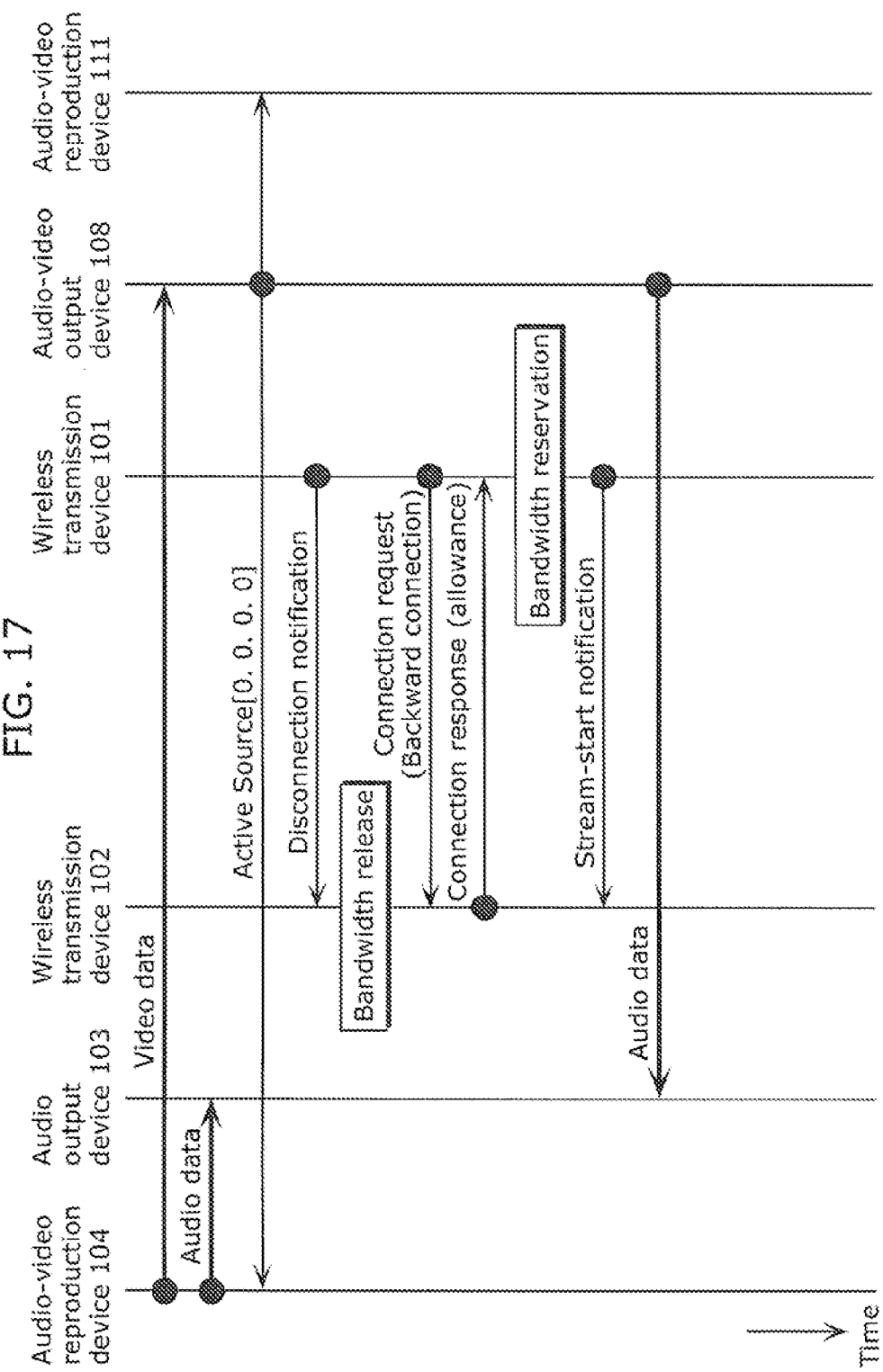
FIG. 17 is a diagram showing an example of a sequence performed when the audio and video data is transmitted from the in audio-video output device 108 in the first embodiment according to the present invention.

FIG. 17 is a diagram showing an example of a sequence performed to establish a new backward connection in the case where the forward connection has already been established to send the video data. In the following, a detailed description of the points identical to those in the sequence described above is omitted and the points of difference are described in detail.

Suppose that the wireless bandwidth (HRP) has been reserved to transmit the video data between the wireless transmission devices 101 and 102, and that the video data is being transmitted from the audio-video reproduction device 104 to the audio-video output device 108. In this situation, the audio-video output device 108 sends the "Active Source" message in which the physical address [0. 0. 0. 0] is set.

The wireless transmission device 101 relays the CEC message received from the audio-video output device 108 to the wireless transmission device 102, and also verifies that the physical address [0. 0. 0. 0] included in the CEC message is not the physical address of the device connected upstream of the wireless transmission device 102.

Next, the wireless transmission device 101 sends, to the wireless transmission device 102, a disconnection notification to terminate the forward connection. Receiving the disconnection notification, the wireless transmission device 102 executes the bandwidth-release processing to release the reserved bandwidth. After the bandwidth-release processing is executed, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video output device 108 is transmitted to the audio output device 103 via the wireless backward connection.

Figure 18:
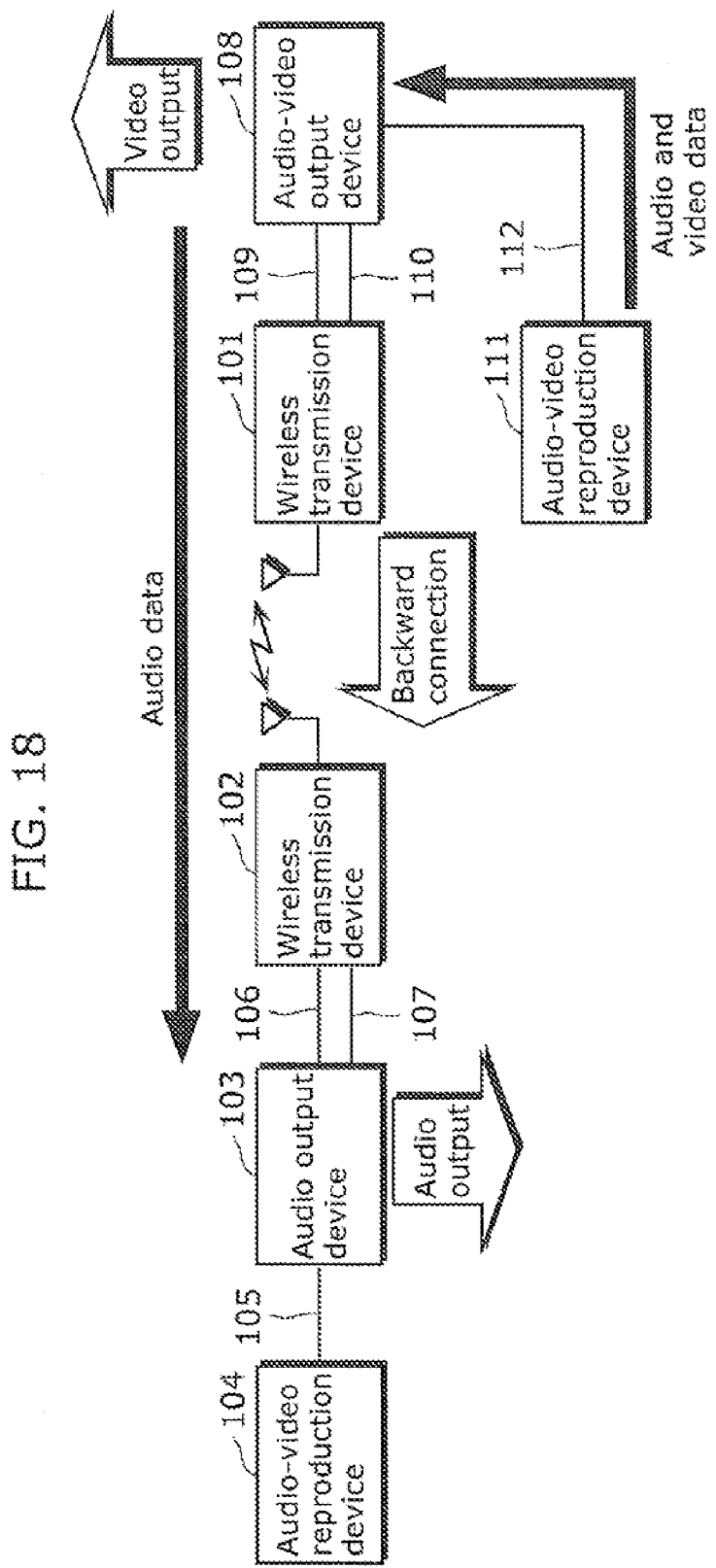
FIG. 18 is a diagram showing an example of a flow of audio and video data outputted from the audio-video reproduction device 111 in the first embodiment according to the present invention.

Next, processing performed when the audio-video reproduction device 111 serves as the source device is explained, with reference to FIGS. 18 to 22. FIG. 18 is a diagram showing a flow of audio and video data in the case where content reproduced by the audio-video reproduction device 111 is viewed in the theater mode. FIGS. 19 to 22 are diagrams showing processing sequences performed by the devices included in the wireless transmission system.

The video data from the audio-video reproduction device 111 is outputted by the display 606 of the audio-video output device 108. Also, the audio data from the audio-video reproduction device 111 is outputted from the speaker 406 of the audio output device 103, via the audio-video output device 108, the wireless transmission device 101, and the wireless transmission device 102. Here, for the audio data transmission, the backward connection needs to be established between the wireless transmission device 101 and the wireless transmission device 102.

For this purpose, before transmitting the audio data as described above, the audio-video reproduction device 111 broadcasts the "Active Source" message including the physical address [2. 0. 0. 0] of the audio-video reproduction device 111 in the operand field, for example. Alternatively, the audio-video output device 108 broadcasts the "Set Stream Path" message including the physical address [2. 0. 0. 0] of the audio-video reproduction device 111 in the operand field. The processing to establish the backward connection using these CEC messages is described with reference to FIGS. 19 to 22.

Figure 19:
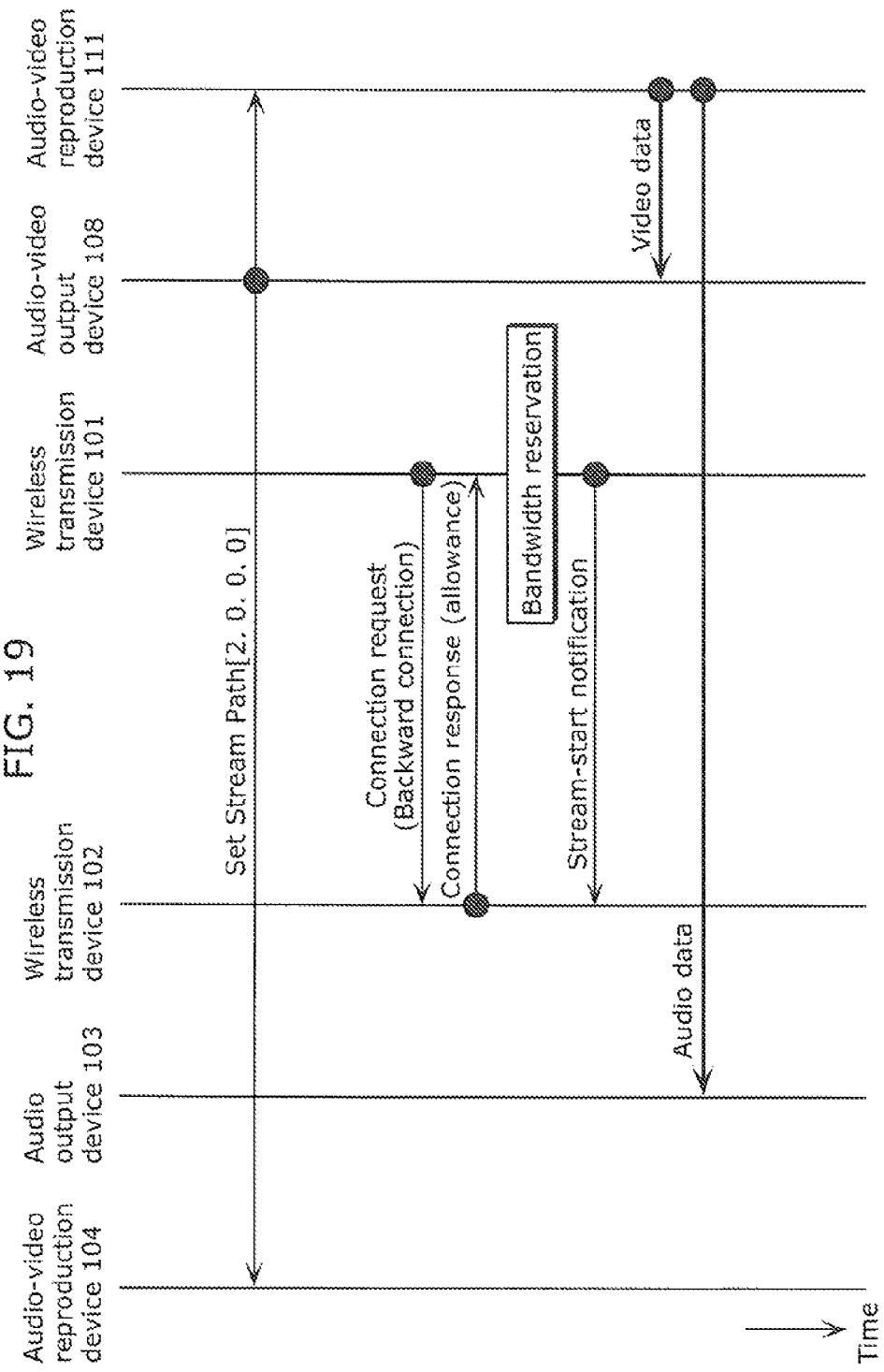
FIG. 19 is a diagram showing an example of a sequence performed when the audio and video data is transmitted from the audio-video reproduction device 111 in the first embodiment according to the present invention.

FIG. 19 is a diagram showing an example of a sequence performed when the "Set Stream Path" message is sent from the audio-video output device 108. In the following, a detailed description of the points identical to those in the sequence described above is omitted and the points of difference are described in detail.

The audio-video output device 108 sends the "Set Stream Path" message in which the physical address [2. 0. 0. 0] is set. The wireless transmission device 101 relays the CEC message received from the audio-video output device 108 to the wireless transmission device 102, and also verifies that the physical address [2. 0. 0. 0] included in the CEC message is not the physical address of the device connected upstream of the wireless transmission device 102. Next, the wireless transmission device 101 sends, to the wireless transmission device 102, a connection request to establish the backward connection. Receiving the connection request, the wireless transmission device 102 sends, to the wireless transmission device 101, a connection response to allow the connection. Then, receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video reproduction device 111 is transmitted to the audio output device 103 via the wireless backward connection.

Figure 20:
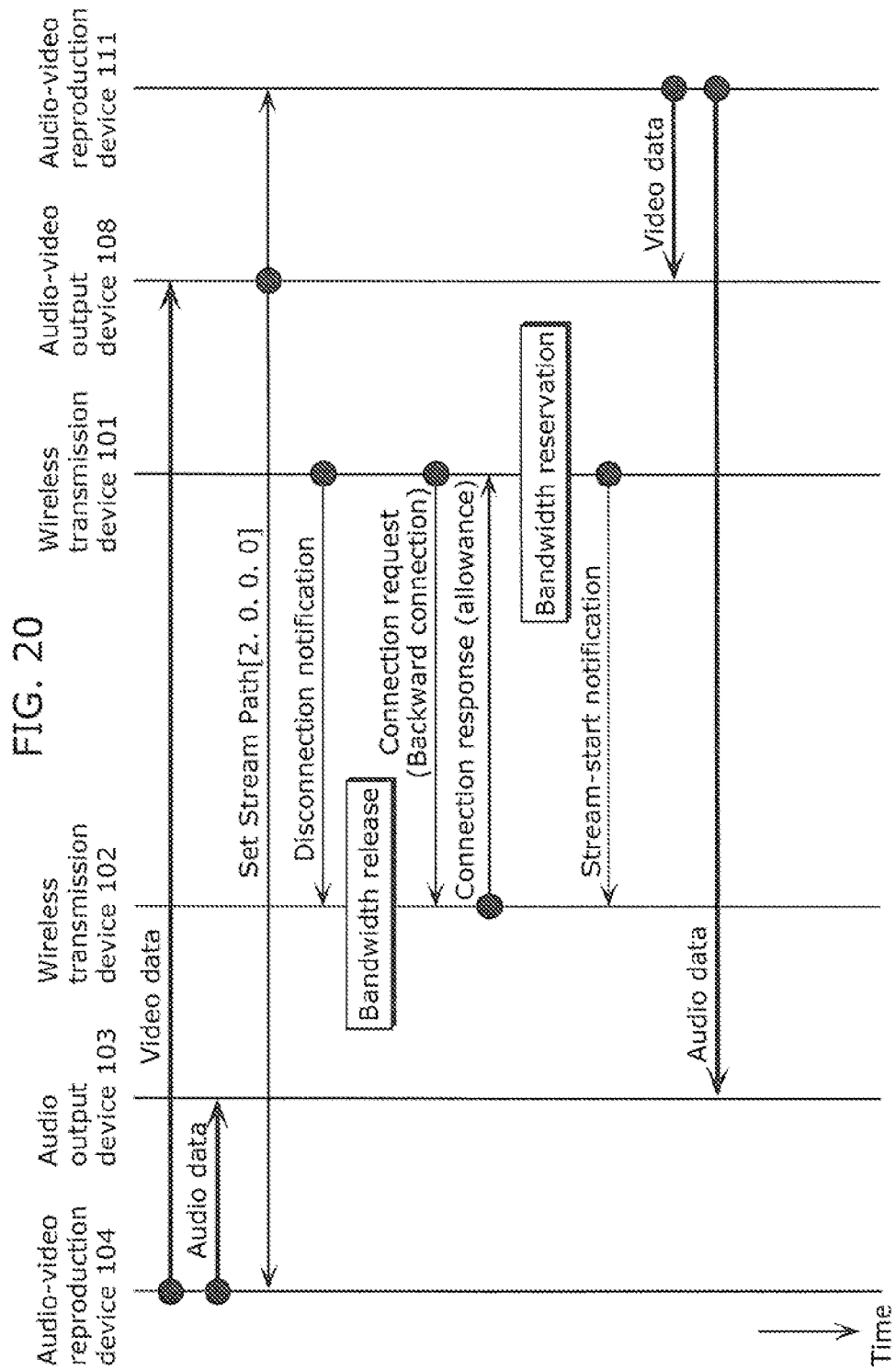
FIG. 20 is a diagram showing an example of a sequence performed when the audio and video data is transmitted from the audio-video reproduction device 111 in the first embodiment according to the present invention.

FIG. 20 is a diagram showing an example of a sequence performed to establish a new backward connection in the case where the forward connection has already been established to send the video data. Such a situation can take place when, for example, content recorded in a Hard Disk Drive (HDD) of the audio-video reproduction device 111 is about to be viewed in the theater mode while content of a DVD inserted into the audio-video reproduction device 104 is being viewed in the theater mode. In the following, a detailed description of the points identical to those in the sequence described above is omitted and the points of difference are described in detail.

Suppose that the wireless bandwidth (HRP) has been reserved to transmit the video data between the wireless transmission devices 101 and 102, and that the video data is being transmitted from the audio-video reproduction device 104 to the audio-video output device 108. In this situation, when the source device is changed from the audio-video reproduction device 104 to the audio-video reproduction device 111, the audio-video output device 108 sends the "Set Stream Path" message in which the physical address [2. 0. 0. 0] is set.

The wireless transmission device 101 relays the CEC message received from the audio-video output device 108 to the wireless transmission device 102, and also verifies that the physical address [2. 0. 0. 0] included in the CEC message is not the physical address of the device connected upstream of the wireless transmission device 102.

Next, the wireless transmission device 101 sends, to the wireless transmission device 102, a disconnection notification to terminate the forward connection. Receiving the disconnection notification, the wireless transmission device 102 executes the bandwidth-release processing to release the reserved wireless bandwidth (HRP). After the bandwidth-release processing is executed, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video reproduction device 111 is transmitted to the audio output device 103 via the wireless backward connection.

Figure 21:
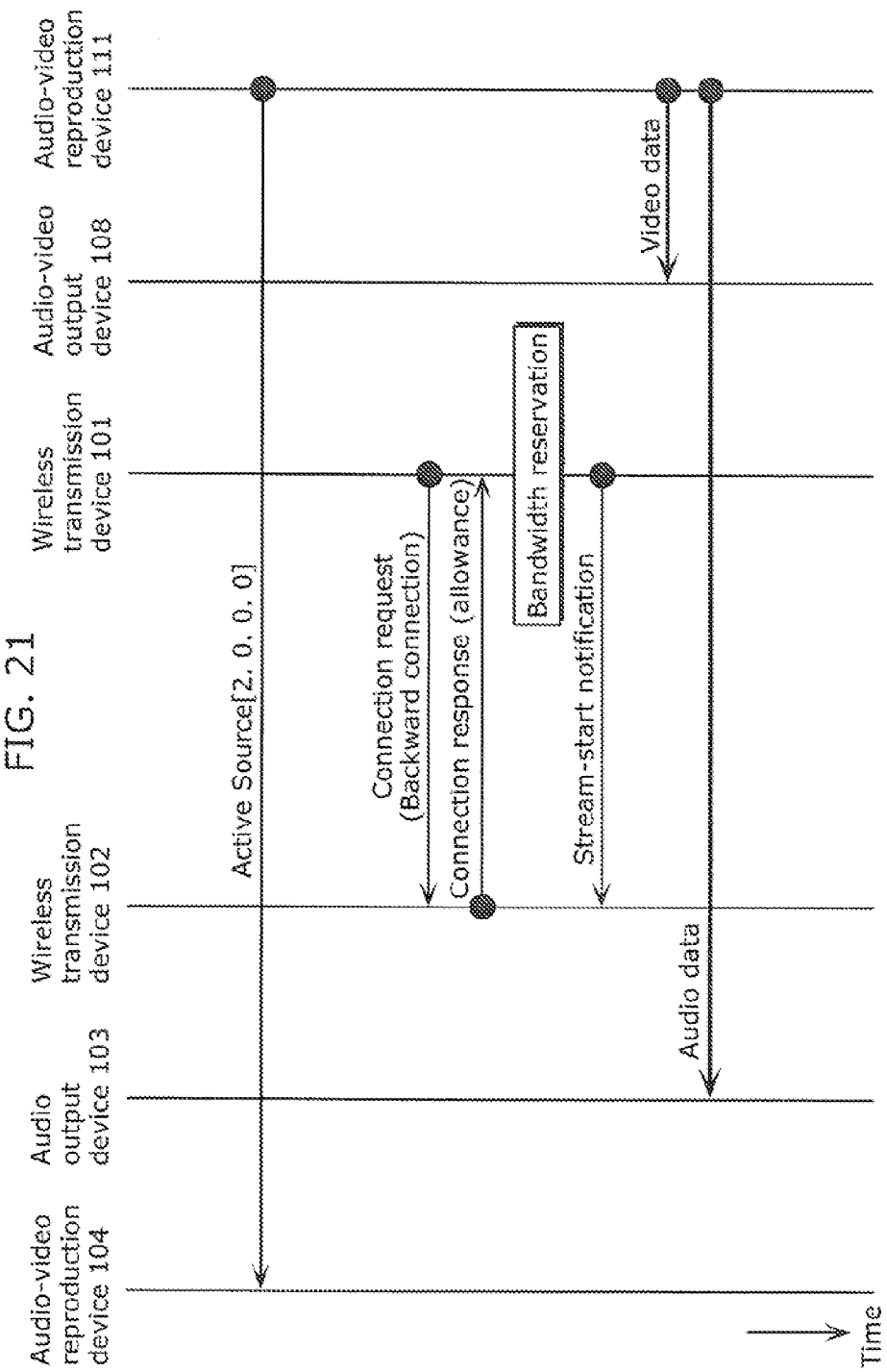
FIG. 21 is a diagram showing an example of a sequence performed when the audio and video data is transmitted from the audio-video reproduction device 111 in the first embodiment according to the present invention.

FIG. 21 is a diagram showing an example of a sequence performed when the "Active Source" message is sent from the audio-video reproduction device 111. In the following, a detailed description of the points identical to those in the sequence described above is omitted and the points of difference are described in detail.

The wired sending-receiving circuit 504 of the audio-video reproduction device 111 sends the "Active Source" message to the CEC signal line of the audio-video transmission cable 112. In the operand field of this CEC message, the physical address [2. 0. 0. 0] of the audio-video reproduction device 111 serving as the source device is set. Also, this CEC message is relayed via the audio-video output device 108 to the wireless transmission device 101.

The wireless transmission device 101 relays the CEC message received from the audio-video output device 108 to the wireless transmission device 102, and also verifies that the physical address [2. 0. 0. 0] included in this CEC message is not the physical address of the device connected upstream of the wireless transmission device 102. Next, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video reproduction device 111 is transmitted to the audio output device 103 via the wireless backward connection.

Figure 22:
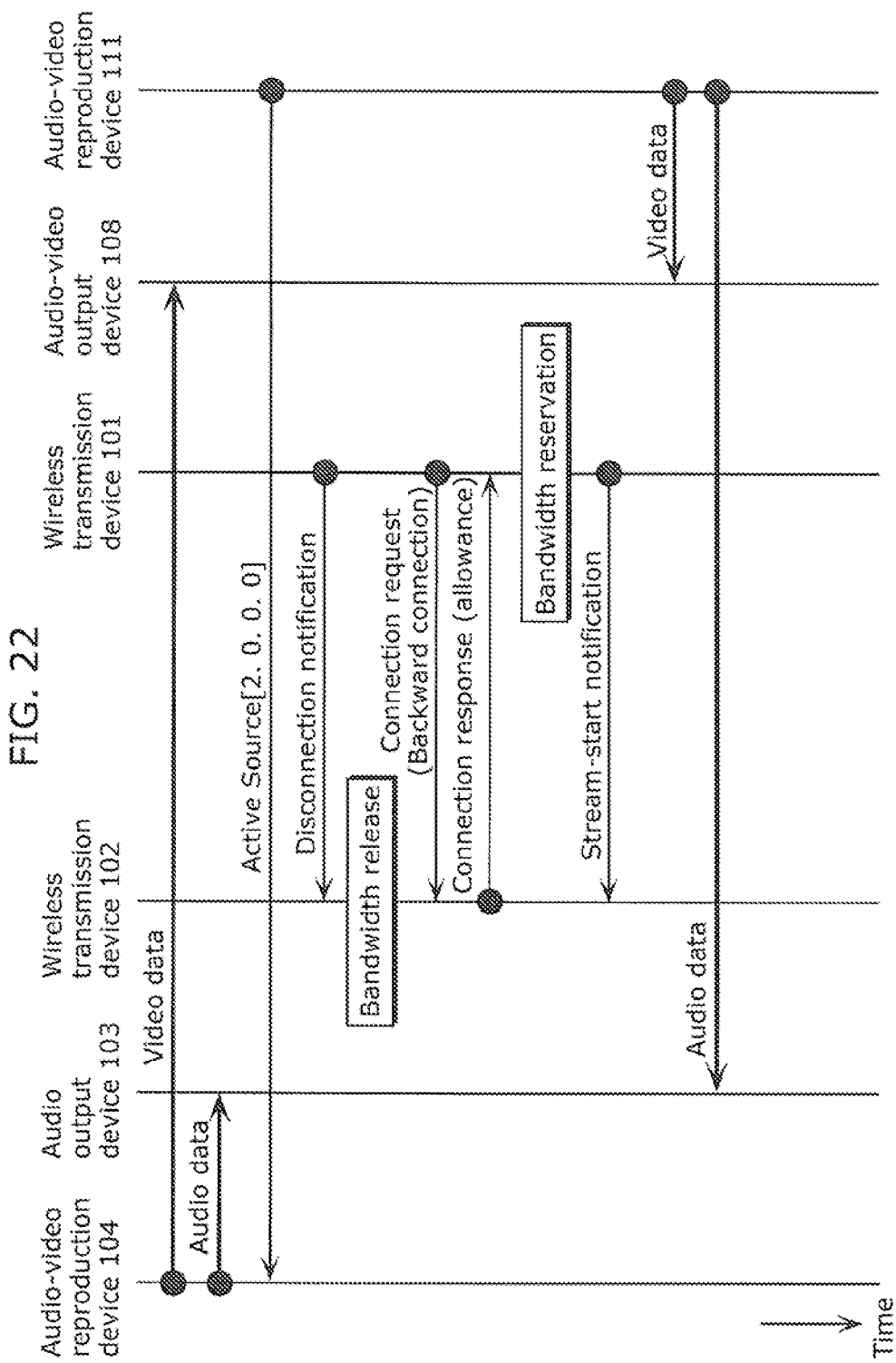
FIG. 22 is a diagram showing an example of a sequence performed when the audio and video data is transmitted from the audio-video reproduction device 111 in the first embodiment according to the present invention.

FIG. 22 is a diagram showing an example of a sequence performed to establish a new backward connection in the case where the forward connection has already been established to send the video data. In the following, a detailed description of the points identical to those in the sequence described above is omitted and the points of difference are described in detail.

Suppose that the wireless bandwidth (HRP) has been reserved to transmit the video data between the wireless transmission devices 101 and 102, and that the video data is being transmitted from the audio-video reproduction device 104 to the audio-video output device 108. In this situation, the audio-video reproduction device 111 sends the "Active Source" message in which the physical address [2. 0. 0. 0] is set.

The wireless transmission device 101 relays the CEC message received from the audio-video output device 108 to the wireless transmission device 102, and also verifies that the physical address [2. 0. 0. 0] included in the CEC message is not the physical address of the device connected upstream of the wireless transmission device 102.

Next, the wireless transmission device 101 sends, to the wireless transmission device 102, a disconnection notification to terminate the forward connection. Receiving the disconnection notification, the wireless transmission device 102 executes the bandwidth-release processing to release the reserved wireless bandwidth (HRP). After the bandwidth-release processing is executed, the wireless transmission device 101 sends, to the wireless transmission device 102, a connection request to establish the backward connection. Receiving the connection request, the wireless transmission device 102 sends, to the wireless transmission device 101, a connection response to allow the connection. Receiving the connection response, the wireless transmission device 101 reserves a wireless bandwidth (LRP) to transmit the audio data. After this, the wireless transmission device 101 sends, to the wireless transmission device 102, a stream-start notification indicating that transmission of an audio data stream is to be started. As a result of the processing described thus far, the audio data from the audio-video reproduction device 111 is transmitted to the audio output device 103 via the wireless backward connection.

Figure 23:
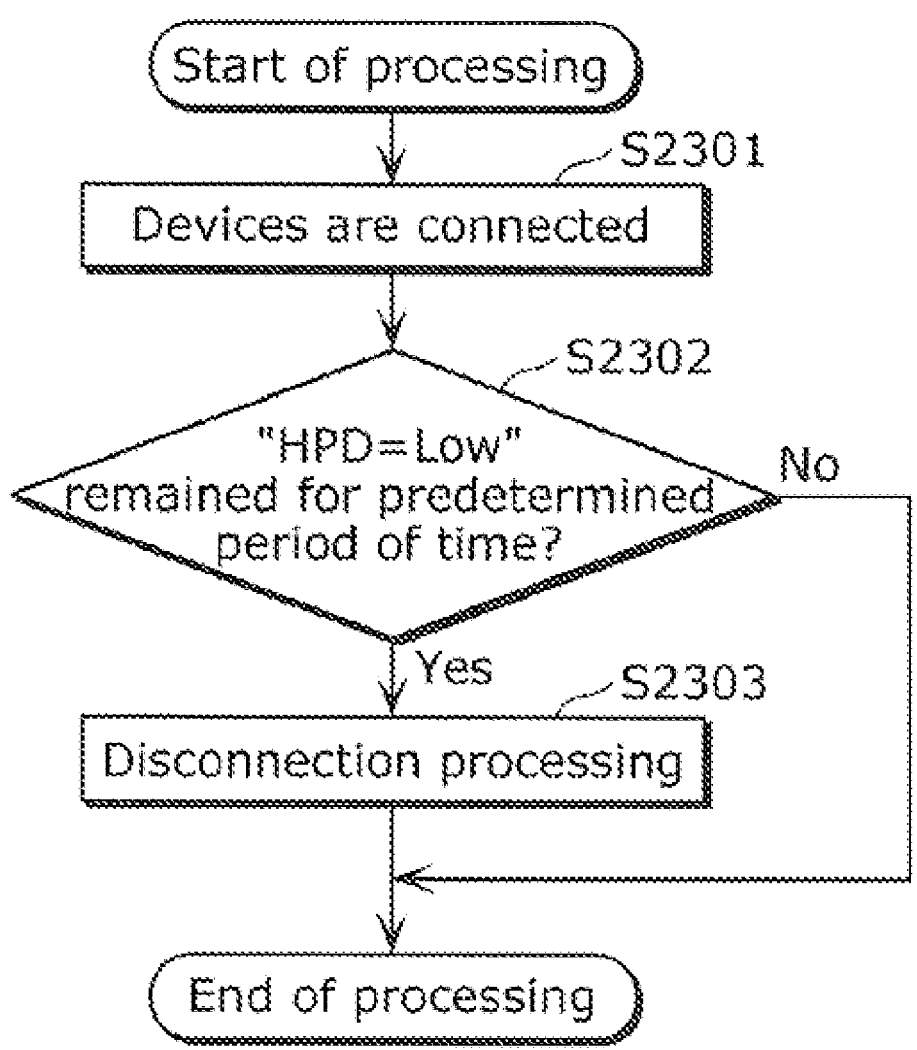
FIG. 23 is a flowchart showing disconnection processing performed by the wireless transmission device 101 in the first embodiment according to the present invention.

FIG. 23 is a flowchart showing the disconnection processing performed by the controller 201 of the wireless transmission device 101.

While the wireless transmission devices 101 and 102 are wirelessly connected (S2301), the controller 201 of the wireless transmission device 101 obtains, from the wired sending-receiving circuit 204, the signal level of the HPD signal line of the audio-video transmission cable 109 (S2302). When the signal level of the HPD signal line remains "Low" for a predetermined period of time (Yes in S2302), the controller 201 performs the disconnection processing to disconnect from the wireless transmission device 102 (S2303). It should be noted that the disconnection processing refers to processing whereby the disconnection notification is sent to the wireless transmission device 102 and the reserved bandwidth is thus released. When the signal level of the HPD signal line does not remain "Low" for the predetermined period of time (No in S2302), the controller 201 terminates the processing.

The speaker 605 and the display 606 are built into the audio-video output device 108 in the present invention. However, like a Set Top Box (STB), instead of including a speaker and a display, the audio-video output device 108 may be connected to a speaker and a display which are externally provided. In such a case, the wired in sending-receiving circuit is connected to the audio-video processing circuit in place of the speaker and the display, so that the audio-video output device 108 is connected to the external speaker and display via the wired sending-receiving circuit, the audio-video transmission cable, and the audio transmission cable. Similarly, the audio output device does not need to include the speaker and may be connected to an external speaker. Also, two or more speakers may be connected to the audio output device.

Embodiment 2

Figure 25:
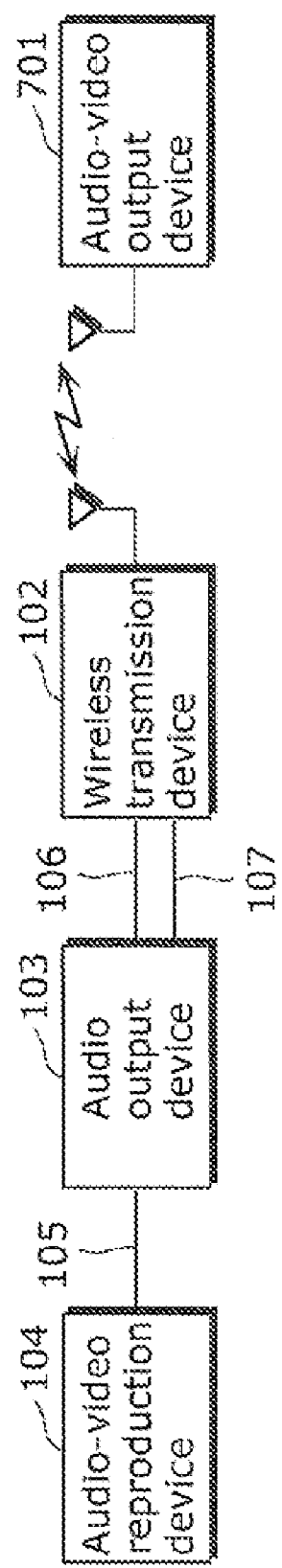
FIG. 25 is a block diagram showing a configuration of a wireless transmission system which transmits audio data using a wireless transmission method for the audio data, in a second embodiment according to the present invention.

FIG. 25 is a block diagram showing an example of a configuration of a wireless transmission system which transmits audio data using a wireless transmission method for the audio data, in the second embodiment according to the present invention. Note that a detailed description of the points identical to those in the first embodiment is omitted and the points of difference are mainly described.

In FIG. 25, the audio-video output device 701 is, for example, a TV, and is capable of outputting audio and video data. A wireless transmission device 102 is capable of wirelessly sending and receiving audio and video data. An audio output device 103 is, for example, an AV amplifier, and is capable of outputting audio data. An audio-video reproduction device 104 is capable of reproducing audio and video data and outputting the audio and video data to another device.

An audio-video transmission cable 105 and an audio-video transmission cable 106 are, for example, High Definition Multimedia Interface (HDMI) cables capable of transmitting audio and video data. An audio transmission cable 107 is, for example, a Sony Philips Digital Interface (SPDIF) cable capable of transmitting audio data.

The wireless transmission system in the second embodiment has two output modes (a theater mode and a normal mode) of outputting the audio data. In the theater mode, the audio data is outputted from a speaker provided outside the audio-video output device 701 which outputs the video data. In the normal mode, the audio data is outputted from the audio-video output device 701 which outputs the video data as well.

The configurations of the wireless transmission device 102 and the audio output device 103 are used in each of the following embodiments.

Figure 26:
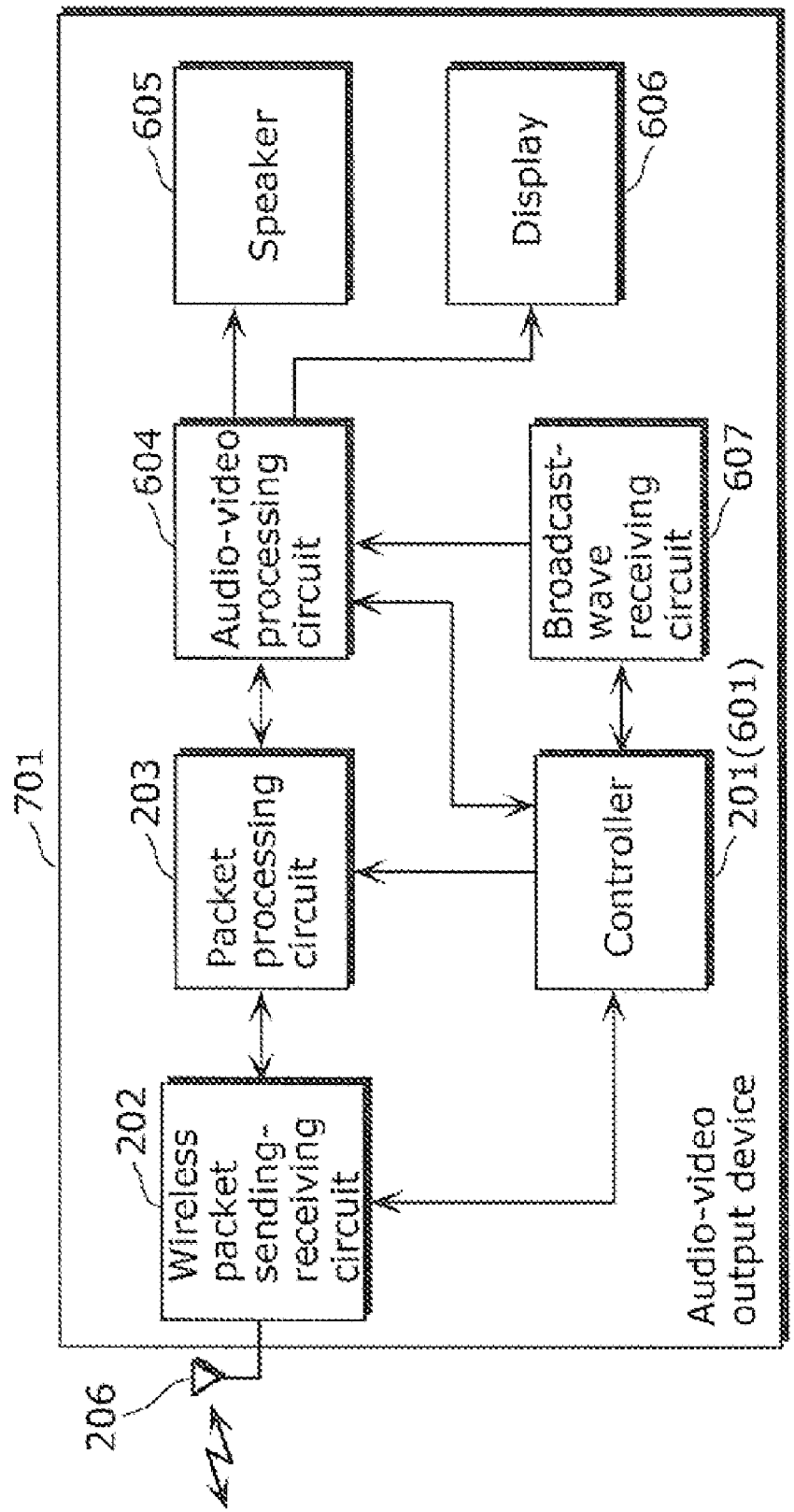
FIG. 26 is a block diagram showing an example of a configuration of an audio-video output device 701 in the second embodiment according to the present invention.

FIG. 26 is a block diagram showing an example of a configuration of the audio-video output device 701 in the second embodiment. In FIG. 26, the audio-video output device 701 includes: a wireless packet sending-receiving circuit 202 having an antenna 206; a packet processing circuit 203, an audio-video processing circuit 604; a speaker 605; a display 606; a broadcast-wave receiving circuit 607; and a controller 201 controlling operations of these circuits 202, 203, 604, and 607. More specifically, the audio-video output device 701 combines the wireless transmission device 101 and the audio-video output device 108 of the first embodiment.

Firstly, an operation performed by the audio-video output device 701 when a wireless signal is received via the antenna 206 is explained.

The wireless packet sending-receiving circuit 202 demodulates the wireless signal received via the antenna 206 into a baseband signal and, after this, outputs the baseband signal to the packet processing circuit 203. The packet processing circuit 203 extracts audio and video data and only a predetermined control command from the baseband signal received from the wireless packet sending-receiving circuit 202, according to the predetermined packet separation processing to decode the received packet. Then, the packet processing circuit 203 outputs the audio and video data to the audio-video processing circuit 604, and also outputs the control command to the controller 201.

The audio-video processing circuit 604 performs predetermined signal processing and D/A conversion processing on the audio and video data received from the packet processing circuit 203 or only on the video data and, after this, outputs the video data to the display 606 to display the video. In the normal mode, under the control of the controller 201, the audio-video processing circuit 604 performs the predetermined signal processing and D/A conversion processing on the received audio data and, after this, outputs the audio data to the speaker 605. In the theater mode, under the control of the controller 201, the audio-video processing circuit 604 does not output the audio data to the speaker.

Next, an operation performed by the audio-video output device 701 when a broadcast wave is received is explained.

The broadcast-wave receiving circuit 607 receives the broadcast wave, and performs the predetermined signal processing on the broadcast wave to obtain audio and video data. Then, the broadcast-wave receiving circuit 607 outputs the audio and video data to the audio-video processing circuit 604. The audio-video processing circuit 604 performs the predetermined signal processing and D/A conversion processing on the video data and, after this, outputs the video data to the display 606 to display the video. In the normal mode, under the control of the controller 201, the audio-video processing circuit 604 performs the predetermined signal processing and D/A conversion processing on the received audio data and, after this, sends the audio data to the speaker 605 to have the audio outputted. In the theater mode, under the control of the controller 201, the audio-video processing circuit 604 outputs the audio data to the packet processing circuit 203 without outputting to the speaker 605.

The packet processing circuit 203 converts the received audio data into a digital signal in a predetermined packet format, and then outputs the digital signal to the wireless packet sending-receiving circuit 202. The wireless packet sending-receiving circuit 202 performs digital modulation on a carrier signal based on the digital signal received from the packet processing circuit 203, and then wirelessly transmits the modulated wireless signal to the wireless transmission device 102 via the antenna 206.

When a wireless signal is received via the antenna 206 or when a broadcast wave is received, the controller 201 exchanges control data with the wireless packet sending-receiving circuit 202, the packet processing circuit 203, the audio-video processing circuit 604, and the broadcast-wave receiving circuit 607 to control these circuits.

The configurations of the wireless transmission device 102, the audio output device 103, and the audio-video reproduction device 104 have been described above with reference to FIGS. 3 to 5 and, therefore, the explanations are not repeated here.

Here, suppose that the user is viewing content reproduced by the audio-video reproduction device 104, using the display 606 of the audio-video output device 701 and the speaker 605 of the audio-video output device 701 or the speaker 406 of the audio output device 103 via the audio output device 103 and the wireless transmission device 102. In this situation, also suppose that the user performs input switching on the audio-video output device 701 in order to view a program from a broadcast wave received by the audio-video output device 701. Processing performed in this case is described as follows, with reference to FIGS. 27 to 30.

Figure 27:
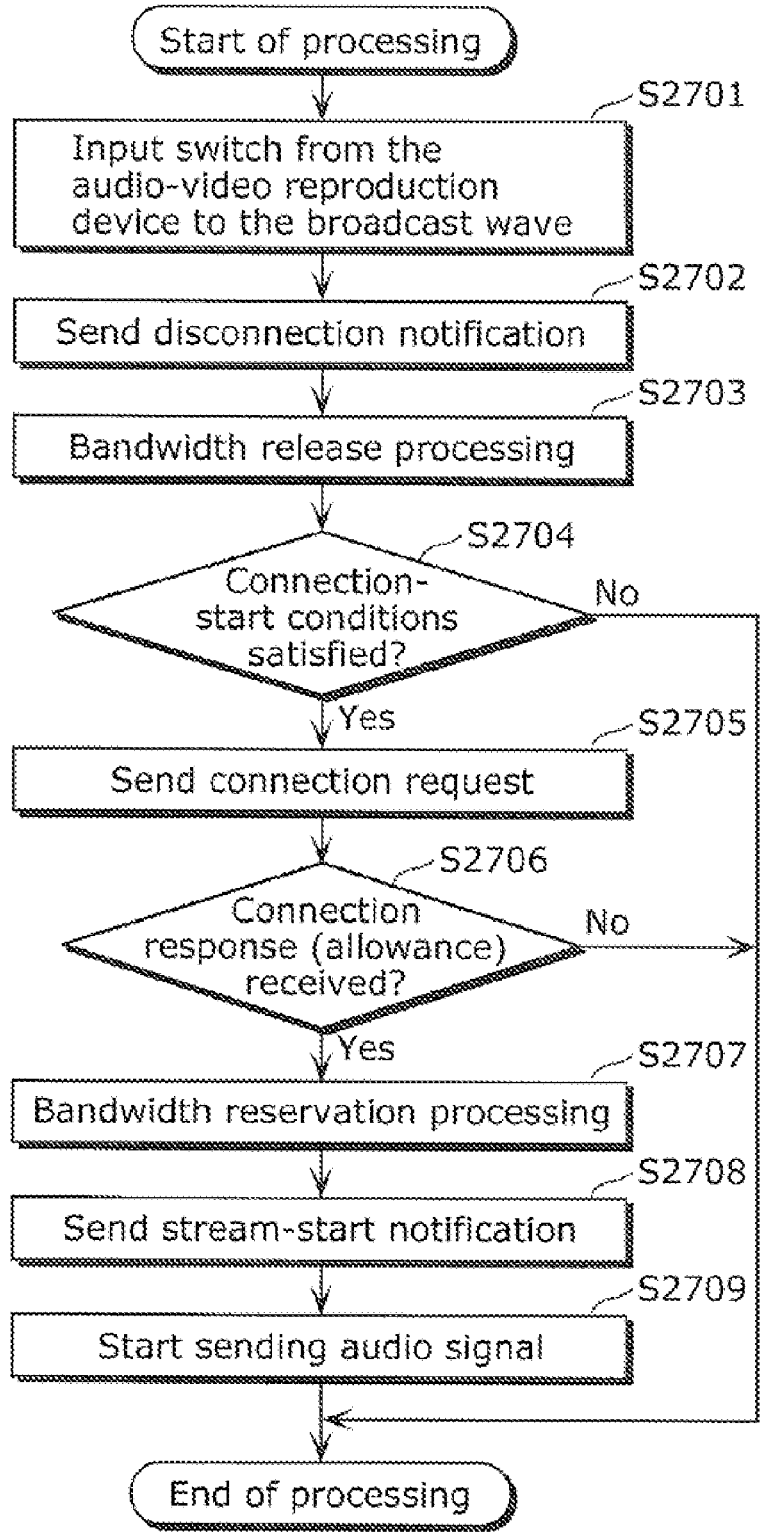
FIG. 27 is a flowchart showing connection processing performed by the audio-video output device 701 in the second embodiment according to the present invention.

FIG. 27 is a flowchart showing connection processing performed by the controller 201 of the audio-video output device 701.

When detecting, in S2701, that the user performs an input switching operation to switch the input of the audio-video output device 701, from the audio-video reproduction device 104 to the broadcast wave, the controller 201 proceeds to step S2702. Since the detection of the input switching operation is not the gist of the present invention, any method is applicable. For example, the controller 201 may detect the input switching operation by reference to a signal received from an operation receiving unit which is not illustrated.

In step S2702, the controller 201 controls the packet processing circuit 203, the wireless packet sending-receiving circuit 202, and the antenna 206 to send, to the wireless transmission device 102, a signal notifying disconnection of the wireless communication. Then, the controller 201 proceeds to step S2703.

In step S2703, the controller 201 controls the packet processing circuit 203, the wireless packet sending-receiving circuit 202, and the antenna 206 to perform processing to release the transmission bandwidth having been used in the wireless communication with the wireless transmission device 102. Then, the controller 201 proceeds to step S2704.

In step S2704, the controller 201 determines whether or not conditions for starting a connection are satisfied. The controller 201 verifies the following four (a1) to (d3) as the connection-start conditions.

(a1) The entire system is operating in the theater mode.

(b3) The wireless transmission device 102 has a function of performing wired transmission of the audio data.

(c3) The wireless transmission device 102 has a function of wirelessly receiving the audio data.

(d3) The connection state between the wireless transmission device 102 and the audio output device 103.

A verification method is explained for each of the connection start conditions.

Firstly, the condition (a1) is verified as follows. The controller 201 of the audio-video output device 701 exchanges the control signals with the controller 401 of the audio output device 103, and thus determines whether the system operates in the theater mode or the normal mode.

The controller 201 of the audio-video output device 701 stores the current operation mode, that is, the theater mode or the normal mode. The operation mode may be set by the user, for example. The controller 401 of the audio output device 103 obtains the operation mode from the controller 201 of the audio-video output device 701.

Next, a method of verifying the transmission state information indicated in the conditions (b3) to (d3) is explained with reference to FIG. 28. FIG. 28 is a diagram showing a sequence performed when the audio-video output device 701 obtains device information indicating whether or not the wireless transmission device 102 includes the wired audio sending circuit 305.

The audio-video output device 701 sends a device-information request signal to the wireless transmission device 102. When receiving the device-information request signal, the wireless transmission device 102 sends a device-information response signal to the audio-video output device 701.

FIG. 29 is a diagram showing an example of a message format of a device-information request signal. In FIG. 29, an operation code field 801 indicates a message type. In the second embodiment, a value indicating a device-performance request signal is set. A request type field 802 indicates a requested type in a bitmap format. In the second embodiment, a bit for requesting the device information is set to "1". A reserve field 803 is a field reserved for the future. An entire message length field 804 indicates a total message length when the message further includes a sub-message.

FIG. 30 is a diagram showing an example of a message format of a device-information response signal. In FIG. 30, an operation code field 901 indicates a message type. In the second embodiment, a value indicating a device-performance response signal is set. An entire message length field 902 indicates a total message length when the message further includes a sub-message. A type field 903 indicates a type of the sub-message. In the second embodiment, a value indicating the device-information message is set. A sub-message length field 904 indicates a length of the sub-message. A device type field 905 indicates a device type. A version field 906 indicates a device version. An AV type field 907 is made up of bits corresponding to functions in wireless transmission for sending the video data, receiving the video data, sending the audio data, and receiving the audio data, and is set to "1" when the present device has the aforementioned function. A wireless type field 908 indicates a wireless type. A flag field 909 stores flags corresponding to the device performance, such as the function of wired transmission of the audio data and the connection state of the audio transmission cable, and accordingly sets the flags corresponding to the connection state and the performance.

In this way, the device-information response signal can include: the information as to whether the wireless packet sending-receiving circuit 302 of the wireless transmission device 102 has the function of receiving the audio data; the information as to whether the wireless transmission device 102 has the wired audio sending circuit 305; and the connection state of the audio transmission cable 107.

The aforementioned connection state of the audio transmission cable 107 indicates whether or not the wireless transmission device 102 is connected to the audio output device 103 via the audio transmission cable 107. Then, in the device-information response signal which is to be sent, the connection state is represented by a specific flag in the flag field 909.

It should be noted that the wireless transmission device 102 may notify the audio-video output device 701 of the conditions (b3) and (d3) collectively as one flag, for example. This can be implemented by, for example, assigning a predetermined value to a combination of: the presence or absence of the function of wired transmission of the audio data; and the connection state between the wireless transmission device 102 and the audio output device 103 via the audio transmission cable 107.

Also, note that information summarizing the conditions (b3), (c3), and (d3) may be stored in the AV type field 907 and then may be notified to the audio-video output device 701 by the wireless transmission device 102. This can be implemented by, for example, assigning a predetermined value to a combination of: the presence or absence of the function of wired transmission of the audio data; the presence or absence of the function of wirelessly receiving the audio data; and the connection state between the wireless transmission device 102 and the audio output device 103 via the audio transmission cable.

The following is a specific example of setting the device-information response signal.

In the device type field 905, a value indicating that the wireless transmission device 102 is an adaptor is set. In the AV type field 907, each of the bits corresponding to the functions of sending the video data, sending the audio data, and receiving the audio data is set to "1". In the wireless type field 908, a value indicating a wireless type which is capable of high-speed transmission of the audio and video data and low-speed reception of the audio data is set. In the flag field 909, a flag indicating the presence of the wired audio transmission function and a flag indicating the connection state of the audio transmission cable are set to "1".

The audio-video output device 701 verifies that the condition (c3) is satisfied, by reference to the device-information response signal including the information indicating that the wireless transmission device 102: is an adaptor; has the function of receiving the audio data; and is capable of low-speed reception of the audio data. Moreover, the audio-video output device 701 verifies that the conditions (b3) and (d3) are satisfied by reference to the flag field 909.

Also, the bit corresponding to the function of receiving the audio data in the AV type field 907 may be set to "1" only when the wireless transmission device 102 is connected to the audio output device 103 via the audio transmission cable 107. With this, the conditions (b3), (c3), and (d3) can be verified by reference to this bit. Moreover, a different message may be received instead of the device-information response signal, and the condition (d3) may be verified by reference to the bit indicating that the wireless transmission device 102 is connected to the audio output device 103 via the audio transmission cable 107.

When all of the four connection-start conditions (a1) to (d3) are satisfied, the controller 201 controls the packet processing circuit 203, the wireless packet sending-receiving circuit 202, and the antenna 206 to establish a wireless connection with the wireless transmission device 102. Then, the controller 201 proceeds to step S2705. When any of the connection-start conditions (a1) to (d3) is not satisfied, the controller 201 terminates the processing without establishing the wireless connection with the wireless transmission device 102.

In this case, the controller 201 may control the audio-video processing circuit 604, so that the user can be notified of a reason for not starting the wireless connection via the display 606 or the speaker 605. For example, when the connection-start condition (d3) is not satisfied, a message saying "The audio cable is not connected" or "Connect the audio cable to the AV amplifier" is displayed on the display 606 or is given by voice via the speaker 605.

In step S2705, the controller 201 controls the packet processing circuit 203, the wireless packet sending-receiving circuit 202, and the antenna 206 to send a wireless-connection request signal to the wireless transmission device 102. Then, the controller 201 proceeds to step S2706. In step S2706, the controller 201 waits to receive a connection response (allowance) signal to allow the connection from the wireless transmission device 102. When receiving the connection response (allowance) signal from the wireless transmission device 102 via the antenna 206, the wireless packet sending-receiving circuit 202, and the packet processing circuit 203, the controller 201 proceeds to step S2707. When the connection response signal has not been received for a predetermined period of time or when a connection response (rejection) signal to reject the connection is received from the wireless transmission device 102, the controller 201 terminates the processing.

In step S2707, the controller 201 controls the packet processing circuit 203, the wireless packet sending-receiving circuit 202, and the antenna 206 to perform bandwidth-reservation processing to reserve a bandwidth or a time interval for sending the audio data. After the completion of the bandwidth-reservation processing, the controller 201 proceeds to step S2708. In step S2708, the controller 201 controls the packet processing circuit 203, the wireless packet sending-receiving circuit 202, and the antenna 206 to send, to the wireless transmission device 102, a stream-start notification signal indicating that transmission of an audio data stream is to be started. In S2709, the controller 201 controls the broadcast-wave receiving circuit 607, the audio-video processing circuit 604, the packet processing circuit 203, and the wireless packet sending-receiving circuit 202 so that the audio signal received by the broadcast-wave receiving circuit 607 is sent to the wireless transmission device 102.

Figure 31:
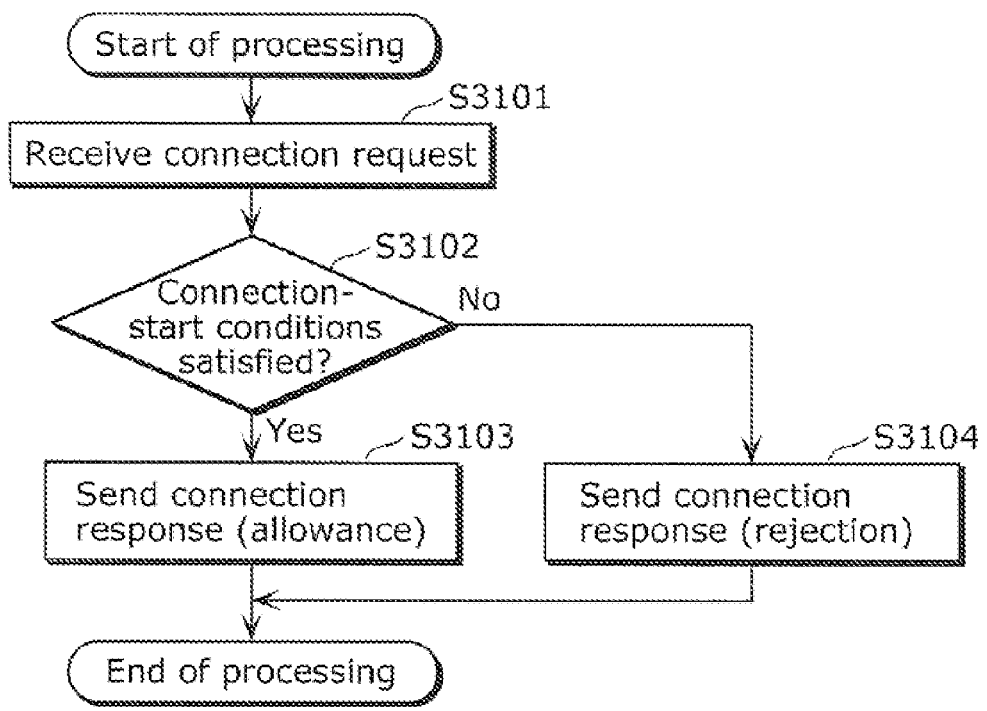
FIG. 31 is a flowchart showing connection processing performed by the wireless transmission device 102 in the second embodiment according to the present invention.

FIG. 31 is a flowchart showing connection processing performed by the controller 301 of the wireless transmission device 102.

When receiving, in step S3101, a connection request signal from the audio-video output device 701 via the antenna 306, the wireless packet sending-receiving circuit 302, and the packet processing circuit 303, the controller 301 proceeds to step S3102. In step S3102, the controller 301 determines whether or not conditions for allowing a connection are satisfied. The controller 301 verifies the following two (a2) and (d4) as the connection-allowance conditions.

(a2) The entire system is operating in the theater mode.

(d4) The wireless transmission device 102 is connected to the audio output device 103 via the audio transmission cable 107.

Here, methods for verifying the conditions (a2) and (d4) are explained. In order to verify the condition (a2), the control signals are exchanged between the audio-video output device 701 and the audio output device 103, so that the system is determined as being in the theater mode or the normal mode, as in the case where the condition (a1) is verified. It should be noted that when the audio-video output device 701 verifies the condition (a1), the condition (a2) does not necessarily need to be verified. In order to verify the condition (d4), the controller 301 inquires of the wired audio sending circuit 305 whether the audio transmission cable 107 is connected. It should be noted that when the condition (d4) is verified, the condition (d3) does not necessarily need to be verified.

When both the connection-start conditions (a2) and (d4) are satisfied, the controller 301 proceeds to step S3103. In step S3103, the controller 301 controls the packet processing circuit 303, the wireless packet sending-receiving circuit 302, and the antenna 306 to send a connection response (allowance) signal to the audio-video output device 701. When either one of the connection-start conditions (a2) and (d4) is not satisfied, the controller 301 proceeds to step S3104. In step S3104, the controller 301 controls the packet processing circuit 303, the wireless packet sending-receiving circuit 302, and the antenna 306 to send a connection response (rejection) signal to the audio-video output device 701.

Figure 32:
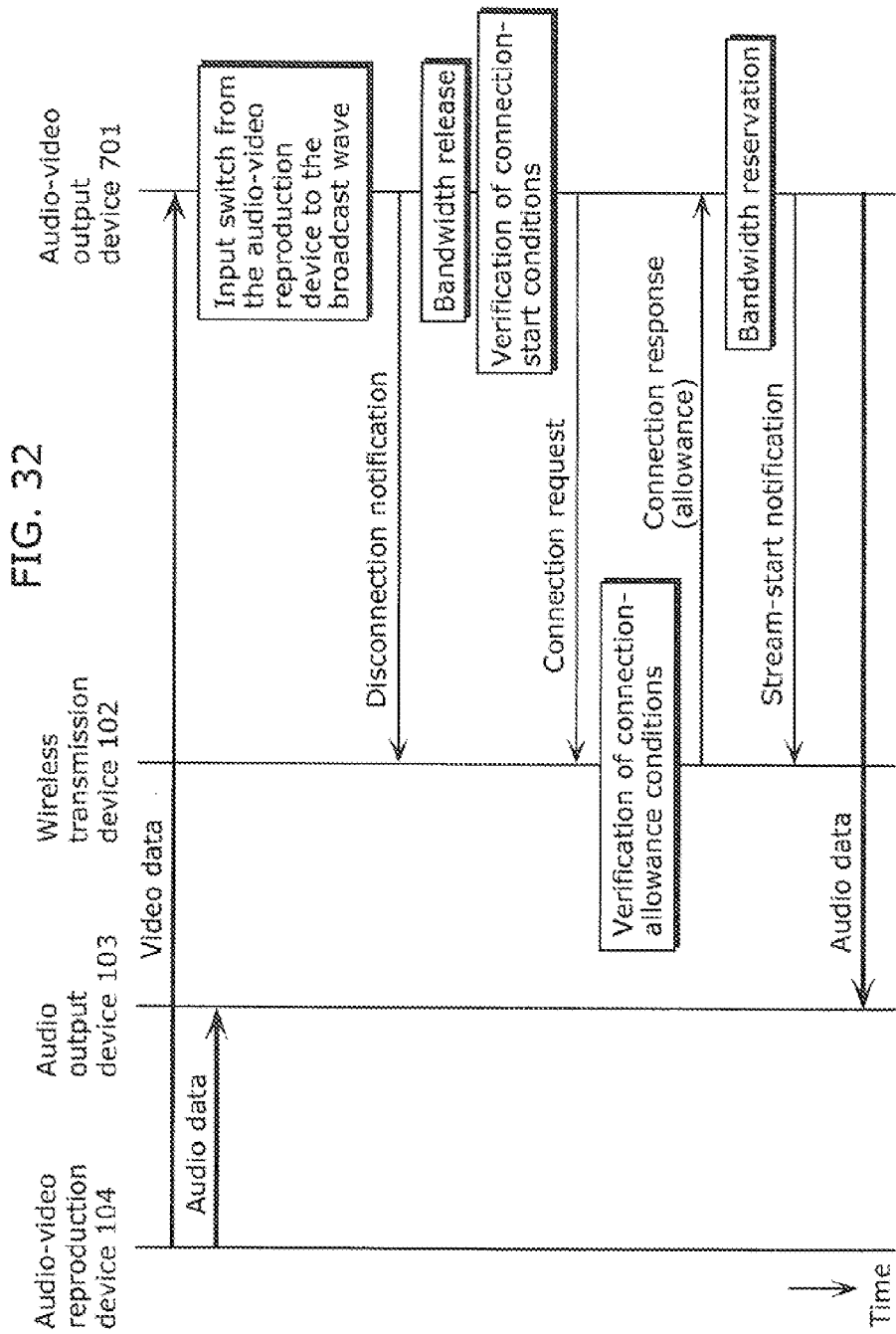
FIG. 32 is a sequence diagram showing an example of an operation performed by the wireless transmission system shown in FIG. 25 in the second embodiment according to the present invention.

FIG. 32 is a diagram showing a sequence performed to allow the connection in the case where the entire system is operating in the theater mode.

As an initial state, the input of the audio-video output device 701 is connected to the audio-video reproduction device 104. In this case, in the audio-video reproduction device 104, the audio-video processing circuit 503 performs the signal processing on the audio and video data reproduced by the audio-video reproduction circuit 502 and then the data is outputted to the audio output device 103 via the wired sending-receiving circuit 504, under the control of the controller 501.

In the audio output device 103, under the control of the controller 401, the audio data received by the wired sending-receiving circuit 402 is outputted from the speaker 406 via the audio-video processing circuit 403 and the video data is outputted to the wireless transmission device 102 via the audio-video processing circuit 403 and the wired sending-receiving circuit 404. In the wireless transmission device 102, the video data from the audio output device 103 is received via the wired sending-receiving circuit 304, and is then wirelessly transmitted to the audio-video output device 701 via the packet processing circuit 303, the wireless packet sending-receiving circuit 302, and the antenna 306 under the control of the controller 301.

In the audio-video output device 701, the video data received via the antenna 206 and the wireless packet sending-receiving circuit 202 is outputted to the display 606 via the packet processing circuit 203 and the audio-video processing circuit 604, under the control of the controller 201. Here, the audio output device 103 may transmit, to the wireless transmission device 102, the audio data together with the video data. In such a case, the controller 201 of the audio-video output device 701 sets the audio-video output device 701 on mute and also controls the audio-video processing circuit 604 so that the audio is not outputted from the speaker 605.

Here, the user switches the input of the audio-video output device 701 from the audio-video reproduction device 104 to the broadcast wave. Then, the audio-video output device 701 sends a disconnection notification signal to the wireless transmission device 102. Receiving the disconnection notification signal, the wireless transmission device 102 terminates the wireless communication with the audio-video output device 701. Following this, the audio-video output device 701 performs the bandwidth-release processing to release the bandwidth reserved for the wireless communication with the wireless transmission device 102.

Next, the audio-video output device 701 determines whether all the connection-start conditions (a1) to (d3) are satisfied. When all the connection-start conditions (a1) to (d3) are satisfied, the audio-video output device 701 sends a connection request signal to the wireless transmission device 102. When any of the connection-start conditions (a1) to (d3) is not satisfied, the audio-video output device 701 does not send the connection request signal to the wireless transmission device 102.

Receiving the connection request signal, the wireless transmission device 102 determines whether both the connection-start conditions (a4) and (d4) are satisfied. When both the connection-start conditions (a4) to (d4) are satisfied, the wireless transmission device 102 sends a connection response (allowance) signal to the audio-video output device 701. Receiving the connection response (allowance) signal, the audio-video output device 701 performs the bandwidth-reservation processing to reserve a bandwidth necessary for the wireless communication. After this, the audio-video output device 701 sends a stream-start notification signal to the wireless transmission device 102, and also sends the audio data to the wireless transmission device 102. The wireless transmission device 102 sends the received audio data to the audio output device 103. Then, the audio output device 103 outputs the audio data from the speaker 406.

Figure 33:
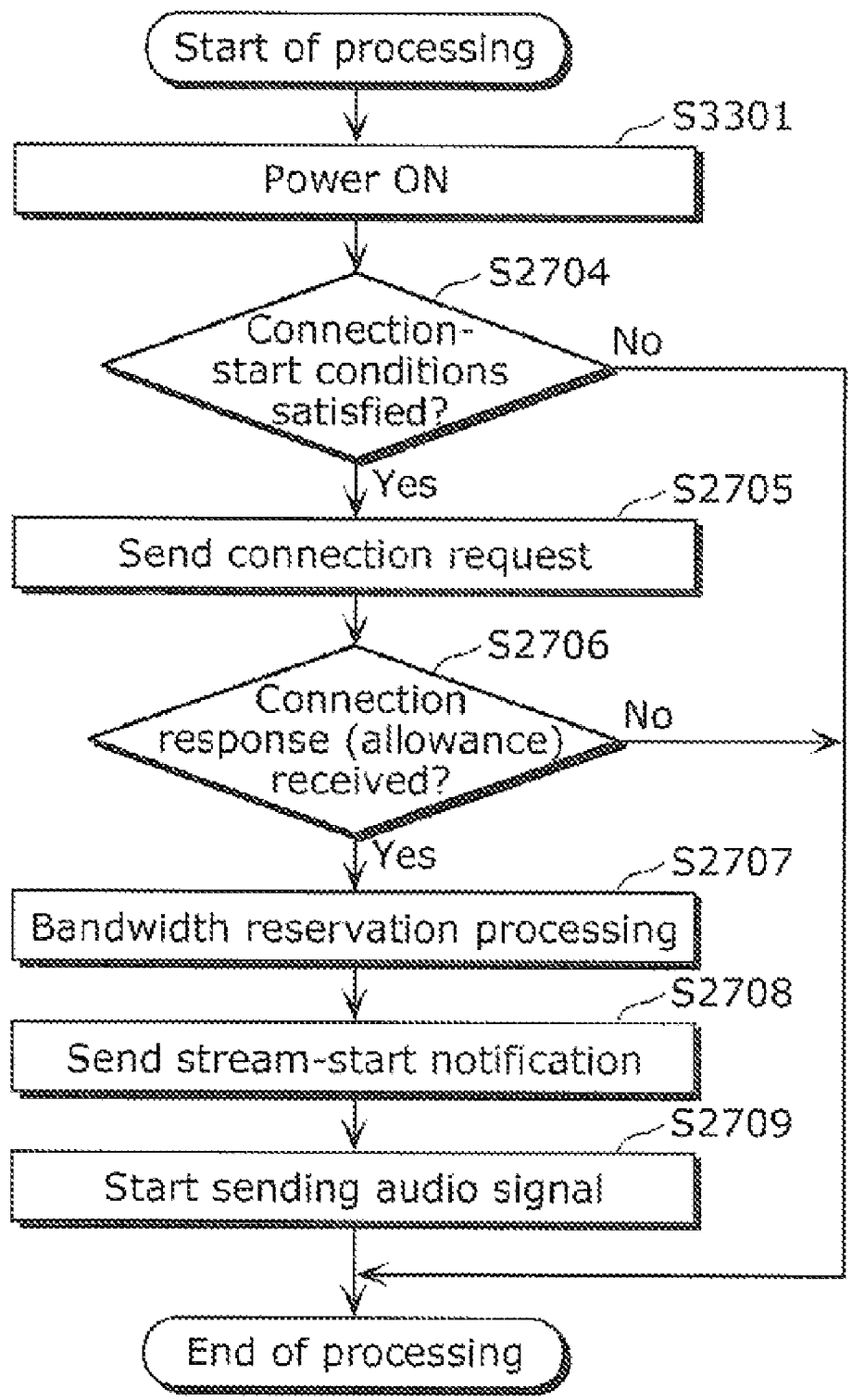
FIG. 33 is a flowchart showing connection processing performed by the audio-video output device 701 in the second embodiment according to the present invention.

FIG. 33 is a flowchart showing connection processing performed by the audio-video output device 701.

When the power is turned ON in S3301, the processing proceeds to S2704. From step S2704, the processing is performed in the same way as shown from step S2704 in FIG. 27.

Thus, the steps from S2704 in FIG. 33 are assigned the same numbers as used in FIG. 27, and the explanation is omitted here.

In the second embodiment, the audio output device 103 and the wireless transmission device 102 are connected via the audio-video transmission cable 106 and the audio transmission cable 107. However, the connection can also be implemented using a single cable having both a communication channel capable of transmitting audio and video data and a communication channel capable of transmitting audio data. In this case, the conditions (d3) and (b4) are verified based on the connection state of this single cable instead of the audio transmission cable 107. When this single cable is an HDMI cable, the connection state can be determined from a state of a 5V signal.

Embodiment 3

Figure 34:
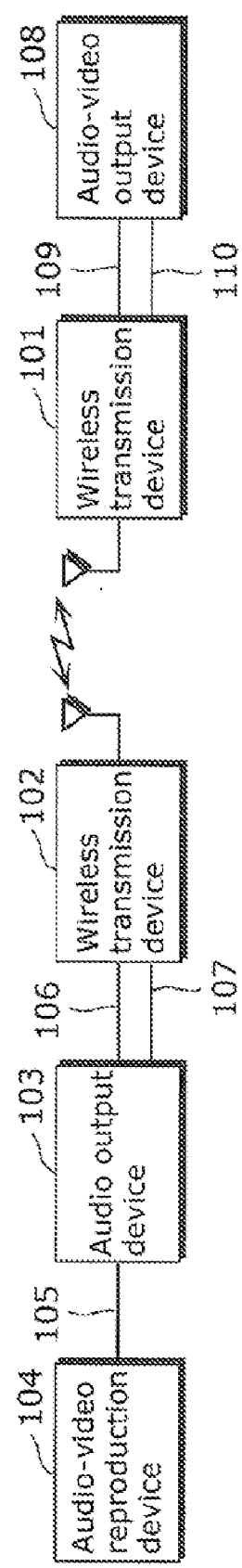
FIG. 34 is a block diagram showing an example of a configuration of a wireless transmission system which transmits audio data using a wireless transmission method for the audio data, in a third embodiment according to the present invention.

FIG. 34 is a block diagram showing a configuration of a wireless transmission system which transmits audio data using a wireless transmission method for the audio data, in a third embodiment according to the present invention.

A difference between the second and third embodiments is that the wireless processing unit in the audio-video output device 701 in the second embodiment is separated into the wireless transmission device 101 and the audio-video output device 108 in the third embodiment.

In FIG. 34, the audio-video output device 108 is, for example, a TV, and is capable of outputting audio and video data. An audio-video transmission cable 109 is, for example, an HDMI cable capable of transmitting audio and video data. An audio transmission cable 110 is, for example, an SPDIF cable capable of transmitting audio data.

The configurations and operations of the wireless transmission device 102, the audio output device 103, and the audio-video reproduction device 104 are identical to those in the second embodiment and, therefore, the explanations are omitted here. Also, the wireless transmission device 101 and the audio-video output device 108 are identical to those in the first embodiment and, therefore, the explanations are omitted here.

In the third embodiment, the audio output device 103 and the wireless transmission device 102 are connected via the audio-video transmission cable 106 and the audio transmission cable 107. However, the connection can also be implemented using a single cable having both a communication channel capable of transmitting audio and video data and a communication channel capable of transmitting audio data. In this case, the conditions (d3) and (b4) are verified based on the connection state of this single cable instead of the audio transmission cable 107. When this single cable is an HDMI cable, the connection state can be determined from a state of a 5V signal.

In the third embodiment, the audio-video output device 108 and the wireless transmission device 101 are connected via the audio-video transmission cable 109 and the audio transmission cable 110. However, the connection can also be implemented using a single cable having both a communication channel capable of transmitting audio and video data and a communication channel capable of transmitting audio data.

The following is a description of processing performed by the wireless transmission device 101 when the user switches the input of the audio-video output device 108 from the audio-video reproduction device 104 to the broadcast wave.

When detecting that the input is switched to the broadcast waver, the controller 601 sends, to the wireless transmission device 101 via the wired sending-receiving circuit 602 and the audio-video transmission cable 109, a switching notification signal indicating that the input is switched to the broadcast wave. Note that a method of detecting the switching is the same as in the second embodiment. The controller 201 of the wireless transmission device 101 receives the switching notification signal from the audio-video output device 108 via the wired sending-receiving circuit 204 and the packet processing circuit 203, and thus detects that the input of the audio-video output device 108 is switched to the broadcast wave.

Also, the wireless transmission device 101 determines whether or not the entire system is operating in the theater mode by reference to the control signals exchanged between the audio-video output device 108 and the audio output device 103. Other connection processing performed by the wireless transmission device 101 is the same as the processing shown by the flowchart of FIG. 27 in the second embodiment and, therefore, the explanation is omitted here. The processing performed by the wireless transmission device 102 is the same as the processing shown by the flowcharts of FIG. 31 in the second embodiment and, therefore, the explanation is omitted here.

The speaker 605 and the display 606 are built into the audio-video output device 108 in the present invention. However, like a Set Top Box (STB), instead of including a speaker and a display, the audio-video output device 108 may be connected to a speaker and a display which are externally provided. In such a case, a wired sending-receiving circuit is connected to the audio-video processing circuit 604 in place of the speaker 605 and the display 606, so that the audio-video output device 108 is connected to the external speaker and display via the wired sending-receiving circuit, the audio-video transmission cable, and the audio transmission cable. Similarly, the audio output device 103 does not need to include the speaker 406 and may be connected to an external speaker. Also, the number of the speakers 406 connected to the audio output device 103 may be two or more.

Other Modifications

Although the present invention has been described based on the above embodiments, it should be obvious that the present invention is not limited to the above embodiments. The following modifications are also included in the scope of the present invention.

Each of the devices described above is, specifically speaking, a computer system which includes a microprocessor, a ROM, a RAM, a hard disk unit, a display unit, a keyboard, and a mouse. The RAM or the hard disk unit stores computer programs. The microprocessor operates according to the computer programs, so that the functions of the device are carried out. A computer program includes a plurality of instruction codes indicating instructions to be given to the computer so as to achieve a specific function.

Some or all of the components included in each of the devices described above may be realized as a single system Large Scale Integration (LSI). The system LSI is a super multifunctional LSI manufactured by integrating a plurality of components onto a single chip. To be more specific, the system LSI is a computer system configured with a microprocessor, a ROM, a RAM, and so forth. The RAM stores computer programs. The microprocessor operates according to the computer programs, so that the functions of the system LSI are carried out.

Some or all of the components included in each of the devices described above may be implemented as an IC card or a standalone module that can be inserted into and removed from the device. The IC card or the module is a computer system configured with a microprocessor, a ROM, a RAM, and so forth. The IC card or the module may include the aforementioned super multifunctional LSI. The microprocessor operates according to the computer programs, so that the functions of the IC card or the module are carried out. The IC card of the module may be tamper resistant.

The present invention may be the methods described above. Also, the present invention may be a computer program implementing these methods performed by a computer, or may be a digital signal including the computer program.

Moreover, the present invention may be implemented by a computer program or a digital signal stored in a computer-readable recording medium, such as a flexible disk, a hard disk, a CD-ROM, an MO, a DVD, a DVD-ROM, a DVD-RAM, a Blu-ray Disc (BD), or a semiconductor memory. Furthermore, the present invention may be the digital signal stored in the recording medium.

Also, according to the present invention, the computer program or the digital signal may be transmitted via a telecommunications line, a wired or wireless communication line, a network typified by the Internet, or data broadcasting.

Moreover, the present invention may be a computer system including a microprocessor and a memory. The memory stores the computer program, and the microprocessor operates according the computer program.

Furthermore, the program or digital signal may be recorded on a recording medium to be transferred or may be transferred via a network or the like, so as to be implemented by a separate standalone computer system.

The above embodiments and the above modifications may be combined.

Although the present invention has been described thus far based on the above embodiments with reference to the drawings, the present invention is not limited to the above embodiments. Various modifications and changes can be made to the illustrated embodiments within the same or equivalent scope of the present invention.

INDUSTRIAL APPLICABILITY

As described above in detail, the wireless transmission method according to the present invention allows the wireless connection mode between the audio-video output device and the audio output device to be automatically selected, and thus can enhance the convenience of the user.

The wireless transmission method according to the present invention can be used particularly for audio-video data transmission performed by a wireless transmission system complying with wireless communication standards such as WirelessHD.

REFERENCE SIGNS LIST 101, 102 Wireless transmission device
103 Audio output device
104, 111 Audio-video reproduction device
105, 106, 109, 112 Audio-video transmission cable
107, 110 Audio transmission cable
108, 701 Audio-video output device
113 Video output device
201, 301, 401, 501, 601 Controller
202, 302 Wireless packet sending-receiving circuit
203, 303 Packet processing circuit
204, 304, 402, 404, 504, 602 Wired sending-receiving circuit
205, 405 Wired audio receiving circuit
206, 306 Antenna
305, 603 Wired audio sending circuit
403, 503, 604 Audio-video processing circuit
406, 605 Speaker
502 Audio-video reproduction circuit
606 Display
607 Broadcast-wave receiving circuit
801, 901 Operation code field
802 Request type field
803 Reserved field
804, 902 Entire message length field
903 Type field
904 Sub-message length field
905 Device type field
906 Version field
907 AV type field
908 Wireless type field
909 Flag field

The invention claimed is:

1. A wireless transmission method for a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, said wireless transmission method being executed by one of the first and second wireless transmission devices and comprising:

receiving a location specification message indicating a location of the source device; and selecting a connection mode applied between the first and second wireless transmission devices, on the basis of the location of the source device indicated by the location specification message received in said receiving, and establishing a connection according to the selected connection mode, wherein, when the source device is located on a side of the second wireless transmission device, a first wireless connection mode is selected in said selecting so that at least the video data, out of the video data and the audio data, is wirelessly transmitted in a direction from the second wireless transmission device to the first wireless transmission device, and when the source device is located on a side of the first wireless transmission device, a second wireless connection mode is selected in said selecting so that only the audio data, out of the video data and the audio data, is wirelessly transmitted in a direction from the first wireless transmission device to the second wireless transmission device.

2. The wireless transmission method according to claim 1, wherein the first wireless connection mode is selected in said selecting when: the source device is located on the side of the second wireless transmission device; and a first connection-start condition is satisfied, and the first connection-start condition includes at least one of that: (a) the wireless transmission system is operating in a mode in which the video data is outputted from the video output device and the audio data is outputted from the audio output device; (b) the first wireless transmission device is capable of wired transmission of the video data; (c) the first wireless transmission device is capable of wireless reception of the video data; and (d) the first wireless transmission device and the video output device are connected.

3. The wireless transmission method according to claim 1, wherein the second wireless connection mode is selected in said selecting when: the source device is located on the side of the first wireless transmission device; and a second connection-start condition is satisfied, and the second connection-start condition includes at least one of that: (a) the wireless transmission system is operating in a mode in which the video data is outputted from the video output device and the audio data is outputted from the audio output device; (b) the second wireless transmission device is capable of wired transmission of the audio data; (c) the second wireless transmission device is capable of wireless reception of the audio data; and (d) the second wireless transmission device and the audio output device are connected.

4. The wireless transmission method according to claim 1, wherein the location specification message is a Consumer Electronics Control (CEC) message defined by a High-Definition Multimedia Interface (HDMI) standard, and the location of the source device is specified in said selecting, on the basis of a CEC physical address included in the CEC message.

5. The wireless transmission method according to claim 4, wherein the CEC message is one of a "Set Stream Path" message and an "Active Source" message.

6. The wireless transmission method according to claim 4, wherein each of the first and second wireless transmission devices complies with a wireless high-definition standard called WirelessHD, and performs the wireless transmission using a High Rate PHY (HRP) when the first wireless connection mode is selected and using a Low Rate PHY (LRP) when the second wireless connection mode is selected.

7. The wireless transmission method according to claim 6, wherein the CEC message is wirelessly sent and received between the first and second wireless transmission devices using the LRP during a random access time at predetermined intervals.

8. The wireless transmission method according to claim 1, further comprising terminating a wireless connection when: the wireless connection is established in one of the first and second wireless connection modes; and the other one of the first and second wireless connection mode is newly selected in said selecting.

9. The wireless transmission method according to claim 1, further comprising terminating a wireless connection when: the wireless connection is established between the first and second wireless transmission devices in one of the first and second wireless connection modes; and a signal is received which indicates that a device connected to the one of the first and second wireless transmission devices via a wired connection is in a stopped state.

10. A wireless transmission device serving as one of a first wireless transmission device and a second wireless transmission device in a wireless transmission system including: a video output device at least displaying video based on video data; an audio output device outputting audio based on audio data; the first wireless transmission device connected to the video output device via a wired connection; and the second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, said wireless transmission device comprising:

a receiving unit configured to receive a location specification message indicating a location of the source device; and a selecting unit configured to select a connection mode applied between the first and second wireless transmission devices, on the basis of the location of the source device indicated by the location specification message received by said receiving unit, and to establish a connection according to the selected connection mode, wherein, when the source device is located on a side of the second wireless transmission device, said selecting unit is configured to select a first wireless connection mode so that at least the video data, out of the video data and the audio data, is wirelessly transmitted in a direction from the second wireless transmission device to the first wireless transmission device, and when the source device is located on a side of the first wireless transmission device, said selecting unit is configured to select a second wireless connection mode so that only the audio data, out of the video data and the audio data, is wirelessly transmitted in a direction from the first wireless transmission device to the second wireless transmission device.

11. A wireless transmission system comprising: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, one of said first and second wireless transmission devices including:

a receiving unit configured to receive a location specification message indicating a location of the source device; and a selecting unit configured to select a connection mode applied between the first and second wireless transmission devices, on the basis of the location of the source device indicated by the location specification message received by said receiving unit, and to establish a connection according to the selected connection mode, wherein, when the source device is located on a side of the second wireless transmission device, said selecting unit is configured to select a first wireless connection mode so that at least the video data, out of the video data and the audio data, is wirelessly transmitted in a direction from the second wireless transmission device to the first wireless transmission device, and when the source device is located on a side of the first wireless transmission device, said selecting unit is configured to select a second wireless connection mode so that only the audio data, out of the video data and the audio data, is wirelessly transmitted in a direction from the first wireless transmission device to the second wireless transmission device.

12. A non-transitory computer-readable recording medium for use in a computer, the recording medium having a computer program recorded thereon to be performed by a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, said computer program causing one of the first and second wireless transmission devices to execute:

receiving a location specification message indicating a location of the source device; and selecting a connection mode applied between the first and second wireless transmission devices, on the basis of the location of the source device indicated by the location specification message received in said receiving, and establishing a connection according to the selected connection mode, wherein, when the source device is located on a side of the second wireless transmission device, a first wireless connection mode is selected in said selecting so that at least the video data, out of the video data and the audio data, is wirelessly transmitted in a direction from the second wireless transmission device to the first wireless transmission device, and when the source device is located on a side of the first wireless transmission device, a second wireless connection mode is selected in said selecting so that only the audio data, out of the video data and the audio data, is wirelessly transmitted in a direction from the first wireless transmission device to the second wireless transmission device.

13. An integrated circuit used in a wireless transmission system including: a video output device at least displaying video based on video data; an audio output device outputting audio based on audio data; a first wireless transmission device connected to the video output device via a wired connection; and a second wireless transmission device which is connected to the audio output device via a wired connection and performs wireless transmission with the first wireless transmission device, the video data and the audio data being supplied to the video output device and the audio output device, respectively, by a source device which is one of a device connected to the video output device, a device connected to the audio output device, and the video output device, said integrated circuit being included in one of the first and second wireless transmission devices and comprising:

a receiving unit configured to receive a location specification message indicating a location of the source device; and a selecting unit configured to select a connection mode applied between the first and second wireless transmission devices, on the basis of the location of the source device indicated by the location specification message received by said receiving unit, and to establish a connection according to the selected connection mode, wherein, when the source device is located on a side of the second wireless transmission device, said selecting unit is configured to select a first wireless connection mode so that at least the video data, out of the video data and the audio data, is wirelessly transmitted in a direction from the second wireless transmission device to the first wireless transmission device, and when the source device is located on a side of the first wireless transmission device, said selecting unit is configured to select a second wireless connection mode so that only the audio data, out of the video data and the audio data, is wirelessly transmitted in a direction from the first wireless transmission device to the second wireless transmission device.

* * * * *